United States Patent
Rhoads et al.

(10) Patent No.: US 6,614,914 B1
(45) Date of Patent: Sep. 2, 2003

(54) WATERMARK EMBEDDER AND READER

(75) Inventors: Geoffrey B. Rhoads, West Linn, OR (US); Ammon E. Gustafson, Beaverton, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/503,881

(22) Filed: Feb. 14, 2000

Related U.S. Application Data

(63) Continuation-in-part of application No. 09/186,962, filed on Nov. 5, 1998, which is a continuation of application No. 08/649,419, filed on May 16, 1996, now Pat. No. 5,862,260.

(51) Int. Cl.$^7$ ................................................ H04K 1/00
(52) U.S. Cl. ...................................................... 382/100
(58) Field of Search ................................ 382/100, 232, 382/284, 248, 250; 395/135; 358/448, 450, 454, 124, 142; 380/7, 23, 25, 54; 283/6, 93, 94; 348/475, 460–468; 235/494; 713/176; 386/94; 705/1, 41, 44

(56) References Cited

U.S. PATENT DOCUMENTS

| | | |
|---|---|---|
| 2,630,525 A | 3/1953 | Tomberlin et al. |
| 3,493,674 A | 2/1970 | Houghton |
| 3,562,420 A | 2/1971 | Thompson |
| 3,569,619 A | 3/1971 | Simjian |
| 3,585,290 A | 6/1971 | Sanford |
| 3,665,162 A | 5/1972 | Yamamoto et al. |
| 3,703,628 A | 11/1972 | Philipson, Jr. |
| 3,805,238 A | 4/1974 | Rothfjell |
| 3,809,806 A | 5/1974 | Walker et al. |
| 3,838,444 A | 9/1974 | Loughlin et al. |
| 3,845,391 A | 10/1974 | Crosby |
| 3,914,877 A | 10/1975 | Hines |

(List continued on next page.)

FOREIGN PATENT DOCUMENTS

| | | |
|---|---|---|
| DE | 2943436 | 5/1981 |
| DE | 3806411 | 9/1989 |
| EP | 058 482 | 8/1982 |
| EP | 366 381 | 5/1990 |
| EP | 372 601 | 6/1990 |
| EP | 493 091 | 12/1990 |
| EP | 411 232 | 2/1991 |
| EP | 418 964 | 3/1991 |
| EP | 441 702 | 8/1991 |
| EP | 551 016 A1 | 2/1994 |
| EP | 581 317 | 2/1994 |
| EP | 605 208 A2 | 7/1994 |

(List continued on next page.)

OTHER PUBLICATIONS

Boland et al., "Watermarking digital images for copyright protection", Image Processing and it's Applications, 1995, Fifth International Conference on, 1995, pp. 326–330.

Ruanaidh et al., "Phase watermarking of digital images", Image Processing, 19996, Proceedings, International Conference on, vol. 3, 1996, pp. 239–242, vol. 3.

(List continued on next page.)

*Primary Examiner*—Jose L. Couso
(74) *Attorney, Agent, or Firm*—Joel R. Meyer; Digimarc Corporation

(57) ABSTRACT

A watermark system includes an embedder, detector, and reader. The watermark embedder encodes a watermark signal in a host signal to create a combined signal. The detector looks for the watermark signal in a potentially corrupted version of the combined signal, and computes its orientation. Finally, a reader extracts a message in the watermark signal from the combined signal using the orientation to approximate the original state of the combined signal. While adapted for images, video and audio, the watermark system applies to other electronic and physical media. For example, it can be applied to mark graphical models, blank paper, film and other substrates, texturing objects for ID purposes, etc.

18 Claims, 19 Drawing Sheets

U.S. PATENT DOCUMENTS

| | | |
|---|---|---|
| 3,922,074 A | 11/1975 | Ikegami et al. |
| 3,971,917 A | 7/1976 | Maddox et al. |
| 3,982,064 A | 9/1976 | Barnaby |
| 3,984,624 A | 10/1976 | Waggener |
| 3,998,160 A * | 12/1976 | Pearce .................. 101/426 |
| 4,025,851 A | 5/1977 | Haselwood et al. |
| 4,038,596 A * | 7/1977 | Lee ..................... 324/34 R |
| 4,225,967 A | 9/1980 | Miwa et al. |
| 4,230,990 A | 10/1980 | Lert, Jr. et al. |
| 4,231,113 A | 10/1980 | Blasbalg |
| 4,237,484 A | 12/1980 | Brown |
| 4,238,849 A | 12/1980 | Gassmann |
| 4,252,995 A | 2/1981 | Schmidt et al. |
| 4,262,329 A | 4/1981 | Bright et al. |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,389,671 A | 6/1983 | Posner et al. |
| 4,395,600 A | 7/1983 | Lundy et al. |
| 4,423,415 A | 12/1983 | Goldman |
| 4,425,642 A | 1/1984 | Moses et al. |
| 4,425,661 A | 1/1984 | Moses et al. |
| 4,476,468 A | 10/1984 | Goldman |
| 4,495,620 A | 1/1985 | Steele et al. |
| 4,528,588 A | 7/1985 | Löfberg |
| 4,532,508 A | 7/1985 | Ruell |
| 4,547,804 A | 10/1985 | Greenberg |
| 4,553,261 A | 11/1985 | Froessl |
| 4,590,366 A | 5/1986 | Rothfjell |
| 4,595,950 A | 6/1986 | Löfberg |
| 4,637,051 A | 1/1987 | Clark |
| 4,639,779 A | 1/1987 | Greenberg |
| 4,644,582 A | 2/1987 | Morishita et al. |
| 4,647,974 A | 3/1987 | Butler et al. |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,672,605 A | 6/1987 | Hustig et al. |
| 4,675,746 A | 6/1987 | Tetrick et al. |
| 4,677,435 A | 6/1987 | Cause D'Aggraives et al. |
| 4,677,466 A | 6/1987 | Lert, Jr. et al. |
| 4,682,794 A | 7/1987 | Margolin |
| 4,697,209 A | 9/1987 | Kiewit et al. |
| 4,703,476 A | 10/1987 | Howard |
| 4,712,103 A | 12/1987 | Gotanda |
| 4,718,106 A | 1/1988 | Weinblatt |
| 4,739,377 A | 4/1988 | Allen |
| 4,750,173 A | 6/1988 | Blüthgen |
| 4,765,656 A | 8/1988 | Becker et al. |
| 4,775,901 A | 10/1988 | Nakano |
| 4,776,013 A | 10/1988 | Kafri et al. |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,820,912 A | 4/1989 | Samyn |
| 4,835,517 A | 5/1989 | van der Gracht et al. |
| 4,855,827 A | 8/1989 | Best |
| 4,864,618 A | 9/1989 | Wright et al. |
| 4,866,771 A | 9/1989 | Bain |
| 4,874,936 A | 10/1989 | Chandler et al. |
| 4,876,617 A | 10/1989 | Best et al. |
| 4,879,747 A | 11/1989 | Leighton et al. |
| 4,884,139 A | 11/1989 | Pommier |
| 4,885,632 A | 12/1989 | Mabey et al. |
| 4,903,301 A | 2/1990 | Kondo et al. |
| 4,908,836 A | 3/1990 | Rushforth et al. |
| 4,908,873 A | 3/1990 | Philibert et al. |
| 4,920,503 A | 4/1990 | Cook |
| 4,921,278 A | 5/1990 | Shiang et al. |
| 4,939,515 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt |
| 4,963,998 A | 10/1990 | Maufe |
| 4,965,827 A | 10/1990 | McDonald |
| 4,967,273 A | 10/1990 | Greenberg |
| 4,969,041 A | 11/1990 | O'Grady et al. |
| 4,972,471 A | 11/1990 | Gross et al. |
| 4,972,476 A | 11/1990 | Nathans |
| 4,977,594 A | 12/1990 | Shear |
| 4,979,210 A | 12/1990 | Nagata et al. |
| 4,993,068 A | 2/1991 | Piosenka |
| 4,996,530 A | 2/1991 | Hilton |
| 5,010,405 A | 4/1991 | Schreiber et al. |
| 5,027,401 A | 6/1991 | Soltesz |
| 5,036,513 A | 7/1991 | Greenblatt |
| 5,063,446 A | 11/1991 | Gibson |
| 5,073,899 A | 12/1991 | Collier et al. |
| 5,075,773 A | 12/1991 | Pullen |
| 5,077,608 A | 12/1991 | Dubner |
| 5,077,795 A | 12/1991 | Rourke et al. |
| 5,079,648 A | 1/1992 | Maufe |
| 5,083,224 A | 1/1992 | Hoogendoorn et al. |
| 5,086,469 A | 2/1992 | Gupta et al. |
| 5,091,966 A | 2/1992 | Bloomberg et al. |
| 5,095,196 A | 3/1992 | Miyata |
| 5,103,459 A | 4/1992 | Gilhousen et al. |
| 5,113,437 A | 5/1992 | Best |
| 5,128,525 A | 7/1992 | Stearns et al. |
| 5,134,496 A | 7/1992 | Schwab et al. |
| 5,144,660 A | 9/1992 | Rose |
| 5,146,457 A | 9/1992 | Veldhuis et al. |
| 5,148,498 A | 9/1992 | Resnikoff et al. |
| 5,150,409 A | 9/1992 | Elsner |
| 5,161,210 A | 11/1992 | Druyvesteyn et al. |
| 5,166,676 A | 11/1992 | Milheiser |
| 5,168,147 A | 12/1992 | Bloomberg |
| 5,181,786 A | 1/1993 | Hujink |
| 5,185,736 A | 2/1993 | Tyrrell et al. |
| 5,199,081 A | 3/1993 | Saito et al. |
| 5,200,822 A | 4/1993 | Bronfin et al. |
| 5,212,551 A | 5/1993 | Conanan |
| 5,213,337 A | 5/1993 | Sherman |
| 5,228,056 A | 7/1993 | Schilling |
| 5,243,423 A | 9/1993 | DeJean et al. |
| 5,245,165 A | 9/1993 | Zhang |
| 5,245,329 A | 9/1993 | Gockebay |
| 5,247,364 A | 9/1993 | Banker et al. |
| 5,253,078 A | 10/1993 | Balkanski et al. |
| 5,257,119 A | 10/1993 | Funada et al. |
| 5,258,998 A | 11/1993 | Koide |
| 5,259,025 A | 11/1993 | Monroe et al. |
| 5,267,334 A | 11/1993 | Normille et al. |
| 5,278,400 A | 1/1994 | Appel |
| 5,280,537 A | 1/1994 | Sugiyama et al. |
| 5,293,399 A | 3/1994 | Hefti |
| 5,295,203 A | 3/1994 | Krause et al. |
| 5,299,019 A | 3/1994 | Pack et al. |
| 5,305,400 A | 4/1994 | Butera |
| 5,315,098 A | 5/1994 | Tow |
| 5,315,448 A | 5/1994 | Ryan |
| 5,319,453 A | 6/1994 | Copriviza |
| 5,319,724 A | 6/1994 | Blonstein et al. |
| 5,319,735 A | 6/1994 | Preuss et al. |
| 5,325,167 A | 6/1994 | Melen |
| 5,327,237 A | 7/1994 | Gerdes et al. |
| 5,337,361 A | 8/1994 | Wang et al. |

| | | | | | | |
|---|---|---|---|---|---|---|
| 5,337,362 A | 8/1994 | Gormish et al. | | 5,612,943 A | 3/1997 | Moses et al. |
| 5,349,655 A | 9/1994 | Mann | | 5,613,004 A | 3/1997 | Cooperman et al. |
| 5,351,302 A | 9/1994 | Leighton et al. | | 5,613,012 A | 3/1997 | Hoffman et al. |
| 5,374,976 A | 12/1994 | Spannenburg | | 5,614,940 A | 3/1997 | Cobbley et al. |
| 5,379,345 A | 1/1995 | Greenberg | | 5,617,148 A | 4/1997 | Montgomery |
| 5,387,941 A | 2/1995 | Montgomery et al. | | 5,627,655 A | 5/1997 | Okamoto et al. |
| 5,394,274 A | 2/1995 | Kahn | | 5,629,770 A | 5/1997 | Brassil |
| 5,396,559 A | 3/1995 | McGrew | | 5,629,980 A | 5/1997 | Stefik et al. |
| 5,398,283 A | 3/1995 | Virga | | 5,636,292 A | 6/1997 | Rhoads |
| 5,404,160 A | 4/1995 | Schober et al. | | 5,638,443 A | 6/1997 | Stefik et al. |
| 5,404,377 A | 4/1995 | Moses | | 5,638,446 A | 6/1997 | Rubin |
| 5,408,542 A | 4/1995 | Callahan | | 5,646,997 A * | 7/1997 | Barton ................. 380/23 |
| 5,410,598 A | 4/1995 | Shear | | 5,647,017 A | 7/1997 | Smithies et al. |
| 5,418,853 A | 5/1995 | Kanota et al. | | 5,649,054 A | 7/1997 | Oomen et al. |
| 5,422,963 A | 6/1995 | Chen et al. | | 5,652,626 A | 7/1997 | Kawakami et al. |
| 5,422,995 A | 6/1995 | Aoki et al. | | 5,659,613 A | 8/1997 | Copeland et al. |
| 5,425,100 A | 6/1995 | Thomas et al. | | 5,659,726 A | 8/1997 | Sandford, II et al. |
| 5,428,606 A | 6/1995 | Moskowitz | | 5,659,732 A | 8/1997 | Kirsch |
| 5,428,607 A | 6/1995 | Hiller et al. | | 5,661,574 A | 8/1997 | Kawana |
| 5,432,542 A | 7/1995 | Thibadeau et al. | | 5,663,766 A | 9/1997 | Sizer, II |
| 5,432,870 A | 7/1995 | Schwartz | | 5,664,018 A | 9/1997 | Leighton |
| 5,436,653 A | 7/1995 | Ellis et al. | | 5,666,487 A | 9/1997 | Goodman et al. |
| 5,444,779 A | 8/1995 | Daniele | | 5,671,277 A | 9/1997 | Ikenoue et al. |
| 5,446,273 A | 8/1995 | Leslie | | 5,680,223 A | 10/1997 | Cooper et al. |
| 5,449,895 A | 9/1995 | Hecht et al. | | 5,687,191 A * | 11/1997 | Lee et al. ................. 375/216 |
| 5,450,122 A | 9/1995 | Keene | | 5,689,587 A * | 11/1997 | Bender et al. .............. 382/232 |
| 5,450,490 A | 9/1995 | Jensen et al. | | 5,689,623 A | 11/1997 | Pinard |
| 5,453,968 A | 9/1995 | Veldhuis et al. | | 5,709,932 A | 1/1998 | Glez et al. |
| 5,461,426 A | 10/1995 | Limberg et al. | | 5,712,920 A | 1/1998 | Spille |
| 5,469,506 A | 11/1995 | Berson | | 5,719,937 A | 2/1998 | Warren et al. |
| 5,473,631 A | 12/1995 | Moses | | 5,719,984 A | 2/1998 | Yamagata et al. |
| 5,479,168 A | 12/1995 | Johnson et al. | | 5,721,788 A * | 2/1998 | Powell et al. ................ 382/100 |
| 5,481,294 A | 1/1996 | Thomas et al. | | 5,727,092 A | 3/1998 | Sandford, II et al. |
| 5,488,664 A | 1/1996 | Shamir | | 5,737,025 A | 4/1998 | Dougherty et al. |
| 5,499,294 A | 3/1996 | Friedman | | 5,737,026 A | 4/1998 | Lu et al. |
| 5,500,856 A | 3/1996 | Nagase et al. | | 5,739,864 A | 4/1998 | Copeland |
| 5,510,900 A | 4/1996 | Shirochi et al. | | 5,745,569 A | 4/1998 | Moskowitz et al. |
| 5,513,011 A | 4/1996 | Matsumoto et al. | | 5,761,686 A | 6/1998 | Bloomberg |
| 5,513,260 A | 4/1996 | Ryan | | 5,764,763 A | 6/1998 | Jensen et al. |
| 5,515,081 A | 5/1996 | Vasilik | | 5,764,770 A | 6/1998 | Schipper et al. |
| 5,521,372 A | 5/1996 | Hecht et al. | | 5,774,452 A | 6/1998 | Wolosewicz |
| 5,524,933 A | 6/1996 | Kunt et al. | | 5,778,102 A | 7/1998 | Sandford, II et al. |
| 5,526,427 A | 6/1996 | Thomas et al. | | 5,799,081 A | 8/1998 | Kim et al. |
| 5,530,751 A | 6/1996 | Morris | | 5,799,082 A | 8/1998 | Murphy et al. |
| 5,530,759 A | 6/1996 | Braudaway et al. | | 5,819,289 A | 10/1998 | Sanford, II et al. |
| 5,530,852 A | 6/1996 | Meske, Jr. et al. | | 5,822,360 A | 10/1998 | Lee et al. |
| 5,532,920 A | 7/1996 | Hartrick et al. | | 5,822,432 A | 10/1998 | Moskowitz et al. |
| 5,537,216 A | 7/1996 | Yamashita et al. | | 5,826,227 A | 10/1998 | Jayant |
| 5,537,223 A | 7/1996 | Curry | | 5,828,325 A | 10/1998 | Wolosewicz et al. |
| 5,539,471 A | 7/1996 | Myhrvold et al. | | 5,835,639 A * | 11/1998 | Honsinger et al. .......... 382/278 |
| 5,541,662 A | 7/1996 | Adams et al. | | 5,850,249 A | 12/1998 | Massetti et al. |
| 5,541,741 A | 7/1996 | Suzuki | | 5,857,038 A | 1/1999 | Owada et al. |
| 5,544,255 A | 8/1996 | Smithies et al. | | 5,859,920 A | 1/1999 | Daly et al. |
| 5,548,646 A | 8/1996 | Aziz et al. | | 5,862,218 A | 1/1999 | Steinberg |
| 5,557,333 A | 9/1996 | Jungo et al. | | 5,862,260 A | 1/1999 | Rhoads |
| 5,559,559 A | 9/1996 | Jungo et al. | | 5,878,010 A | 3/1999 | Okamoto et al. |
| 5,568,179 A | 10/1996 | Diehl et al. | | 5,889,868 A | 3/1999 | Moskowitz et al. |
| 5,568,268 A | 10/1996 | Tsuji et al. | | 5,893,067 A | 4/1999 | Bender et al. |
| 5,568,570 A * | 10/1996 | Rabbani ................... 382/238 | | 5,905,505 A | 5/1999 | Lesk |
| 5,572,010 A | 11/1996 | Petrie | | 5,905,819 A | 5/1999 | Daly |
| 5,572,247 A | 11/1996 | Montgomery | | 5,907,443 A | 5/1999 | Hirata |
| 5,574,787 A | 11/1996 | Ryan | | 5,929,920 A | 7/1999 | Sizer, II |
| 5,576,532 A | 11/1996 | Hecht | | 5,930,369 A | 7/1999 | Cox et al. |
| 5,579,124 A | 11/1996 | Aijala et al. | | 5,937,000 A | 8/1999 | Lee et al. |
| 5,581,800 A | 12/1996 | Fardeau et al. | | 5,940,135 A | 8/1999 | Petrovic et al. |
| 5,582,103 A | 12/1996 | Tanaka et al. | | 5,940,429 A | 8/1999 | Lam et al. |
| 5,587,743 A | 12/1996 | Montgomery | | 5,945,932 A | 8/1999 | Smith et al. |
| 5,590,197 A | 12/1996 | Chen et al. | | 5,960,151 A | 9/1999 | Takahashi |
| 5,602,920 A | 2/1997 | Bestler et al. | | 5,970,140 A | 10/1999 | Sandford, II et al. |
| 5,606,609 A | 2/1997 | Houser et al. | | 5,987,459 A | 11/1999 | Swanson et al. |
| 5,611,575 A | 3/1997 | Petrie | | 5,991,500 A | 11/1999 | Kanota et al. |

| | | |
|---|---|---|
| 6,000,621 A | 12/1999 | Hecht et al. |
| 6,031,914 A | 2/2000 | Tewfik et al. |
| 6,035,177 A | 3/2000 | Moses et al. |
| 6,044,156 A | 3/2000 | Honsinger et al. |
| 6,061,793 A | 5/2000 | Tewfik et al. |
| 6,078,664 A | 6/2000 | Moskowitz et al. |
| 6,086,706 A | 7/2000 | Brassil et al. |
| 6,181,802 B1 | 1/2001 | Todd |
| 6,209,094 B1 | 3/2001 | Levine et al. |
| 6,219,634 B1 | 4/2001 | Levine |

FOREIGN PATENT DOCUMENTS

| | | |
|---|---|---|
| EP | 629 972 | 12/1994 |
| EP | 642 060 | 3/1995 |
| EP | 649 074 A1 | 4/1995 |
| EP | 650 146 A1 | 4/1995 |
| EP | 651 554 | 5/1995 |
| EP | 0651554 | 5/1995 |
| EP | 705 025 A2 | 4/1996 |
| GB | 2063018 | 5/1981 |
| GB | 2067871 | 7/1981 |
| GB | 2196167 | 4/1988 |
| GB | 2204984 | 11/1988 |
| JP | 4-248771 | 9/1992 |
| JP | 05/242217 | 9/1993 |
| JP | 8-30759 | 2/1996 |
| WO | WO89/08915 | 9/1989 |
| WO | WO93/25038 | 12/1993 |
| WO | WO95/10835 | 4/1995 |
| WO | WO95/14289 | 5/1995 |
| WO | WO95/20291 | 7/1995 |
| WO | WO96/21290 | 7/1996 |
| WO | WO96/26494 | 8/1996 |
| WO | WO96/27259 | 9/1996 |
| WO | WO9731440 | 8/1997 |
| WO | WO 97/33392 | 9/1997 |
| WO | WO9746012 | 12/1997 |
| WO | WO 98/53565 | 11/1998 |
| WO | WO 00/00969 | 1/2000 |
| WO | WO 00/22745 | 4/2000 |

OTHER PUBLICATIONS

Bors et al., "Image watermarking using DCT domain constraints", Image Processing, 19996, Proceedings, International Conference on, vol. 3, 1996, pp. 231–234, vol. 3.

O'Ruanaidh et al., "Watermarking digital images for copyright prote.ction,",Vision, Image and Signal Processing, IEE Proceedings, vol.: 143 Issue: Aug., 1996, pp. 250–256.

"Access Control and COpyright Protection for Images, Conditional Access and Copyright Protection Based on the Use of Trusted Third Parties," 1995, 43 pages.

"Access Control and COpyright Protection for Images, WorkPackage 8: Watermarking," Jun. 30, 1995, 46 pages.

"Access Control and COpyright Protection for Images, WorkPackage 3: Evaluation of Existing Systems," Apr. 19, 1995, 68 pages.

"Access Control and COpyright Protection for Images, WorkPackage 1: Access Control and Copyright Protection for Images Need Evaluation," Jun., 1995, 21 pages.

"Copyright Protection for Digital Images, Digital Fingerprinting from FBI," Highwater FBI brochure, 1995, 4 pages.

"Cyphertech Systems: Introduces Digital Encoding Device to Prevent TV Piracy," Hollywood Reporter, Oct. 20, 1993, p. 23.

"Foiling Card Forgers With Magnetic 'Noise,'", Wall Street Journal, Feb. 8, 1994.

Frequently Asked Questions About Digimarc Signature Technology, Aug. 1, 1995, http://www.digimarc.com, 9 pages.

"High Water FBI Limited Presentation Image Copyright Protection Software," FBI Ltd brochure, Jul., 1995, 17 pages.

"Holographic signatures for digital images," The Seybold Report on Desktop Publishing, Aug. 1995, one page.

"NAB–Cyphertech Starts Anti–Piracy Broadcast Tests," Newsbytes, NEW03230023, Mar. 23, 1994.

"Steganography," Intellectual Property and the National Information Infrastructure The Report of the Working Group on Intellectual Property Rights, Sep. 1995, pp. 212–213.

"The Copyright Can of Worms Opened Up By The New Electronic Media," Computergram Internations, pCGN07170006, Jul. 17, 1995 and "The Copyright Can of Worms Opened Up By the New Electronic Media–2," Computergram Internations, pCGN07210008, Jul. 21, 1995, 3 pages total.

"Watermarking & Digital Signature: Protect Your Work!" Published on Internet 1996, http://Itswww.epfl.ch/.about-.jordan/watermarking.html.

Anderson, "Stretching the Limits of Steganography," Information Hiding, First International Workshop Proc., May 30–Jun. 1, 1996, pp. 39–48.

Arachelian, "White Noise Storm," Apr. 11, 1994, Internet reference, 13 pages.

Arazi, et al., "Intuition, Perception, and Secure Communication," IEEE Transactionson Systems, Man, and Cybernetics, vol. 19, No. 5, Sep./Oct. 1989, pp. 1016–1020.

Arthur, "Digital Fingerprints Protect Artwork," New Scientist, Nov. 12, 1994, p. 24.

Aura, "Invisible Communication," Helskinki University of Technology, Digital Systems Laboratory, Nov. 5, 1995, 13 pages.

Aura, "Practical Invisibility in Digital Communication," Information Hiding, First Int. Workshop Proc. May 30–Jun. 1, 1996, pp. 265–278.

Bartlett, et al., "An Overview of HighWater FBI Technology," Posted on Internet Mar. 22, 1996, 12 pages.

Bender et al, "Techniques for Data Hiding," Draft Preprint, Private Correspondence, dated Oct. 30, 1995, 45 pages.

Bender et al., "Techniques for Data Hiding," Massachusetts Institute of Technology, Media Laboratory, Jan. 1995, 10 pages.

Bender et al., "Techniques for Data Hiding," Massachusetts Institute of Technology, Media Laboratory, Draft Preprint, Apr. 13, 1995, 10 pages.

Bender Techniques for Data Hiding, Proc. SPIE, Vo. 2420, Feb. 9, 1995, pp. 164–173.

Boland et al., "Watermarking Digital Images for Copyright Protection", Fifth International Conference on Image Processing and it's Applications, Conference Date Jul. 4–6, 1995, Conf. Publ. No. 410, p. 326–330.

Boneh, "Collusion–Secure Fingerprinting for Digital Data," Department of Computer Science, Princeton University, 1995, 31 pages.

Boney et al., "Digital Watermarks for Audio Signals," Proceedings of Multimedia '96, 1996 IEEE, pp. 473–480.

Bors et al., "Embedding Parametric Digital Signatures in Images," EUSIPCO–96, Trieste, Italy, accepted for publication, Sep. 1996 (Published on internet Apr. 9, 1996, (http://poseidon.csd.auth.gr/papers/confers.1_ind.html)), 4 pages.

Boucqueau et al., Equitable Conditional Access and Copyright Protection for Image Based on Trusted Third Parties, *Teleservices & Multimedia Communications, 2nd Int. Cost 237 Workshop,* Second International Cost 237 Workshop, Nov., 1995; published 1996, pp. 229–243.

Brandt et al., "Representations that Uniquely Characterize Images Modulo Translation, Rotation, and Scaling," Pattern Recognition Letters, Aug. 1, 1996, pp. 1001–1015.

Brassil et al., Electronic Marking and Identification Techniques to Discourage Document Copying, *Proceedings of INFOCOM '94 Conference on Computer, IEEE Commun. Soc Conference,* Jun. 12–16, 1994, 1278–1287.

Brassil et al., "Hiding Information in Document Images," Nov., 1995, 7 pages.

Braudaway et al., "Protecting Publicly–Available Images with a Visible Image Watermark," SPIE vol. 2659, Feb. 1, 1996, pp. 126–133.

Brown, "S–Tools for Window, Version 1.00; What is Steganography," Internet reference, Mar. 6, 1994, 6 pages.

Bruckstein, A.M.; Richardson, T.J., A holographic transform domain image watermarking method, Circuits, Systems, and Signal Processing vol. 17, No. 3 pp. 361–389, 1998. This paper includes an appendix containing an internal memo of Bell Labs, which according to the authors of the paper, was dated Sep. 1994.

Bruyndonckx et al., Neural Network Post–Processing of Coded Images Using Perceptual Masking, 1994, 3 pages.

Bruyndonckx et al., "Spatial Method for Copyright Labeling of Digital Images," 1994, 6 pages.

Burgett et al., "A Novel Method for Copyright Labeling Digitized Image Data," requested by e–mail from author (unavailable/password protected on IGD WWW site); received Sep. 18, 1995, 12 pages.

Caronni, "Assuring Ownership Rights for Digital Images," Published in the Proceedings of 'Reliable IT Systems,' VIS '95, HH. Bruggemannn and W. Gerhardt–Häckl (Ed.), Vieweg Publishing Company, Germany, 1995, Jun. 14, 1994, 10 pages.

Caronni, "Assuring Ownership Rights for Digital Images," Published in the Proceedings of 'Reliable IT Systems,' VIS '95, HH. Brüggemannn and W. Gerhardt–Häackl (Ed.), Vieweg Publishing Company, Germany, 1995, Jun. 14, 1994, 10 pages (originally published as an ETH (Zurich) Technical Report, "Ermitteln Unauthorisierter Verteiler von Maschinenlesbaren Daten," Aug. 1993.

Caruso, "Digital Commerce, 2 plans for watermarks, which can bind proof of authorship to electronic works." *New York Times,* Aug. 7, 1995, one page.

Castro et al., "Registration of Translated and Rotated Images Using Finite Fourier Transforms," *IEEE Transactions on Pattern Analysis and Machine Intelligence,* vol. PAMI–9, No. 5, Sep. 1987, pp. 700–703.

Cha et al., "A Solution to the On–Line Image Downgrading Problem," Proc. 11$^{th}$ Annual Computer Security Applications Conf., Dec. 11, 1995, pp. 108–112.

Cheong, "Internet Agent, Spiders, Wanderers, Brokers, and Bots," New Riders Publishing Indianapolis, IN, 1996, 413 pages.

Choudhury, et al., "Copyright Protection for Electronic Publishing over Computer Networks," *IEEE Network Magazine,* Jun. 1994, 18 pages.

Chudy, "Handcuff Digital Thieves," Byte Magazine, Apr. 1996, 4 pages.

Clarke, "Invisible Code Tags Electronic Images," *Electronic Engineering Times,* Jun. 12, 1995, n. 852, p. 42.

Cox et al., "A Secure, Imperceptible Yet Perceptually Salient, Spread Spectrum Watermark for Multimedia," IEEE, Southcon/96, Conference Record, pp. 192–197, 1996.

Cox et al., "Secure Spread Spectrum Watermarking for Multimedia," NEC Research Institute Technical Report, Dec. 5, 1995, 33 pages.

Craver et al., "Can Invisible Watermarks Resolve Rightful Ownerships?" IBM Technical Report RC 20509, Jul. 25, 1996, pp. 1–21. (also published Proc. SPIE—Int. Soc. Opt. Eng. vol. 3022, pp. 310–321, conf. Feb. 13–14, 1997).

Dautzenberg, "Watermarking Images," Department of Microelectronics and Electrical Engineering, Trinity College Dublin, 47 pages, Oct. 1994.

Delaigle et al., "A Psychovisual Approach for Digital Picture Watermarking," 1995, 20 pages.

Delaigle et al., "Digital Watermarking," Proc. SPIE–Int. Soc. Opt. Eng., vol. 2659, pp. 99–110, 1996.

DICE Digital Watermark System, Q&A, Dec., 1995, 12 pages.

Digimarc presentation at RSA Conference, approximately Jan. 17, 1996, 4 pages.

Fimmerstad, "The Virtual Art Museum," Ericsson Connexion, Dec., 1995, pp. 29–31.

Fitzgerald, "Invisible Digital Copyright ID," Editor & Publisher, Jun. 25, 1994, p. 62.

Franz et al., "Computer Based Steganography: How It Works and Why Therefore Any Restrictions on Cryptography are Nonsense, at Best," Information Hiding, First Int. Workshop Proc, May 30–Jun. 1, 1996, pp. 7–21, (a counterpart was publsihed in German by Steffen Moller et al in 1994).

Friedman, "The Trustworthy Digital Camera: Restoring Credibility to the Photographic Image," IEEE Transactions on Consumer Electronics, vol. 39, No. 4, Nov., 1993, pp. 905–910.

Gabor, et al., "Theory of Communication," J. Inst. Elect. Eng. 93, 1946, pp. 429–441.

Gerzon, M.A., et al, "A High–Rate Buried–Data Channel for Audio CD," Journal of the Audio Engineering Society, vol. 43, No. 1–2, p. 3–22, Jan.–Feb., 1995.

Haitsma et al., "Audio Watermarking for Monitoring and Copy Protection," ACM Multimedia workshop marina Del Rey, CA ACM 2000 1–58113–311–1/00/11, pp. 119–122.

Hartung et al., Digital Watermarking of Raw and Compressed Video, Proc. SPIE 2952, Digital Compression Technologies and Systems for Video Communications, Oct., 1996, pp. 205–213.

Hecht, "Embedded Data Glyph Technology for Hardcopy Digital Documents," SPIE vol. 2171, Feb. 1994, pp. 341–352.

Honsinger et al., "Data Embedding Using Phase Dispersion," 2000 Eastman Kodak Company, 9 pages.

Horak, "From 'Steganographia' to Subliminal Communication," "Communications and Multimedia Security," Sep. 1995, pp. 205–213.

Humphrey, "Stamping Out Crime," *Hollywood Reporter,* Jan. 26, 1994, p. S48.

Jain, "Image Coding Via a Nearest Neighbors Image Model," *IEEE Transactions on Communications,* vol. COM–23, No. 3, Mar. 1975, pp. 318–331.

Johhnson, "Steganography," Dec. 10, 1995, 32 pages.

JPEG Group's JPEG Software (release 4), ftp.csua.berekeley.edu/pub/cypherpunks/applications/jsteg/jpeg.announcement.gz, Jun. 7, 1992 2 pages.

Kassam, Signal Detection in Non–Gaussian Noise, Dowden & Culver, 1988, pp. 1–96.

Koch et al., "Copyright Protection for Multimedia Data," Proc. of the International Conference on Digital Media and Electronic Publishing, Dec. 6–8, 1994, Leeds. U.K., 15 pages.

Koch et al., "Digital Copyright Labeling: Providing Evidence of Misuse and Tracking Unauthorized Distribution of Copyrighted Materials," Oasis Magazine, Dec. 1995, 3 pages.

Koch et al., "Towards Robust and Hidden Image Copyright Labeling," *Proc. of 20995 IEEE Workshop on Nonlinear Signal and Image Processing*, Jun. 20–22, 1995, 4 pages.

Komatsu et al., "A Proposal on Digital Watermark in Document Image Communication and Its Application to Realizing a Signature," Electronics and Communications in Japan, Part 1, vol. 73, No. 5, 1990, pp. 22–33.

Komatsu et al., "Authentication System Using Concealed Image in Telematics," Memoirs of the School of Science & Engineering, Waseda Univ., No. 52, 1988, pp. 45–60.

Kurak et al., "A Cautionary Note On Image Downgrading," 1992 IEEE, pp. 153–159.

Lesk, "Digital Libraries Meet Electronic Commerce: On–Screen Intellectual Property," Proceedings of the Third Forum on Research and Technology Advances in Digital Libraries—ADL—'96—(Cat No. 96TB100053), 1996, pp. 58–64.

Luc, "Analysis of Spread Spectrum System Parameters for Design of Hidden Transmission," *Radioengineering*, vol. 4, No. 2, Jun. 1995, pp. 26–29.

Machado, "Announcing Stego 1.0a2, The First Steganography Tool for the Macintosh," Internet reference, Nov. 28, 1993, 3 pages.

Macq, "Cryptology for Digital TV Broadcasting," *Proceedings of the IEEE*, vol. 83, No. 6, Jun. 1995, pp. 944–957.

Matsui et al., "Video–Steganography: How to Secretly Embed a Signature in a Picture," *IMA Intellectual Property Project Proceedings*, Jan. 1994, vol. 1, Issue 1, pp. 187–205.

Matthews, "When Seeing is Not Believing," New Scientist, Oct. 16, 1993, pp. 13–15.

Mintzer et al., "Toward on–line, Worlwide Access to Vatican Library Materials," IBM J. Res. Develop. vol. 40 No. 2, Mar., 1996, pp. 139–162.

Möller, et al., "Rechnergestutzte Steganographic: Wie sie Funktioniert und warum folglich jede Reglementierung von Verschlusselung unsinning ist," DuD, Datenschutz und Datensicherung, 18/6 1994 318–326.

Nakamura et al., "A Unified Coding Method of Dithered Image and Text Data Using Micropatterns," *Electronics and Communications in Japan*, Part 1, vol. 72, No. 4, 1989, pp. 50–56.

Nakamura et al., "A Unified Coding Method of Image and Text Data Using Discrete Orthogonal Transform," Systems, and Computers in Japan, vol. 21, No. 3, 1990, pp. 87–92.

New Product Information, "FBI at AppleExpo" (Olympia, London), Nov., 1995, 2 pages.

Nikoladis et al., "Copyright Protection of Images Using Robust Digital Signatures," IEEE International Conference on Acoustics, Speech and Signal Processing (ICASSP–96), accepted for publication, May 1996 (Published on internet Apr. 9, 1996, (http://poseidon.csd.auth.gr/papers/confers.1_ind.html)), 4 pages. (Also published 1996 IEEE International Conference on Acoustics, Speech, and Signal Processing Conference Proceedings, May 7–10, 1996, vol. 4, pp. 2168–71).

Ohnishi et al., Embedding a Seal into a Picture Under Orthogonal Wavelet Transform, Proceedings of Multimedia '96, 1996, IEEE, pp. 514–521.

Oomen, A. et al, "A Variable–Bit Rate Buried–Data Channel for Compact Disc," Journal of the Audio Engineering Society vol. 43, No. 1–2, pp. 23–28, Jan.–Feb., 1995.

ORuanaidh et al, "Watermarking Digital Images for Copyright Protection," http://www.kalman.mee.tcd.ic/people/jjr/eva_pap.html, Feb. 2, 1996, 8 pages. (Also published Aug., 1996, IEE Proceedings–Vision, Image and Signal Processing, vol. 143, No. 4, pp. 250–256.).

Pennebaker et al., JPEG Still Image Data Compression Standard, Chapter 3, "Aspects of the Human Visual System," pp. 23–27, 1993, Van Nostrand Reinhold, New York.

Pickholtz et al., "Theory of Spread–Spectrum Communications—A Tutorial," Transactions on Communications, vol. COM–30, No. 5, May, 1982, pp. 855–884.

Pitas et al., "Applying Signatures on Digital Images," IEEE Workshop on Nonlinear Image and Signal Processing, Neos Marmaras, Greece, pp. 460–463, Jun., 1995.

Pitas, "A Method for Signature Casting on Digital Images," 1996 IEEE International Conference on Image Processing (ICIP'96), Lausanne, Switzerland, accepted for publication, Sep. 16–19, 1996 (Published on internet Apr. 9, 1996, (http://poseidon.csd.auth.gr/papers/confers.1_ind.html)), 4 pages.

Port, "Halting Highway Robbery on the Internet," *Business Week*, Oct. 17, 1994, p. 212.

Proudler, Graeme J., "Authentication and Display of Signatures on Electronic Documents," 2244 Research Disclosure, Feb., 1994, No. 358, Emsworth, GB, 1 page.

Quisquater, J., "Access Control and COpyright Protection for Images, Conditional Access and Copyright Protection Based on the Use of Trusted Third Parties," 1995, 43 pages.

Rindfrey, "Towards an Equitable System for Access Control and Copyright Protection in Broadcast Image Services: The Equicrypt Approach," *Intellectual Property Rights and New Technologies*, Proc. of the Conference, R. Oldenbourg Verlag Wien München 1995, 12 pages.

Roberts, "Picture Coding Using Pseudorandom Noise," IRE Trans. on Information Theory, vol. 8, No. 2, Feb., 1962, pp. 145–154.

Sandford II et al., "The Data Embedding Method", SPIE vol. 2615, pp. 226–259.

Sapwater et al., "Electronic Copyright Protection," *Photo>Electronic Imaging*, vol. 37, No. 6, 1994, pp. 16–21.

Schneier, "Digital Signatures, Cryptographic Algorithms Can Create Nonforgeable Signatures for Electronic Documents, Making Them Valid Legal Instruments" Byte, Nov. 1993, pp. 309–312.

Schreiber et al., "A Compatible High–Definition Television System Using the Noise–Margin Method of Hiding Enhancement Information," *SMPTE Journal*, Dec. 1989, pp. 873–879.

shaggy@phantom.com, "Hide and Seek v. 4.0," Internet reference, Apr. 10, 1994, 3 pages.

Sheng et al., "Experiments on Pattern Recognition Using Invariant Fourier–Mellin Descriptors," *Journal of Optical Society of America*, vol. 3, No. 6, Jun., 1986, pp. 771–776.

Short, "Steps Toward Unmasking Secure Communications," *International Journal of Bifurcation and Chaos*, vol. 4, No. 4, 1994, pp. 959–977.

Simmons, "Subliminal Channels; Past and Present," *ETT*, vol. 5, No. 4, Jul.–Aug. 1994, pp. 45–59.

Sklar, "A Structured Overview of Digital Communications—a Tutorial Review—Part I," IEEE Communications Magazine, Aug., 1983, pp. 1–17.

Sklar, "A Structured Overview of Digital Communications—a Tutorial Review—Part II," IEEE Communications Magazine, Oct., 1983, pp. 6–21.

Stone, Analysis of Attacks on Image Watermarks with Randomized Coefficients, May 17, 1996, pp. 1–27.

Szepanski, "A Signal Theoretic Method for Creating Forgery–Proof Documents for Automatic Verification," Proceedings 1979 Carnahan Conference on Crime Countermeasures, May 16, 1979, pp. 101–109 (Cited OA of Mar. 26, 1997).

Szepanski, "Binary Data Transmission Over Video Channels with Very Low Amplitude Data Signals," Fernseh– und Kino–Technik, vol. 32, No. 7, Jul., 1978, pp. 251–256, (German text with full English translation.)

Szepanski, "Compatibility Problems in Add–On Data Transmission for TV–Channels," 2d Symp. and Tech. Exh. On Electromagnetic Compatibility, Jun. 28, 1977, pp. 263–268.

Szepanski, "Optimization of Add–On Signals by Means of a Modified Training Algorithm for Linear Classifiers," IEEE Int'l Symp. On Info. Theory, Oct. 10, 1977, pp. 27–28.

Szepanski, "Additive Binary Data Transmission for Video Signals," Conference of the Communications Engineering Soc. 1980, NGT Technical Reports, vol. 74, pp. 343–351. (German text with full English translation).

Tanaka et al., "A Visual Retrieval System with Private Information for Image Database," *Proceeding International Conference on DSP Applications and Technology*, Oct. 1991, pp. 415–421.

Tanaka et al., "Embedding Secret Information Into a Dithered Multi–Level Image," *Proc. IEEE Military Comm. Conf.*, Sep. 1990, pp. 216–220.

Tanaka et al., "New Integrated Coding Schemes for Computer–Aided Facsimile," *Proc. IEEE Int'l Conf. on Sys. Integration*, Apr. 1990, pp. 275–281.

Tanaka, "Embedding the Attribute Information Into a Dithered Image," *Systems and Computers in Japan*, vol. 21, No. 7, 1990, pp. 43–50.

Tirkel et al, "Electronic Water Mark," DICTA–93, Macquarie University, Sydney, Australia, Dec., 1993, pp. 666–673.

Tirkel et al., A Two–Dimensional Digital Watermark, Conf. Proc. DICTA–95. 10 pages.

Tirkel et al., A Two–Dimensional Digital Watermark, Conf. Proc. DICTA–95, Dec. 6–8, 1995. 10 pages.

Tirkel, et al "Image Watermarking–A Spread Spectrum Application" Proc. IEEE, ISSSTA '96, Mainz, Germany, Sep. 22–25, 1996, vol. II, p. 785–789.

Toga et al., "Registration Revisited," *Journal of Neuroscience Methods*, 48 (1993), pp. 1–13.

Van Schyndel et al., "A Digital Watermark," *IEEE International Conference on Image Processing*, Nov. 13–16, 1994, pp. 86–90.

van Schyndel et al., "Towards a Robust Digital Watermark," ACCV '95, vol. 2, Dec., 1995, pp, 504–508.

Voyatzis et al., "Applications of Total Automorphisms in Image Watermarking," 1996 IEEE International Conference on Image Processing (ICIP'96), Lausanne, Switzerland, Part vol. 2, pp. 237–240, Sep. 16–19, 1996 (Published on internet Apr. 9, 1996, (http://poseidon.csd.auth.gr/papers/confers.1_ind.html)), pages. 1996 IEEE, sep. 16–19, 1996 Laussane, Switzerland, pp. 237–239.

Voyatzis, et al., Chaotic Mixing of Digital Images and Applications to Watermarking, European Conference on Multimedia Applications, Services and Techniques (ECMAST'96), Louvain–la–Neuve, Belgium accepted for publication, May 1996 (Published on internet Apr. 9, 1996), (http://poseidon.csd.auth.gr/papers/confers.1_ind.html)), 8 pages.

Wagner, "Fingerprinting," 1983 IEEE, pp. 18–22.

Walton, "Image Authentication for a Slippery New Age," Dr. Dobb's Journal, Apr. 1995, pp. 18–26, 82–87.

Weber et al., "Correlative Image Registration," *Seminars in Nuclear Medicine*, vol. XXIV, No. 4, (Oct.), 1994, pp. 311–323.

Wise, "The History of Copyright, Photographer' Rights Span Three Centuries," Photo>Electronic Imaging, vol. 37, No. 6, 1994.

Zhao, et al., "Embedding Robust Labels Into Images for Copyright Protection," *Proc. of the International Congress on Intellectual Property Rights for Specialized Information, Knowledge and New Technolgies* (Vienna, Austria) Aug. 21–25, 1995, 10 pages.

Zhao, "A WWW Service to Embed and Prove Digital Copyright Watermarks," in Proc. of the European Conf. on Multimedia Applications, Serivces and Techniques, Louvain–La–Neuve, Belgium, May 1996, 14 pages.

* cited by examiner

One Quadrant Spatial
Transform Domain

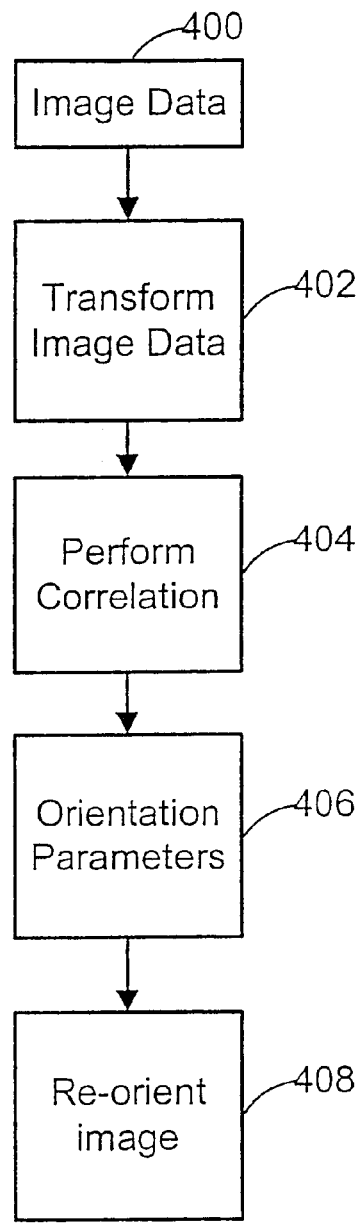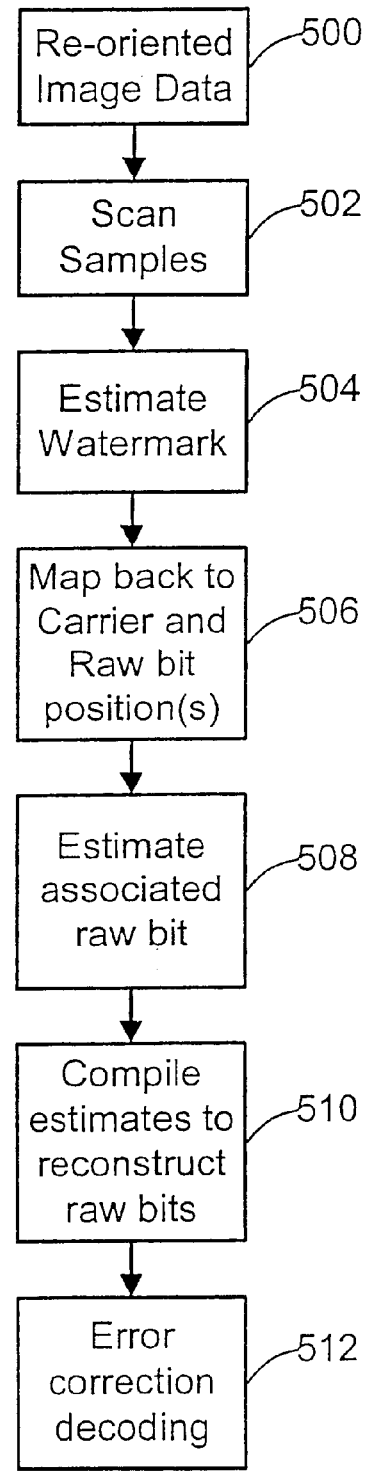

MAGNITUDE OF WATERMARK ORIENTATION SIGNAL
IN FREQUENCY DOMAIN

REAL VALUE OF WATERMARK ORIENTATION SIGNAL
IN SPATIAL DOMAIN

WATERMARK EMBEDDER AND READER

RELATED APPLICATION DATA

This application is a continuation in part of application Ser. No 09/186,962, filed Nov. 5, 1998, which is a continuation of application Ser. No. 08/649,419, filed May 16, 1996, now U.S. Pat. No. 5,862,260. These prior applications are incorporated herein by reference.

Application Ser. No. 08/649,419 is a continuation in part of PCT/US96/06618, filed May 7, 1996, U.S. application Ser. No. 08/637,531, filed Apr. 25, 1996 (Now U.S. Pat. No. 5,822,436), U.S. application Ser. No. 08/534,005, filed Sep. 25, 1995, (Now U.S. Pat. No. 5,832,119), and U.S. application Ser. No. 08/436,102, filed May 8, 1995, (Now U.S. Pat. No. 5,748,783).

This application is also a continuation in part of application Ser. No. 09/482,749, filed Jan. 13, 2000.

TECHNICAL FIELD

The invention relates to digital watermarking of media content, such as images, audio and video.

BACKGROUND AND SUMMARY

Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking systems have two primary components: an embedding component that embeds the watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reader extracts this information from the detected watermark.

One challenge to the developers of watermark embedding and reading systems is to ensure that the watermark is detectable even if the watermarked media content is transformed in some fashion. The watermark may be corrupted intentionally, so as to bypass its copy protection or anti-counterfeiting functions, or unintentionally through various transformations that result from routine manipulation of the content. In the case of watermarked images, such manipulation of the image may distort the watermark pattern embedded in the image.

The invention provides watermark structures, and related embedders, detectors, and readers for processing the watermark structures. In addition, it provides a variety of methods and applications associated with the watermark structures, embedders, detectors and readers. While adapted for images, the watermark system applies to other electronic and physical media. For example, it can be applied to electronic objects, including image, audio and video signals. It can be applied to mark blank paper, film and other substrates, and it can be applied by texturing object surfaces for a variety of applications, such as identification, authentication, etc. The detector and reader can operate on a signal captured from a physical object, even if that captured signal is distorted.

The watermark structure can have multiple components, each having different attributes. To name a few, these attributes include function, signal intensity, transform domain of watermark definition (e.g., temporal, spatial, frequency, etc.), location or orientation in host signal, redundancy, level of security (e.g., encrypted or scrambled). When describing a watermark signal in the context of this document, intensity refers to an embedding level while strength describes reading level (though the terms are sometimes used interchangeably). The components of the watermark structure may perform the same or different functions. For example, one component may carry a message, while another component may serve to identify the location or orientation of the watermark in a combined signal. Moreover, different messages may be encoded in different temporal or spatial portions of the host signal, such as different locations in an image or different time frames of audio or video.

Watermark components may have different signal intensities. For example, one component may carry a longer message, yet have smaller signal intensity than another component, or vice-versa. The embedder may adjust the signal intensity by encoding one component more redundantly than others, or by applying a different gain to the components. Additionally, watermark components may be defined in different transform domains. One may be defined in a frequency domain, while another may be defined in a spatial or temporal domain.

The watermark components may be located in different spatial or temporal locations in the host signal. In images, for example, different components may be located in different parts of the image. Each component may carry a different message or perform a different function. In audio or video, different components may be located in different time frames of the signal.

The watermark components may be defined, embedded and extracted in different domains. Examples of domains include spatial, temporal and frequency domains. A watermark may be defined in a domain by specifying how it alters the host signal in that domain to effect the encoding of the watermark component. A frequency domain component alters the signal in the frequency domain, while a spatial domain component alters the signal in the spatial domain. Of course, such alterations may have an impact that extends across many transform domains.

While described here as watermark components, one can also construe the components to be different watermarks. This enables the watermark technology described throughout this document to be used in applications using two or more watermarks. For example, some copy protection applications of the watermark structure may use two or more watermarks, each performing similar or different function. One mark may be more fragile than another, and thus, disappear when the combined signal is corrupted or transformed in some fashion. The presence or lack of a watermark or watermark component conveys information to the detector to initiate or prohibit some action, such as playback, copying or recording of the marked signal.

A watermark system may include an embedder, detector, and reader. The watermark embedder encodes a watermark signal in a host signal to create a combined signal. The detector looks for the watermark signal in a potentially corrupted version of the combined signal, and computes its orientation. Finally, a reader extracts a message in the watermark signal from the combined signal using the orientation to approximate the original state of the combined signal.

There are a variety of alternative embodiments of the embedder and detector. One embodiment of the embedder performs error correction coding of a binary message, and then combines the binary message with a carrier signal to create a component of a watermark signal. It then combines the watermark signal with a host signal. To facilitate detection, it may also add a detection component to form a composite watermark signal having a message and detection component. The message component includes known or signature bits to facilitate detection, and thus, serves a dual function of identifying the mark and conveying a message. The detection component is designed to identify the orientation of the watermark in the combined signal, but may carry an information signal as well. For example, the signal values at selected locations in the detection component can be altered to encode a message.

One embodiment of the detector estimates an initial orientation of a watermark signal in the multidimensional signal, and refines the initial orientation to compute a refined orientation. As part of the process of refining the orientation, this detector computes at least one orientation parameter that increases correlation between the watermark signal and the multidimensional signal when the watermark or multidimensional signal is adjusted with the refined orientation.

Another detector embodiment computes orientation parameter candidates of a watermark signal in different portions of the target signal, and compares the similarity of orientation parameter candidates from the different portions. Based on this comparison, it determines which candidates are more likely to correspond to a valid watermark signal.

Yet another detector embodiment estimates orientation of the watermark in a target signal suspected of having a watermark. The detector then uses the orientation to extract a measure of the watermark in the target. It uses the measure of the watermark to assess merits of the estimated orientation. In one implementation, the measure of the watermark is the extent to which message bits read from the target signal match with expected bits. Another measure is the extent to which values of the target signal are consistent with the watermark signal. The measure of the watermark signal provides information about the merits of a given orientation that can be used to find a better estimate of the orientation.

Further advantages and features of the invention will become apparent with reference to the following detailed description and accompanying drawings.

BRIEF DESCRIPTION OF THE DRAWINGS

FIG. 4 is a flow diagram of a process for detecting a watermark signal in an image and computing its orientation within the image.

FIG. 5 is a flow diagram of a process reading a message encoded in a watermark.

DETAILED DESCRIPTION

1.0 Introduction

Figure 1:
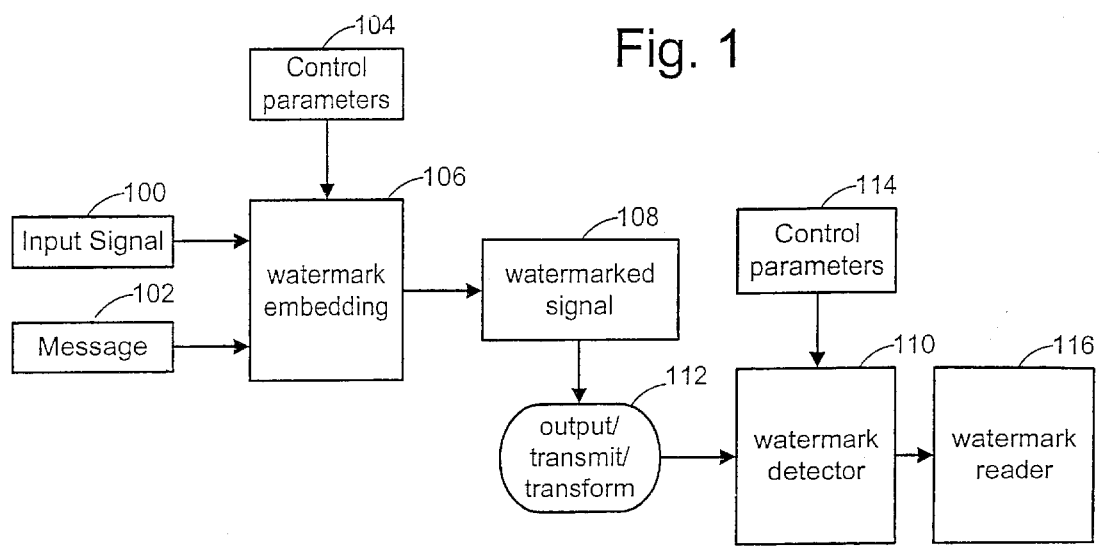
FIG. 1 is a block diagram illustrating an image watermark system.

A watermark can be viewed as an information signal that is embedded in a host signal, such as an image, audio, or some other media content. Watermarking systems based on the following detailed description may include the following components: 1) An embedder that inserts a watermark signal in the host signal to form a combined signal; 2) A detector that determines the presence and orientation of a watermark in a potentially corrupted version of the combined signal; and 3) A reader that extracts a watermark message from the combined signal. In some implementations, the detector and reader are combined.

The structure and complexity of the watermark signal can vary significantly, depending on the application. For example, the watermark may be comprised of one or more signal components, each defined in the same or different domains. Each component may perform one or more functions. Two primary functions include acting as an identifier to facilitate detection and acting as an information carrier to convey a message. In addition, components may be located in different spatial or temporal portions of the host signal, and may carry the same or different messages.

The host signal can vary as well. The host is typically some form of multi-dimensional media signal, such as an image, audio sequence or video sequence. In the digital domain, each of these media types is represented as a multi-dimensional array of discrete samples. For example, a color image has spatial dimensions (e.g., its horizontal and vertical components), and color space dimensions (e.g., YUV or RGB). Some signals, like video, have spatial and temporal dimensions. Depending on the needs of a particular application, the embedder may insert a watermark signal that exists in one or more of these dimensions.

In the design of the watermark and its components, developers are faced with several design issues such as: the extent to which the mark is impervious to jamming and manipulation (either intentional or unintentional); the extent of imperceptibility; the quantity of information content; the extent to which the mark facilitates detection and recovery, and the extent to which the information content can be recovered accurately.

For certain applications, such as copy protection or authentication, the watermark should be difficult to tamper with or remove by those seeking to circumvent it. To be robust, the watermark must withstand routine manipulation, such as data compression, copying, linear transformation, flipping, inversion, etc., and intentional manipulation intended to remove the mark or make it undetectable. Some applications require the watermark signal to remain robust through digital to analog conversion (e.g., printing an image or playing music), and analog to digital conversion (e.g., scanning the image or digitally sampling the music). In some cases, it is beneficial for the watermarking technique to withstand repeated watermarking.

A variety of signal processing techniques may be applied to address some or all of these design considerations. One such technique is referred to as spreading. Sometimes categorized as a spread spectrum technique, spreading is a way to distribute a message into a number of components (chips), which together make up the entire message. Spreading makes the mark more impervious to jamming and manipulation, and makes it less perceptible.

Another category of signal processing technique is error correction and detection coding. Error correction coding is useful to reconstruct the message accurately from the watermark signal. Error detection coding enables the decoder to determine when the extracted message has an error.

Another signal processing technique that is useful in watermark coding is called scattering. Scattering is a method of distributing the message or its components among an array of locations in a particular transform domain, such as a spatial domain or a spatial frequency domain. Like spreading, scattering makes the watermark less perceptible and more impervious to manipulation.

Yet another signal processing technique is gain control. Gain control is used to adjust the intensity of the watermark signal. The intensity of the signal impacts a number of aspects of watermark coding, including its perceptibility to the ordinary observer, and the ability to detect the mark and accurately recover the message from it.

Gain control can impact the various functions and components of the watermark differently. Thus, in some cases, it is useful to control the gain while taking into account its impact on the message and orientation functions of the watermark or its components. For example, in a watermark system described below, the embedder calculates a different gain for orientation and message components of an image watermark.

Another useful tool in watermark embedding and reading is perceptual analysis. Perceptual analysis refers generally to techniques for evaluating signal properties based on the extent to which those properties are (or are likely to be) perceptible to humans (e.g., listeners or viewers of the media content). A watermark embedder can take advantage of a Human Visual System (HVS) model to determine where to place a watermark and how to control the intensity of the watermark so that chances of accurately recovering the watermark are enhanced, resistance to tampering is increased, and perceptibility of the watermark is reduced. Such perceptual analysis can play an integral role in gain control because it helps indicate how the gain can be adjusted relative to the impact on the perceptibility of the mark. Perceptual analysis can also play an integral role in locating the watermark in a host signal. For example, one might design the embedder to hide a watermark in portions of a host signal that are more likely to mask the mark from human perception.

Various forms of statistical analyses may be performed on a signal to identify places to locate the watermark, and to identify places where to extract the watermark. For example, a statistical analysis can identify portions of a host image that have noise-like properties that are likely to make recovery of the watermark signal difficult. Similarly, statistical analyses may be used to characterize the host signal to determine where to locate the watermark.

Each of the techniques may be used alone, in various combinations, and in combination with other signal processing techniques.

In addition to selecting the appropriate signal processing techniques, the developer is faced with other design considerations. One consideration is the nature and format of the media content. In the case of digital images, for example, the image data is typically represented as an array of image samples. Color images are represented as an array of color vectors in a color space, such as RGB or YUV. The watermark may be embedded in one or more of the color components of an image. In some implementations, the embedder may transform the input image into a target color space, and then proceed with the embedding process in that color space.

2.0 Digital Watermark Embedder and Reader Overview

The following sections describe implementations of a watermark embedder and reader that operate on digital signals. The embedder encodes a message into a digital signal by modifying its sample values such that the message is imperceptible to the ordinary observer in output form. To extract the message, the reader captures a representation of the signal suspected of containing a watermark and then processes it to detect the watermark and decode the message.

FIG. 1 is a block diagram summarizing signal processing operations involved in embedding and reading a watermark. There are three primary inputs to the embedding process: the original, digitized signal 100, the message 102, and a series of control parameters 104. The control parameters may include one or more keys. One key or set of keys may be used to encrypt the message. Another key or set of keys may be used to control the generation of a watermark carrier signal or a mapping of information bits in the message to positions in a watermark information signal.

The carrier signal or mapping of the message to the host signal may be encrypted as well. Such encryption may increase security by varying the carrier or mapping for different components of the watermark or watermark message. Similarly, if the watermark or watermark message is redundantly encoded throughout the host signal, one or more encryption keys can be used to scramble the carrier or signal mapping for each instance of the redundantly encoded watermark. This use of encryption provides one way to vary the encoding of each instance of the redundantly encoded message in the host signal. Other parameters may include control bits added to the message, and watermark signal attributes (e.g., orientation or other detection patterns) used to assist in the detection of the watermark.

Apart from encrypting or scrambling the carrier and mapping information, the embedder may apply different, and possibly unique carrier or mapping for different components of a message, for different messages, or from different watermarks or watermark components to be embedded in the host signal. For example, one watermark may be encoded in a block of samples with one carrier, while another, possibly different watermark, is encoded in a different block with a different carrier. A similar approach is to use different mappings in different blocks of the host signal.

The watermark embedding process 106 converts the message to a watermark information signal. It then combines this signal with the input signal and possibly another signal (e.g., an orientation pattern) to create a watermarked signal 108. The process of combining the watermark with the input signal may be a linear or non-linear function. Examples of watermarking functions include: $S^*=S+gX$; $S^*=S(1+gX)$; and $S^*=Se_{gX}$; where $S^*$ is the watermarked signal vector, S is the input signal vector, and g is a function controlling watermark intensity. The watermark may be applied by modulating signal samples S in the spatial, temporal or some other transform domain.

To encode a message, the watermark encoder analyzes and selectively adjusts the host signal to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

Some processes for combining the watermark with the input signal are termed non- linear, such as processes that employ dither modulation, modify least significant bits, or apply quantization index modulation. One type of non-linear modulation is where the embedder sets signal values so that they have some desired value or characteristic corresponding to a message symbol. For example, the embedder may designate that a portion of the host signal is to encode a given bit value. It then evaluates a signal value or set of values in that portion to determine whether they have the attribute corresponding to the message bit to be encoded. Some examples of attributes include a positive or negative polarity, a value that is odd or even, a checksum, etc. For example, a bit value may be encoded as a one or zero by quantizing the value of a selected sample to be even or odd. As another example, the embedder might compute a checksum or parity of an N bit pixel value or transform coefficient and then set the least significant bit to the value of the checksum or parity. Of course, if the signal already corresponds to the desired message bit value, it need not be altered. The same approach can be extended to a set of signal samples where some attribute of the set is adjusted as necessary to encode a desired message symbol. These techniques can be applied to signal samples in a transform domain (e.g., transform coefficients) or samples in the temporal or spatial domains.

Quantization index modulation techniques employ a set of quantizers. In these techniques, the message to be transmitted is used as an index for quantizer selection. In the decoding process, a distance metric is evaluated for all quantizers and the index with the smallest distance identifies the message value.

The watermark detector 110 operates on a digitized signal suspected of containing a watermark. As depicted generally in FIG. 1, the suspect signal may undergo various transformations 112, such as conversion to and from an analog domain, cropping, copying, editing, compression/decompression, transmission etc. Using parameters 114 from the embedder (e.g., orientation pattern, control bits, key(s)), it performs a series of correlation or other operations on the captured image to detect the presence of a watermark. If it finds a watermark, it determines its orientation within the suspect signal.

Using the orientation, if necessary, the reader 116 extracts the message. Some implementations do not perform correlation, but instead, use some other detection process or proceed directly to extract the watermark signal. For instance in some applications, a reader may be invoked one or more times at various temporal or spatial locations in an attempt to read the watermark, without a separate pre-processing stage to detect the watermark's orientation.

Some implementations require the original, un-watermarked signal to decode a watermark message, while others do not. In those approaches where the original signal is not necessary, the original un-watermarked signal can still be used to improve the accuracy of message recovery. For example, the original signal can be removed, leaving a residual signal from which the watermark message is recovered. If the decoder does not have the original signal, it can still attempt to remove portions of it (e.g., by filtering) that are expected not to contain the watermark signal.

Watermark decoder implementations use known relationships between a watermark signal and a message symbol to extract estimates of message symbol values from a signal suspected of containing a watermark. The decoder has knowledge of the properties of message symbols and how and where they are encoded into the host signal to encode a message. For example, it knows how message bit values of one and a zero are encoded and it knows where these message bits are originally encoded. Based on this information, it can look for the message properties in the watermarked signal. For example, it can test the watermarked signal to see if it has attributes of each message symbol (e.g., a one or zero) at a particular location and generate a probability measure as an indicator of the likelihood that a message symbol has been encoded. Knowing the approximate location of the watermark in the watermarked signal, the reader implementation may compare known message properties with the properties of the watermarked signal to estimate message values, even if the original signal is unavailable. Distortions to the watermarked signal and the host signal itself make the watermark difficult to recover, but accurate recovery of the message can be enhanced using a variety of techniques, such as error correction coding, watermark signal prediction, redundant message encoding, etc.

One way to recover a message value from a watermarked signal is to perform correlation between the known message property of each message symbol and the watermarked signal. If the amount of correlation exceeds a threshold, for example, then the watermarked signal may be assumed to contain the message symbol. The same process can be repeated for different symbols at various locations to extract a message. A symbol (e.g., a binary value of one or zero) or set of symbols may be encoded redundantly to enhance message recovery.

In some cases, it is useful to filter the watermarked signal to remove aspects of the signal that are unlikely to be helpful in recovering the message and/or are likely to interfere with the watermark message. For example, the decoder can filter out portions of the original signal and another watermark signal or signals. In addition, when the original signal is unavailable, the reader can estimate or predict the original signal based on properties of the watermarked signal. The original or predicted version of the original signal can then be used to recover an estimate of the watermark message. One way to use the predicted version to recover the watermark is to remove the predicted version before reading the desired watermark. Similarly, the decoder can predict and remove un-wanted watermarks or watermark components before reading the desired watermark in a signal having two or more watermarks.

2.1 Image Watermark Embedder

Figure 2:
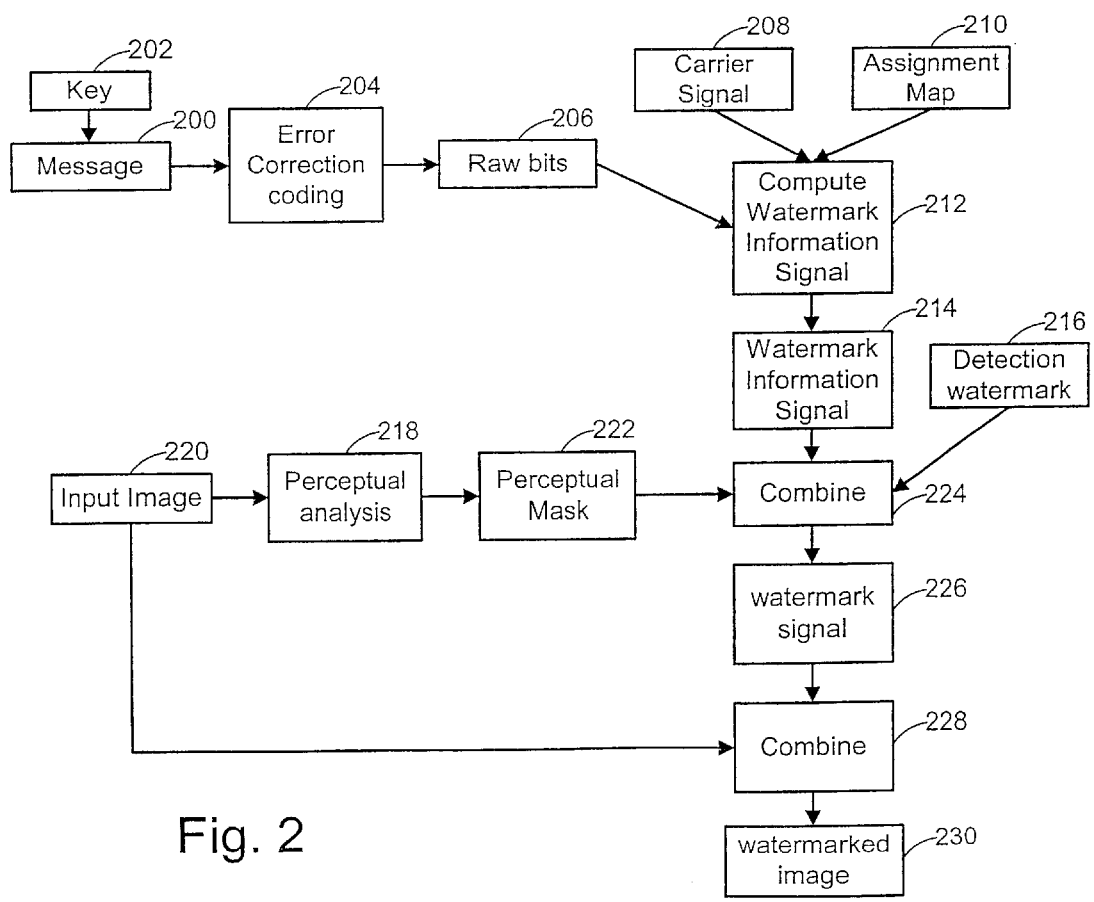
FIG. 2 is a block diagram illustrating an image watermark embedder.

FIG. 2 is a block diagram illustrating an implementation of an exemplary embedder in more detail. The embedding process begins with the message 200. As noted above, the message is binary number suitable for conversion to a watermark signal. For additional security, the message, its carrier, and the mapping of the watermark to the host signal may be encrypted with an encryption key 202. In addition to the information conveyed in the message, the embedder may also add control bit values ("signature bits") to the message to assist in verifying the accuracy of a read operation. These control bits, along with the bits representing the message, are input to an error correction coding process 204 designed to increase the likelihood that the message can be recovered accurately in the reader.

There are several alternative error correction coding schemes that may be employed. Some examples include BCH, convolution, Reed Solomon and turbo codes. These forms of error correction coding are sometimes used in communication applications where data is encoded in a carrier signal that transfers the encoded data from one place to another. In the digital watermarking application discussed here, the raw bit data is encoded in a fundamental carrier signal.

In addition to the error correction coding schemes mentioned above, the embedder and reader may also use a Cyclic Redundancy Check (CRC) to facilitate detection of errors in the decoded message data.

The error correction coding function 204 produces a string of bits, termed raw bits 206, that are embedded into a watermark information signal. Using a carrier signal 208 and an assignment map 210, the illustrated embedder encodes the raw bits in a watermark information signal 212, 214. In some applications, the embedder may encode a different message in different locations of the signal. The carrier signal may be a noise image. For each raw bit, the assignment map specifies the corresponding image sample or samples that will be modified to encode that bit.

The embedder depicted in FIG. 2 operates on blocks of image data (referred to as 'tiles') and replicates a watermark in each of these blocks. As such, the carrier signal and assignment map both correspond to an image block of a pre-determined size, namely, the size of the tile. To encode each bit, the embedder applies the assignment map to determine the corresponding image samples in the block to be modified to encode that bit. Using the map, it finds the corresponding image samples in the carrier signal. For each bit, the embedder computes the value of image samples in the watermark information signal as a function of the raw bit value and the value(s) of the corresponding samples in the carrier signal.

To illustrate the embedding process further, it is helpful to consider an example. First, consider the following background. Digital watermarking processes are sometimes described in terms of the transform domain in which the watermark signal is defined. The watermark may be defined in the spatial or temporal domain, or some other transform domain such as a wavelet transform, Discrete Cosine Transform (DCT), Discrete Fourier Transform (DFT), Hadamard transform, Hartley transform, Karhunen-Loeve transform (KLT) domain, etc.

Consider an example where the watermark is defined in a transform domain (e.g., a frequency domain such as DCT, wavelet or DFT). The embedder segments the image in the spatial domain into rectangular tiles and transforms the image samples in each tile into the transform domain. For example in the DCT domain, the embedder segments the image into N by N blocks and transforms each block into an N by N block of DCT coefficients. In this example, the assignment map specifies the corresponding sample location or locations in the frequency domain of the tile that correspond to a bit position in the raw bits. In the frequency domain, the carrier signal looks like a noise pattern. Each image sample in the frequency domain of the carrier signal is used together with a selected raw bit value to compute the value of the image sample at the location in the watermark information signal.

Now consider an example where the watermark is defined in the spatial domain. The embedder segments the image in the spatial domain into rectangular tiles of image samples (i.e. pixels). In this example, the assignment map specifies the corresponding sample location or locations in the tile that correspond to each bit position in the raw bits. In the spatial domain, the carrier signal looks like a noise pattern extending throughout the tile. Each image sample in the spatial domain of the carrier signal is used together with a selected raw bit value to compute the value of the image sample at the same location in the watermark information signal.

With this background, the embedder proceeds to encode each raw bit in the selected transform domain as follows. If uses the assignment map to look up the position of the corresponding image sample (or samples) in the carrier signal. The image sample value at that position in the carrier controls the value of the corresponding position in the watermark information signal. In particular, the carrier sample value indicates whether to invert the corresponding watermark sample value. The raw bit value is either a one or zero. Disregarding for a moment the impact of the carrier signal, the embedder adjusts the corresponding watermark sample upward to represent a one, or downward to represent a zero. Now, if the carrier signal indicates that the corresponding sample should be inverted, the embedder adjusts the watermark sample downward to represent a one, and upward to represent a zero. In this manner, the embedder computes the value of the watermark samples for a raw bit using the assignment map to find the spatial location of those samples within the block.

From this example, a number of points can be made. First, the embedder may perform a similar approach in any other transform domain. Second, for each raw bit, the corresponding watermark sample or samples are some function of the raw bit value and the carrier signal value. The specific mathematical relationship between the watermark sample, on one hand, and the raw bit value and carrier signal, on the other, may vary with the implementation. For example, the message may be convolved with the carrier, multiplied with the carrier, added to the carrier, or applied based on another non-linear function. Third, the carrier signal may remain constant for a particular application, or it may vary from one message to another. For example, a secret key may be used to generate the carrier signal. For each raw bit, the assignment map may define a pattern of watermark samples in the transform domain in which the watermark is defined. An assignment map that maps a raw bit to a sample location or set of locations (i.e. a map to locations in a frequency or spatial domain) is just one special case of an assignment map for a transform domain. Fourth, the assignment map may remain constant, or it may vary from one message to another. In addition, the carrier signal and map may vary depending on the nature of the underlying image. In sum, there many possible design choices within the implementation framework described above.

The embedder depicted in FIG. 2 combines another watermark component, shown as the detection watermark 216, with the watermark information signal to compute the final watermark signal. The detection watermark is specifically chosen to assist in identifying the watermark and computing its orientation in a detection operation.

Figure 3:
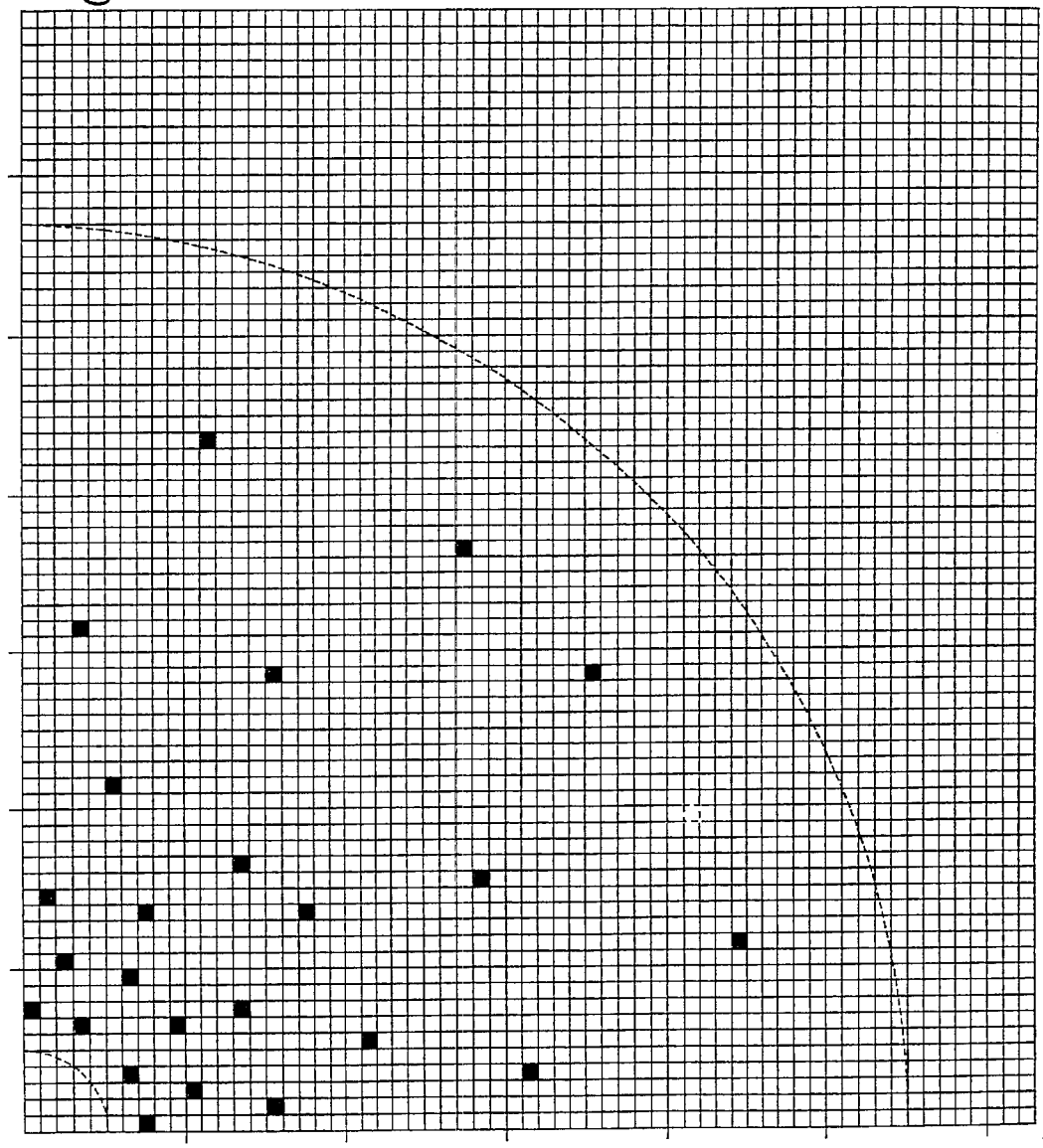
FIG. 3 is a spatial frequency domain plot of a detection watermark signal.

FIG. 3 is a spatial frequency plot illustrating one quadrant of a detection watermark. The points in the plot represent impulse functions indicating signal content of the detection watermark signal. The pattern of impulse functions for the illustrated quadrant is replicated in all four quadrants. There are a number of properties of the detection pattern that impact its effectiveness for a particular application. The selection of these properties is highly dependent on the application. One property is the extent to which the pattern is symmetric about one or more axes. For example, if the detection pattern is symmetrical about the horizontal and vertical axes, it is referred to as being quad symmetric. If it is further symmetrical about diagonal axes at an angle of 45 degrees, it is referred to as being octally symmetric (repeated in a symmetric pattern 8 times about the origin). Such symmetry aids in identifying the watermark in an image, and aids in extracting the rotation angle. However, in the case of an octally symmetric pattern, the detector includes an additional step of testing which of the four quadrants the orientation angle falls into.

Another criterion is the position of the impulse functions and the frequency range that they reside in. Preferably, the impulse functions fall in a mid frequency range. If they are located in a low frequency range, they may be noticeable in the watermarked image. If they are located in the high frequency range, they are more difficult to recover. Also, they should be selected so that scaling, rotation, and other manipulations of the watermarked signal do not push the impulse functions outside the range of the detector. Finally, the impulse functions should preferably not fall on the vertical or horizontal axes, and each impulse function should have a unique horizontal and vertical location. While the example depicted in FIG. 3 shows that some of the impulse functions fall on the same horizontal axis, it is trivial to alter the position of the impulse functions such that each has a unique vertical or horizontal coordinate.

Returning to FIG. 2, the embedder makes a perceptual analysis 218 of the input image 220 to identify portions of the image that can withstand more watermark signal content without substantially impacting image fidelity. Generally, the perceptual analysis employs a HVS model to identify signal frequency bands and/or spatial areas to increase or decrease watermark signal intensity to make the watermark imperceptible to an ordinary observer. One type of model is to increase watermark intensity in frequency bands and spatial areas where there is more image activity. In these areas, the sample values are changing more than other areas and have more signal strength. The output of the perceptual analysis is a perceptual mask 222. The mask may be implemented as an array of functions, which selectively increase the signal strength of the watermark signal based on a HVS model analysis of the input image. The mask may selectively increase or decrease the signal strength of the watermark signal in areas of greater signal activity.

The embedder combines (224) the watermark information, the detection signal and the perceptual mask to yield the watermark signal 226. Finally, it combines (228) the input image 220 and the watermark signal 226 to create the watermarked image 230. In the frequency domain watermark example above, the embedder combines the transform domain coefficients in the watermark signal to the corresponding coefficients in the input image to create a frequency domain representation of the watermarked image. It then transforms the image into the spatial domain. As an alternative, the embedder may be designed to convert the watermark into the spatial domain, and then add it to the image.

In the spatial watermark example above, the embedder combines the image samples in the watermark signal to the corresponding samples in the input image to create the watermarked image 230.

The embedder may employ an invertible or non-invertible, and linear or non-linear function to combine the watermark signal and the input image (e.g., linear functions such as $S^*=S+gX$; or $S^*=S(1+gX)$, convolution, quantization index modulation). The net effect is that some image samples in the input image are adjusted upward, while others are adjusted downward. The extent of the adjustment is greater in areas or subbands of the image having greater signal activity.

2.2. Overview of a Detector and Reader

FIG. 4 is a flow diagram illustrating an overview of a watermark detection process. This process analyzes image data 400 to search for an orientation pattern of a watermark in an image suspected of containing the watermark (the target image). First, the detector transforms the image data to another domain 402, namely the spatial frequency domain, and then performs a series of correlation or other detection operations 404. The correlation operations match the orientation pattern with the target image data to detect the presence of the watermark and its orientation parameters 406 (e.g., translation, scale, rotation, and differential scale relative to its original orientation). Finally, it re-orients the image data based on one or more of the orientation parameters 408.

If the orientation of the watermark is recovered, the reader extracts the watermark information signal from the image data (optionally by first re-orienting the data based on the orientation parameters). FIG. 5 is flow diagram illustrating a process of extracting a message from re-oriented image data 500. The reader scans the image samples (e.g., pixels or transform domain coefficients) of the re-oriented image (502), and uses known attributes of the watermark signal to estimate watermark signal values 504. Recall that in one example implementation described above, the embedder adjusted sample values (e.g., frequency coefficients, color values, etc.) up or down to embed a watermark information signal. The reader uses this attribute of the watermark information signal to estimate its value from the target image. Prior to making these estimates, the reader may filter the image to remove portions of the image signal that may interfere with the estimating process. For example, if the watermark signal is expected to reside in low or medium frequency bands, then high frequencies may be filtered out.

In addition, the reader may predict the value of the original un-watermarked image to enhance message recovery. One form of prediction uses temporal or spatial neighbors to estimate a sample value in the original image. In the frequency domain, frequency coefficients of the original signal can be predicted from neighboring frequency coefficients in the same frequency subband. In video applications for example, a frequency coefficient in a frame can be predicted from spatially neighboring coefficients within the same frame, or temporally neighboring coefficients in adjacent frames or fields. In the spatial domain, intensity values of a pixel can be estimated from intensity values of neighboring pixels. Having predicted the value of a signal in the original, un-watermarked image, the reader then estimates the watermark signal by calculating an inverse of the watermarking function used to combine the watermark signal with the original signal.

For such watermark signal estimates, the reader uses the assignment map to find the corresponding raw bit position and image sample in the carrier signal (506). The value of the raw bit is a function of the watermark signal estimate, and the carrier signal at the corresponding location in the carrier. To estimate the raw bit value, the reader solves for its value based on the carrier signal and the watermark signal estimate. As reflected generally in FIG. 5 (508), the result of this computation represents only one estimate to be analyzed along with other estimates impacting the value of the corresponding raw bit. Some estimates may indicate that the raw bit is likely to be a one, while others may indicate that it is a zero. After the reader completes its scan, it compiles the estimates for each bit position in the raw bit string, and makes a determination of the value of each bit at that position (510). Finally, it performs the inverse of the error correction coding scheme to construct the message (512). In some implementations, probablistic models may be employed to determine the likelihood that a particular pattern of raw bits is just a random occurrence rather than a watermark.

2.2.1 Example Illustrating Detector Process

Figure 6:
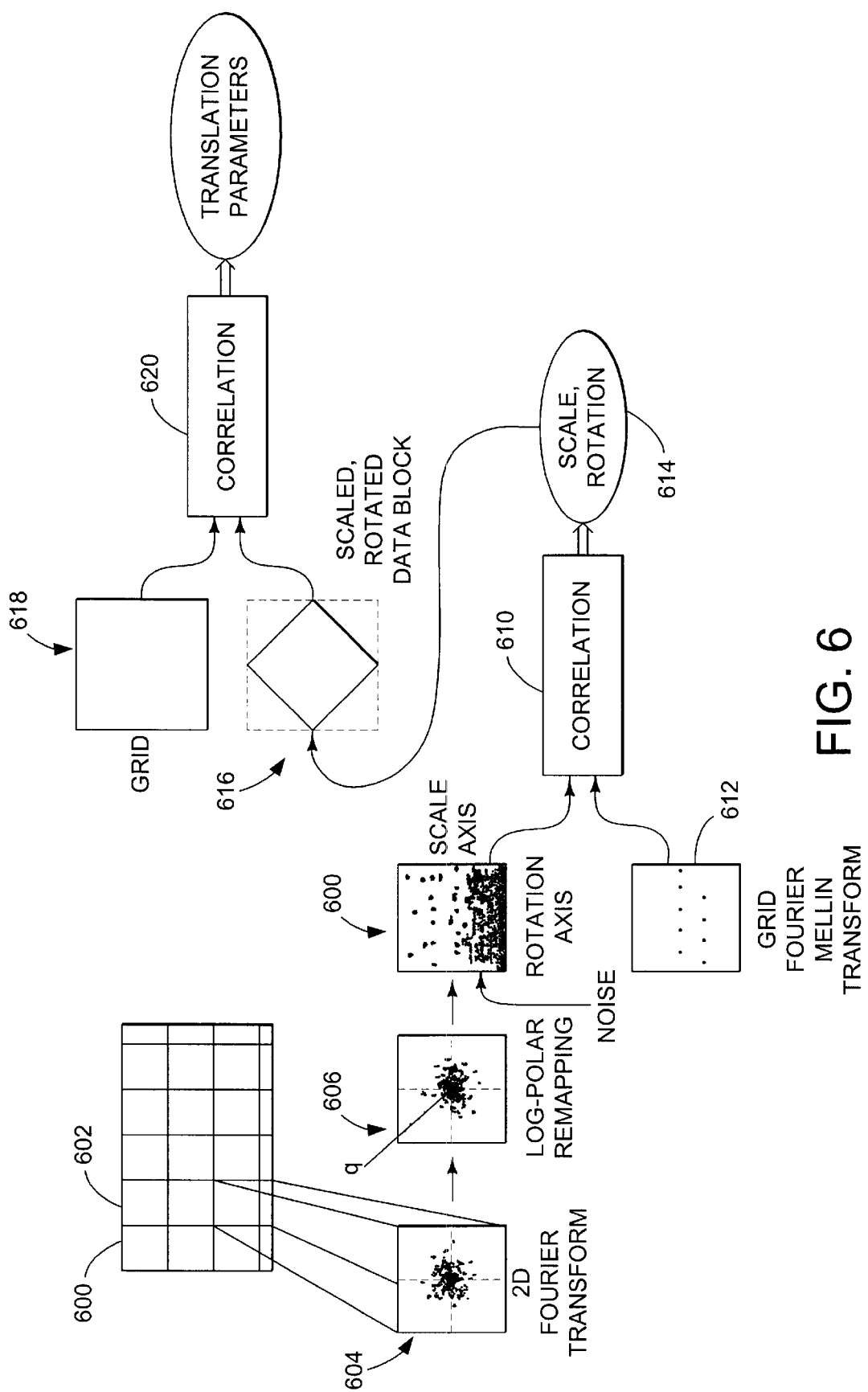
FIG. 6 is a diagram depicting an example of a watermark detection process.

FIG. 6 is a diagram depicting an example of a watermark detection process. The detector segments the target image into blocks (e.g., 600, 602) and then performs a 2-dimensional fast fourier transform (2D FFT) on several blocks. This process yields 2D transforms of the magnitudes of the image contents of the blocks in the spatial frequency domain as depicted in the plot 604 shown in FIG. 6.

Next, the detector process performs a log polar remapping of each transformed block. The detector may add some of the blocks together to increase the watermark signal to noise ratio. The type of remapping in this implementation is referred to as a Fourier Mellin transform. The Fourier Mellin transform is a geometric transform that warps the image data from a frequency domain to a log polar coordinate system. As depicted in the plot 606 shown in FIG. 6, this transform sweeps through the transformed image data along a line at angle θ, mapping the data to a log polar coordinate system shown in the next plot 608. The log polar coordinate system has a rotation axis, representing the angle θ, and a scale axis. Inspecting the transformed data at this stage, one can see the orientation pattern of the watermark begin to be distinguishable from the noise component (i.e., the image signal).

Next, the detector performs a correlation 610 between the transformed image block and the transformed orientation pattern 612. At a high level, the correlation process slides the orientation pattern over the transformed image (in a selected transform domain, such as a spatial frequency domain) and measures the correlation at an array of discrete positions. Each such position has a corresponding scale and rotation parameter associated with it. Ideally, there is a position that clearly has the highest correlation relative to all of the others. In practice, there may be several candidates with a promising measure of correlation. As explained further below, these candidates may be subjected to one or more additional correlation stages to select the one that provides the best match.

There are a variety of ways to implement the correlation process. Any number of generalized matching filters may be implemented for this purpose. One such filter performs an FFT on the target and the orientation pattern, and multiplies the resulting arrays together to yield a multiplied FFT. Finally, it performs an inverse FFT on the multiplied FFT to return the data into its original log-polar domain. The position or positions within this resulting array with the highest magnitude represent the candidates with the highest correlation.

When there are several viable candidates, the detector can select a set of the top candidates and apply an additional correlation stage. Each candidate has a corresponding rotation and scale parameter. The correlation stage rotates and scales the FFT of the orientation pattern and performs a matching operation with the rotated and scaled pattern on the FFT of the target image. The matching operation multiplies the values of the transformed pattern with sample values at corresponding positions in the target image and accumulates the result to yield a measure of the correlation. The detector repeats this process for each of the candidates and picks the one with the highest measure of correlation. As shown in FIG. 6, the rotation and scale parameters (614) of the selected candidate are then used to find additional parameters that describe the orientation of the watermark in the target image.

The detector applies the scale and rotation to the target data block 616 and then performs another correlation process between the orientation pattern 618 and the scaled and rotated data block 616. The correlation process 620 is a generalized matching filter operation. It provides a measure of correlation for an array of positions that each has an associated translation parameter (e.g., an x, y position). Again, the detector may repeat the process of identifying promising candidates (i.e. those that reflect better correlation relative to others) and using those in an additional search for a parameter or set of orientation parameters that provide a better measure of correlation.

At this point, the detector has recovered the following orientation parameters: rotation, scale and translation. For many applications, these parameters may be sufficient to enable accurate reading of the watermark. In the read operation, the reader applies the orientation parameters to re-orient the target image and then proceeds to extract the watermark signal.

In some applications, the watermarked image may be stretched more in one spatial dimension than another. This type of distortion is sometimes referred to as differential scale or shear. Consider that the original image blocks are square. As a result of differential scale, each square may be warped into a parallelogram with unequal sides. Differential scale parameters define the nature and extent of this stretching.

There are several alternative ways to recover the differential scale parameters. One general class of techniques is to use the known parameters (e.g., the computed scale, rotation, and translation) as a starting point to find the differential scale parameters. Assuming the known parameters to be valid, this approach warps either the orientation pattern or the target image with selected amounts of differential scale and picks the differential scale parameters that yield the best correlation.

Another approach to determination of differential scale is set forth in application Ser. No. 09/452,022 (filed Nov. 30, 1999, and entitled Method and System for Determining Image Transformation, attorney docket 60057).

2.2.2 Example Illustrating Reader Process

Figure 7:
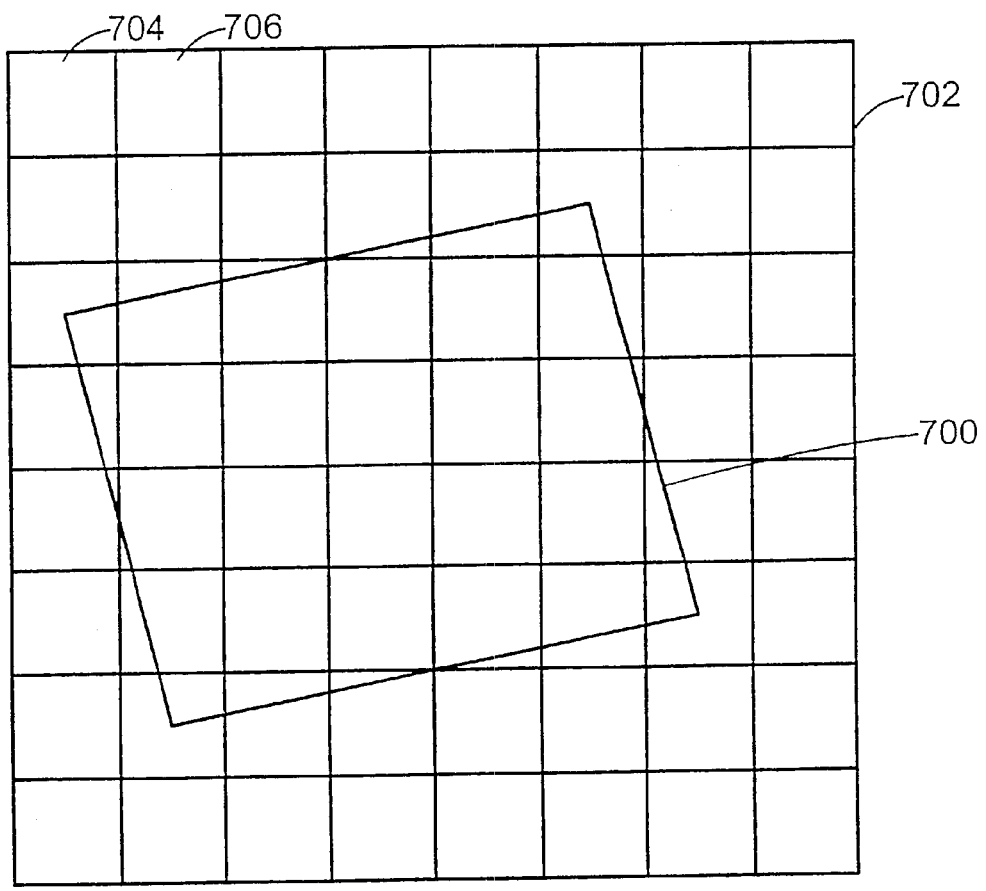
FIG. 7 is a diagram depicting the orientation of a transformed image superimposed over the original orientation of the image at the time of watermark encoding.

FIG. 7 is a diagram illustrating a re-oriented image 700 superimposed onto the original watermarked image 702. The difference in orientation and scale shows how the image was transformed and edited after the embedding process. The original watermarked image is sub divided into tiles (e.g., pixel blocks 704, 706, etc.). When superimposed on the coordinate system of the original image 702 shown in FIG. 7, the target image blocks typically do not match the orientation of the original blocks.

The reader scans samples of the re-oriented image data, estimating the watermark information signal. It estimates the watermark information signal, in part, by predicting original sample values of the un-watermarked image. The reader then uses an inverted form of the watermarking function to estimate the watermark information signal from the watermarked signal and the predicted signal. This inverted watermarking function expresses the estimate of the watermark signal as a function of the predicted signal and the watermarked signal. Having an estimate of the watermark signal, it then uses the known relationship among the carrier signal, the watermark signal, and the raw bit to compute an estimate of the raw bit. Recall that samples in the watermark information signal are a function of the carrier signal and the raw bit value. Thus, the reader may invert this function to solve for an estimate of the raw bit value.

Recall that the embedder implementation discussed in connection with FIG. 2 redundantly encodes the watermark information signal in blocks of the input signal. Each raw bit may map to several samples within a block. In addition, the embedder repeats a mapping process for each of the blocks. As such, the reader generates several estimates of the raw bit value as it scans the watermarked image.

The information encoded in the raw bit string can be used to increase the accuracy of read operations. For instance, some of the raw bits act as signature bits that perform a validity checking function. Unlike unknown message bits, the reader knows the expected values of these signature bits. The reader can assess the validity of a read operation based on the extent to which the extracted signature bit values match the expected signature bit values. The estimates for a given raw bit value can then be given a higher weight depending on whether they are derived from a tile with a greater measure of validity.

3.0 Embedder Implementation

Figure 8:
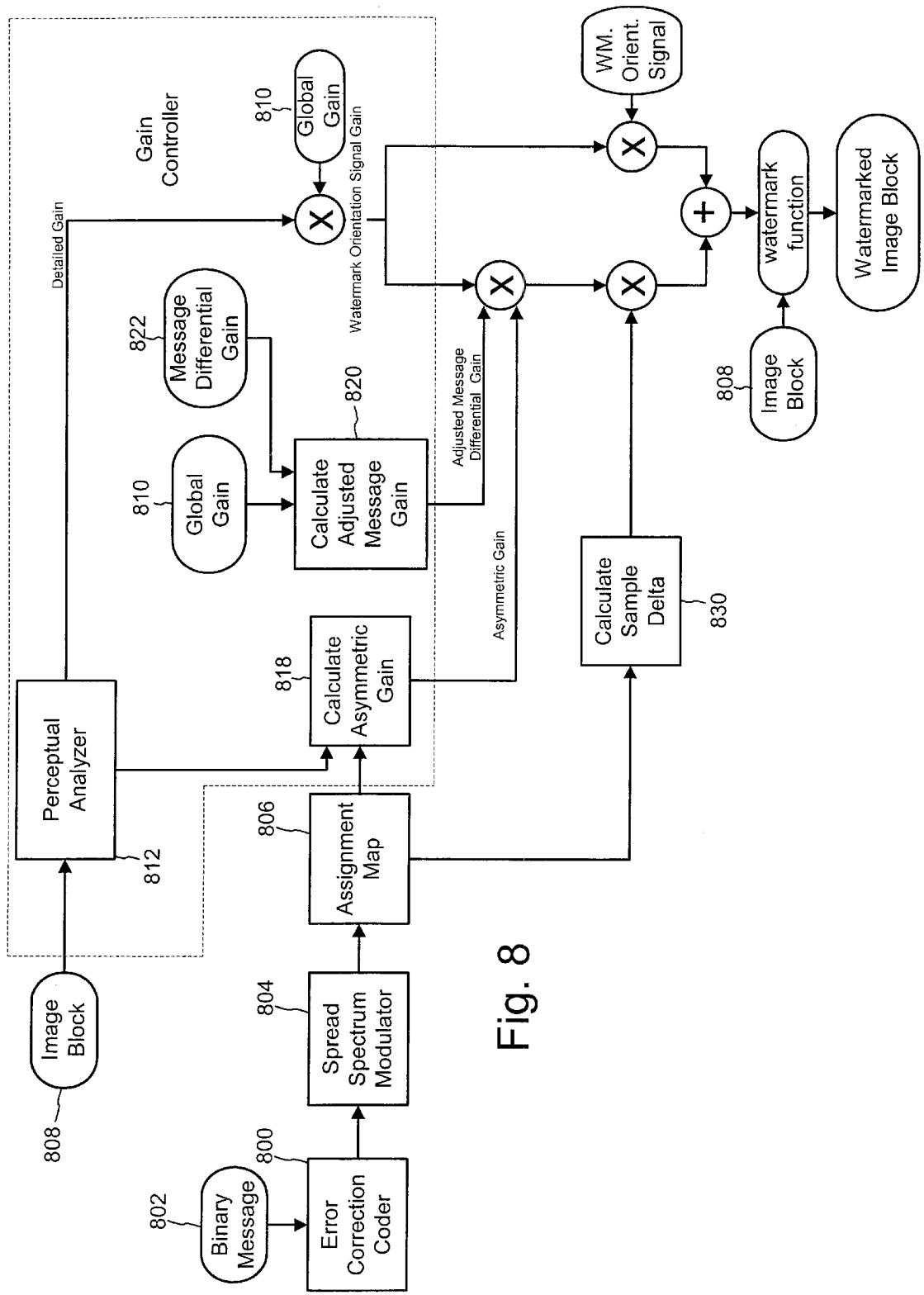
FIG. 8 is a diagram illustrating an implementation of a watermark embedder.

The following sections describe an implementation of the digital image watermark embedder depicted in FIG. 8. The embedder inserts two watermark components into the host image: a message component and a detection component (called the orientation pattern). The message component is defined in a spatial domain or other transform domain, while the orientation pattern is defined in a frequency domain. As explained later, the message component serves a dual function of conveying a message and helping to identify the watermark location in the image.

The embedder inserts the watermark message and orientation pattern in blocks of a selected color plane or planes (e.g., luminance or chrominance plane) of the host image. The message payload varies from one application to another, and can range from a single bit to the number of image samples in the domain in which it is embedded. The blocks may be blocks of samples in a spatial domain or some other transform domain.

3.1 Encoding the Message

The embedder converts binary message bits into a series of binary raw bits that it hides in the host image. As part of this process, a message encoder 800 appends certain known bits to the message bits 802. It performs an error detection process (e.g., parity, Cyclic Redundancy Check (CRC), etc.) to generate error detection bits and adds the error detection bits to the message. An error correction coding operation then generates raw bits from the combined known and message bit string.

For the error correction operation, the embedder may employ any of a variety of error correction codes such as Reed Solomon, BCH, convolution or turbo codes. The encoder may perform an M-ary modulation process on the message bits that maps groups of message bits to a message signal based on an M-ary symbol alphabet.

In one application of the embedder, the component of the message representing the known bits is encoded more redundantly than the other message bits. This is an example of a shorter message component having greater signal strength than a longer, weaker message component. The embedder gives priority to the known bits in this scheme because the reader uses them to verify that it has found the watermark in a potentially corrupted image, rather than a signal masquerading as the watermark.

3.2 Spread Spectrum Modulation

The embedder uses spread spectrum modulation as part of the process of creating a watermark signal from the raw bits. A spread spectrum modulator 804 spreads each raw bit into a number of "chips." The embedder generates a pseudo random number that acts as the carrier signal of the message. To spread each raw bit, the modulator performs an exclusive OR (XOR) operation between the raw bit and each bit of a pseudo random binary number of a pre-determined length. The length of the pseudo random number depends, in part, on the size of the message and the image. Preferably, the pseudo random number should contain roughly the same number of zeros and ones, so that the net effect of the raw bit on the host image block is zero. If a bit value in the pseudo random number is a one, the value of the raw bit is inverted. Conversely, if the bit value is a zero, then the value of the raw bit remains the same.

The length of the pseudorandom number may vary from one message bit or symbol to another. By varying the length of the number, some message bits can be spread more than others.

3.3 Scattering the Watermark Message

The embedder scatters each of the chips corresponding to a raw bit throughout an image block. An assignment map 806 assigns locations in the block to the chips of each raw bit. Each raw bit is spread over several chips. As noted above, an image block may represent a block of transform domain coefficients or samples in a spatial domain. The assignment map may be used to encode some message bits or symbols (e.g., groups of bits) more redundantly than others by mapping selected bits to more locations in the host signal than other message bits. In addition, it may be used to map different messages, or different components of the same message, to different locations in the host signal.

Figure 9:
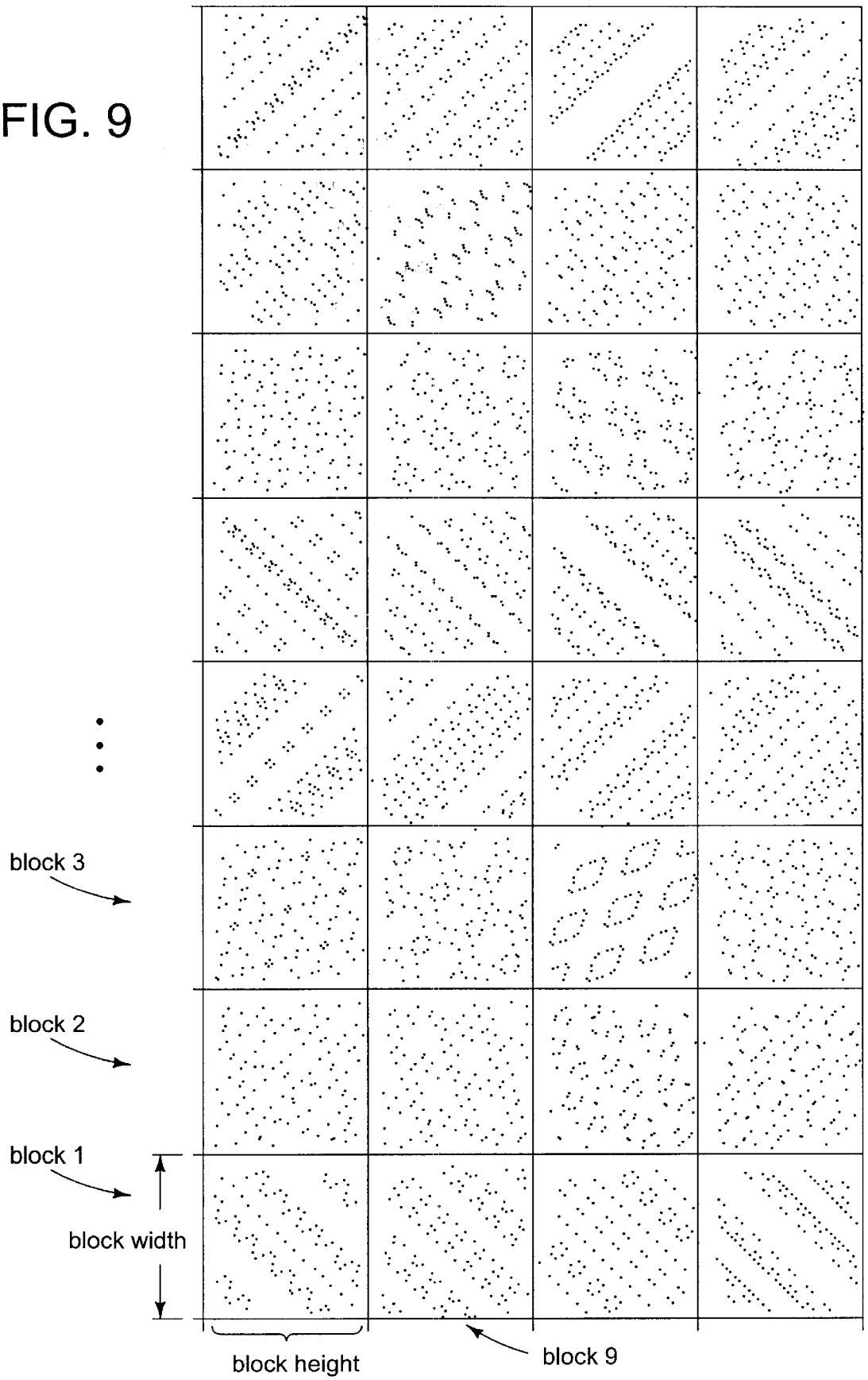
FIG. 9 is a diagram depicting an assignment map used to map raw bits in a message to locations within a host image.

FIG. 9 depicts an example of the assignment map. Each of the blocks in FIG. 9 correspond to an image block and depict a pattern of chips corresponding to a single raw bit. FIG. 9 depicts a total of 32 example blocks. The pattern within a block is represented as black dots on a white background. Each of the patterns is mutually exclusive such that each raw bit maps to a pattern of unique locations relative to the patterns of every other raw bit. Though not a requirement, the combined patterns, when overlapped, cover every location within the image block.

3.4 Gain Control and Perceptual Analysis

To insert the information carried in a chip to the host image, the embedder alters the corresponding sample value in the host image. In particular, for a chip having a value of one, it adds to the corresponding sample value, and for a chip having a value of zero, it subtracts from the corresponding sample value. A gain controller in the embedder adjusts the extent to which each chip adds or subtracts from the corresponding sample value.

The gain controller takes into account the orientation pattern when determining the gain. It applies a different gain to the orientation pattern than to the message component of the watermark. After applying the gain, the embedder combines the orientation pattern and message components together to form the composite watermark signal, and combines the composite watermark with the image block. One way to combine these signal components is to add them, but other linear or non-linear functions may be used as well.

Figure 10:
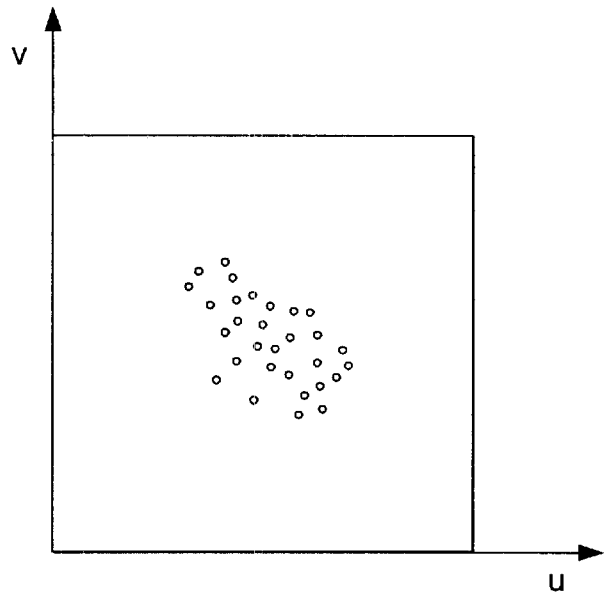
FIG. 10 illustrates an example of a watermark orientation signal in a spatial frequency domain.
Figure 11:
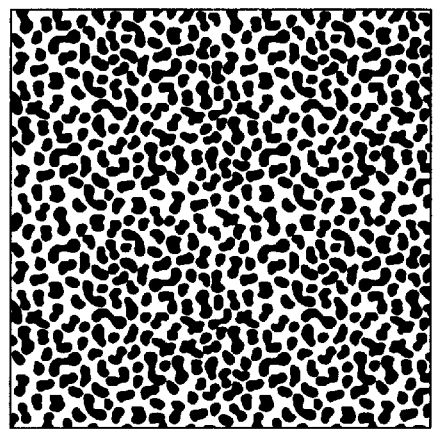
FIG. 11 illustrates the orientation signal shown in FIG. 10 in the spatial domain.

The orientation pattern is comprised of a pattern of quad symmetric impulse functions in the spatial frequency domain. In the spatial domain, these impulse functions look like cosine waves. An example of the orientation pattern is depicted in FIGS. 10 and 11. FIG. 10 shows the impulse functions as points in the spatial frequency domain, while FIG. 11 shows the orientation pattern in the spatial domain. Before adding the orientation pattern component to the message component, the embedder may transform the watermark components to a common domain. For example, if the message component is in a spatial domain and the orientation component is in a frequency domain, the embedder transforms the orientation component to a common spatial domain before combining them together.

FIG. 8 depicts the gain controller used in the embedder. Note that the gain controller operates on the blocks of image samples 808, the message watermark signal, and a global gain input 810, which may be specified by the user. A perceptual analyzer component 812 of the gain controller performs a perceptual analysis on the block to identify samples that can tolerate a stronger watermark signal without substantially impacting visibility. In places where the naked eye is less likely to notice the watermark, the perceptual analyzer increases the strength of the watermark. Conversely, it decreases the watermark strength where the eye is more likely to notice the watermark.

The perceptual analyzer shown in FIG. 8 performs a series of filtering operations on the image block to compute an array of gain values. There are a variety of filters suitable for this task. These filters include an edge detector filter that identifies edges of objects in the image, a non-linear filter to map gain values into a desired range, and averaging or median filters to smooth the gain values. Each of these filters may be implemented as a series of one-dimensional filters (one operating on rows and the other on columns) or two-dimensional filters. The size of the filters (i.e. the number of samples processed to compute a value for a given location) may vary (e.g., 3 by 3, 5 by 5, etc.). The shape of the filters may vary as well (e.g., square, cross-shaped, etc.). The perceptual analyzer process produces a detailed gain multiplier. The multiplier is a vector with elements corresponding to samples in a block.

Another component 818 of the gain controller computes an asymmetric gain based on the output of the image sample values and message watermark signal. This component analyzes the samples of the block to determine whether they are consistent with the message signal. The embedder reduces the gain for samples whose values relative to neighboring values are consistent with the message signal.

The embedder applies the asymmetric gain to increase the chances of an accurate read in the watermark reader. To understand the effect of the asymmetric gain, it is helpful to explain the operation of the reader. The reader extracts the watermark message signal from the watermarked signal using a predicted version of the original signal. It estimates the watermark message signal value based on values of the predicted signal and the watermarked signal at locations of the watermarked signal suspected of containing a watermark signal. There are several ways to predict the original signal. One way is to compute a local average of samples around the sample of interest. The average may be computed by taking the average of vertically adjacent samples, horizontally adjacent samples, an average of samples in a cross-shaped filter (both vertical and horizontal neighbors, an average of samples in a square-shaped filter, etc. The estimate may be computed one time based on a single predicted value from one of these averaging computations. Alternatively, several estimates may be computed based on two or more of these averaging computations (e.g., one estimate for vertically adjacent samples and another for horizontally adjacent samples). In the latter case, the reader may keep estimates if they satisfy a similarity metric. In other words, the estimates are deemed valid if they within a predetermined value or have the same polarity.

Knowing this behavior of the reader, the embedder computes the asymmetric gain as follows. For samples that have values relative to their neighbors that are consistent with the watermark signal, the embedder reduces the asymmetric gain. Conversely, for samples that are inconsistent with the watermark signal, the embedder increases the asymmetric gain. For example, if the chip value is a one, then the sample is consistent with the watermark signal if its value is greater than its neighbors. Alternatively, if the chip value is a zero, then the sample is consistent with the watermark signal if its value is less than its neighbors.

Another component 820 of the gain controller computes a differential gain, which represents an adjustment in the message vs. orientation pattern gains. As the global gain increases, the embedder emphasizes the message gain over the orientation pattern gain by adjusting the global gain by an adjustment factor. The inputs to this process 820 include the global gain 810 and a message differential gain 822. When the global gain is below a lower threshold, the adjustment factor is one. When the global gain is above an upper threshold, the adjustment factor is set to an upper limit greater than one. For global gains falling within the two thresholds, the adjustment factor increases linearly between one and the upper limit. The message differential gain is the product of the adjustment factor and the global gain.

At this point, there are four sources of gain: the detailed gain, the global gain, the asymmetric gain, and the message dependent gain. The embedder applies the first two gain quantities to both the message and orientation watermark signals. It only applies the latter two to the message watermark signal. FIG. 8 depicts how the embedder applies the gain to the two watermark components. First, it multiplies the detailed gain with the global gain to compute the orientation pattern gain. It then multiplies the orientation pattern gain with the adjusted message differential gain and asymmetric gain to form the composite message gain.

Finally, the embedder forms the composite watermark signal. It multiplies the composite message gain with the message signal, and multiplies the orientation pattern gain with the orientation pattern signal. It then combines the result in a common transform domain to get the composite watermark. The embedder applies a watermarking function to combine the composite watermark to the block to create a watermarked image block. The message and orientation components of the watermark may be combined by mapping the message bits to samples of the orientation signal, and modulating the samples of the orientation signal to encode the message.

The embedder computes the watermark message signal by converting the output of the assignment map 806 to delta values, indicating the extent to which the watermark signal changes the host signal. As noted above, a chip value of one corresponds to an upward adjustment of the corresponding sample, while a chip value of zero corresponds to a downward adjustment. The embedder specifies the specific amount of adjustment by assigning a delta value to each of the watermark message samples (830).

4.0 Detector Implementation

Figure 12:
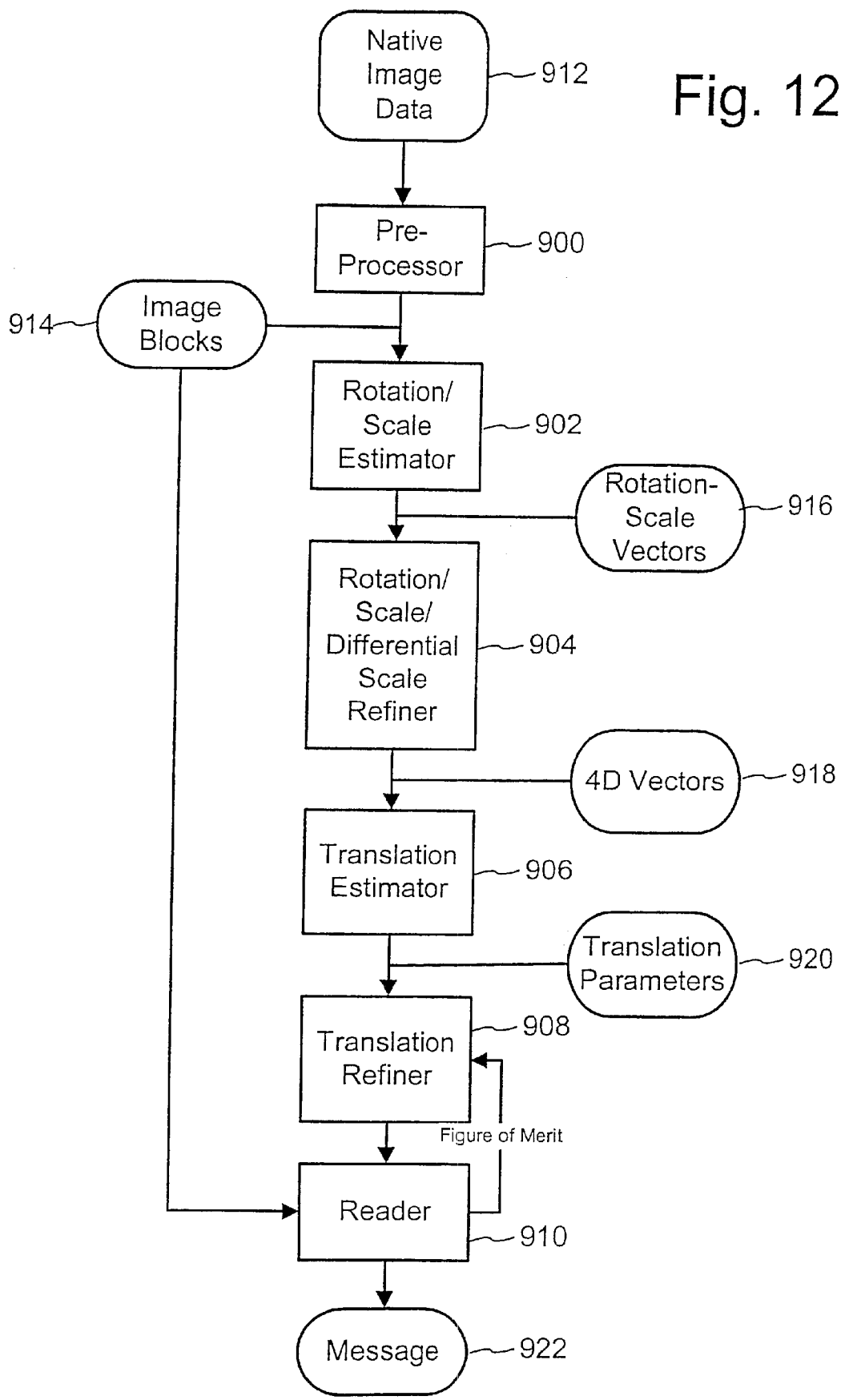
FIG. 12 is a diagram illustrating an overview of a watermark detector implementation.

FIG. 12 illustrates an overview of a watermark detector that detects the presence of a detection watermark in a host image and its orientation. Using the orientation pattern and the known bits inserted in the watermark message, the detector determines whether a potentially corrupted image contains a watermark, and if so, its orientation in the image.

Recall that the composite watermark is replicated in blocks of the original image. After an embedder places the watermark in the original digital image, the watermarked image is likely to undergo several transformations, either from routine processing or from intentional tampering. Some of these transformations include: compression, decompression, color space conversion, digital to analog conversion, printing, scanning, analog to digital conversion, scaling, rotation, inversion, flipping differential scale, and lens distortion. In addition to these transformations, various noise sources can corrupt the watermark signal, such as fixed pattern noise, thermal noise, etc.

When building a detector implementation for a particular application, the developer may implement counter-measures to mitigate the impact of the types of transformations, distortions and noise expected for that application. Some applications may require more counter-measures than others. The detector described below is designed to recover a watermark from a watermarked image after the image has been printed, and scanned. The following sections describe the counter-measures to mitigate the impact of various forms of corruption. The developer can select from among these counter-measures when implementing a detector for a particular application.

For some applications, the detector will operate in a system that provides multiple image frames of a watermarked object. One typical example of such a system is a computer equipped with a digital camera. In such a configuration, the digital camera can capture a temporal sequence of images as the user or some device presents the watermarked image to the camera.

As shown in FIG. 12, the principal components of the detector are: 1) pre-processor 900; 2) rotation and scale estimator 902; 3) orientation parameter refiner 904; 4) translation estimator 906; 5) translation refiner 908; and reader 910.

The preprocessor 900 takes one or more frames of image data 912 and produces a set of image blocks 914 prepared for further analysis. The rotation-scale estimator 902 computes rotation-scale vectors 916 that estimate the orientation of the orientation signal in the image blocks. The parameter refiner 904 collects additional evidence of the orientation signal and further refines the rotation scale vector candidates by estimating differential scale parameters. The result of this refining stage is a set of 4D vectors candidates 918 (rotation, scale, and two differential scale parameters). The translation estimator 906 uses the 4D vector candidates to re-orient image blocks with promising evidence of the orientation signal. It then finds estimates of translation parameters 920. The translation refiner 908 invokes the reader 910 to assess the merits of an orientation vector. When invoked by the detector, the reader uses the orientation vector to approximate the original orientation of the host image and then extracts values for the known bits in the watermark message. The detector uses this information to assess the merits of and refine orientation vector candidates.

By comparing the extracted values of the known bits with the expected values, the reader provides a figure of merit for an orientation vector candidate. The translation refiner then picks a 6D vector, including rotation, scale, differential scale and translation, that appears likely produce a valid read of the watermark message 922. The following sections describe implementations of these components in more detail.

4.1 Detector Pre-processing

Figure 13:
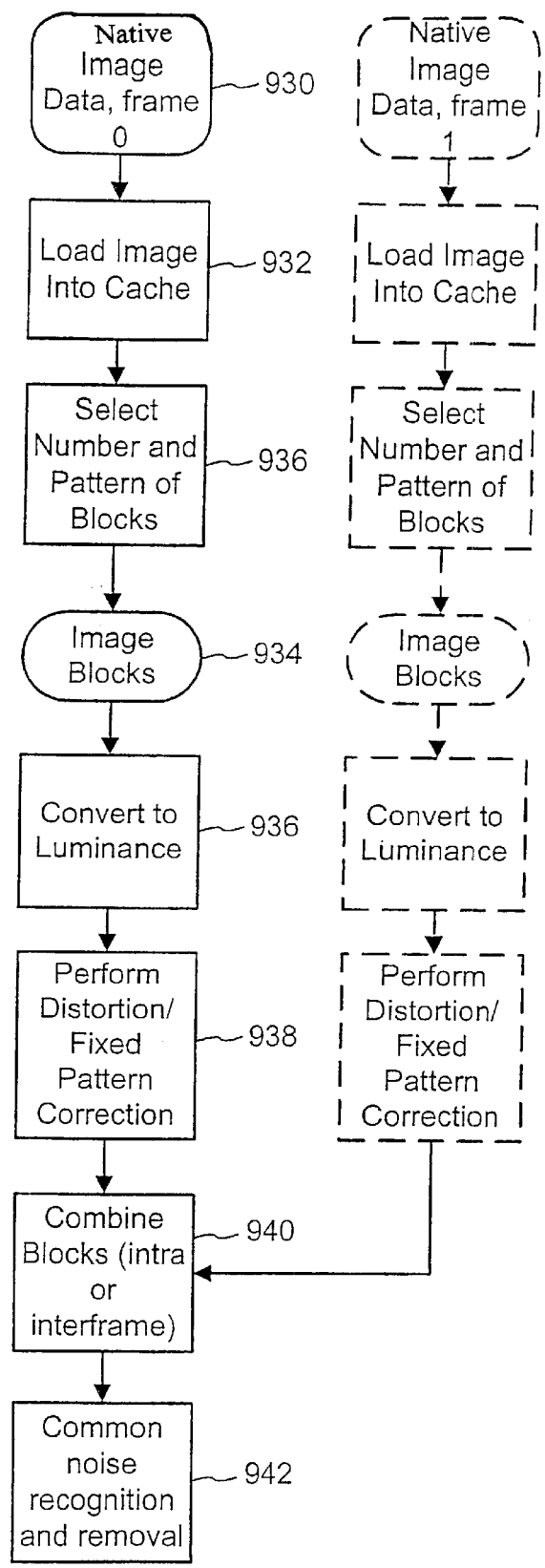
FIG. 13 is a diagram illustrating an implementation of the detector pre-processor depicted generally in FIG. 12.

FIG. 13 is a flow diagram illustrating preprocessing operations in the detector shown in FIG. 12. The detector performs a series of pre-processing operations on the native image 930 to prepare the image data for further analysis. It begins by filling memory with one or more frames of native image data (932), and selecting sets of pixel blocks 934 from the native image data for further analysis (936). While the detector can detect a watermark using a single image frame, it also has support for detecting the watermark using additional image frames. As explained below, the use of multiple frames has the potential for increasing the chances of an accurate detection and read.

In applications where a camera captures an input image of a watermarked object, the detector may be optimized to address problems resulting from movement of the object. Typical PC cameras, for example, are capable of capturing images at a rate of at least 10 frames a second. A frustrated user might attempt to move the object in an attempt to improve detection. Rather than improving the chances of detection, the movement of the object changes the orientation of the watermark from one frame to the next, potentially making the watermark more difficult to detect. One way to address this problem is to buffer one or more frames, and then screen the frame or frames to determine if they are likely to contain a valid watermark signal. If such screening indicates that a frame is not likely to contain a valid signal, the detector can discard it and proceed to the next frame in the buffer, or buffer a new frame. Another enhancement is to isolate portions of a frame that are most likely to have a valid watermark signal, and then perform more detailed detection of the isolated portions.

After loading the image into the memory, the detector selects image blocks 934 for further analysis. It is not necessary to load or examine each block in a frame because it is possible to extract the watermark using only a portion of an image. The detector looks at only a subset of the samples in an image, and preferably analyzes samples that are more likely to have a recoverable watermark signal.

The detector identifies portions of the image that are likely to have the highest watermark signal to noise ratio. It then attempts to detect the watermark signal in the identified portions. In the context of watermark detection, the host image is considered to be a source of noise along with conventional noise sources. While it is typically not practical to compute the signal to noise ratio, the detector can evaluate attributes of the signal that are likely to evince a promising watermark signal to noise ratio. These properties include the signal activity (as measured by sample variance, for example), and a measure of the edges (abrupt changes in image sample values) in an image block. Preferably, the signal activity of a candidate block should fall within an acceptable range, and the block should not have a high concentration of strong edges. One way to quantify the edges in the block is to use an edge detection filter (e.g., a LaPlacian, Sobel, etc.).

In one implementation, the detector divides the input image into blocks, and analyzes each block based on pre-determined metrics. It then ranks the blocks according to these metrics. The detector then operates on the blocks in the order of the ranking. The metrics include sample variance in a candidate block and a measure of the edges in the block. The detector combines these metrics for each candidate block to compute a rank representing the probability that it contains a recoverable watermark signal.

In another implementation, the detector selects a pattern of blocks and evaluates each one to try to make the most accurate read from the available data. In either implementation, the block pattern and size may vary. This particular implementation selects a pattern of overlapping blocks (e.g., a row of horizontally aligned, overlapping blocks). One optimization of this approach is to adaptively select a block pattern that increases the signal to noise ratio of the watermark signal. While shown as one of the initial operations in the preparation, the selection of blocks can be postponed until later in the pre-processing stage.

Next, the detector performs a color space conversion on native image data to compute an array of image samples in a selected color space for each block (936). In the following description, the color space is luminance, but the watermark may be encoded in one or more different color spaces. The objective is to get a block of image samples with lowest noise practical for the application. While the implementation currently performs a row by row conversion of the native image data into 8 bit integer luminance values, it may be preferable to convert to floating-point values for some applications. One optimization is to select a luminance converter that is adapted for the sensor used to capture the digital input image. For example, one might experimentally derive the lowest noise luminance conversion for commercially available sensors, e.g., CCD cameras or scanners, CMOS cameras, etc. Then, the detector could be programmed to select either a default luminance converter, or one tuned to a specific type of sensor.

At one or more stages of the detector, it may be useful to perform operations to mitigate the impact of noise and distortion. In the pre-processing phase, for example, it may be useful to evaluate fixed pattern noise and mitigate its effect (938). The detector may look for fixed pattern noise in the native input data or the luminance data, and then mitigate it.

One way to mitigate certain types of noise is to combine data from different blocks in the same frame, or corresponding blocks in different frames 940. This process helps augment the watermark signal present in the blocks, while reducing the noise common to the blocks. For example, merely adding blocks together may mitigate the effects of common noise.

In addition to common noise, other forms of noise may appear in each of the blocks such as noise introduced in the printing or scanning processes. Depending on the nature of the application, it may be advantageous to perform common noise recognition and removal at this stage 942. The developer may select a filter or series of filters to target certain types of noise that appear during experimentation with images. Certain types of median filters may be effective in mitigating the impact of spectral peaks (e.g., speckles) introduced in printing or scanning operations.

In addition to introducing noise, the printing and image capture processes may transform the color or orientation of the original, watermarked image. As described above, the embedder typically operates on a digital image in a particular color space and at a desired resolution. The watermark embedders normally operate on digital images represented in an RGB or CYMK color space at a desired resolution (e.g., 100 dpi or 300 dpi, the resolution at which the image is printed). The images are then printed on paper with a screen printing process that uses the CYMK subtractive color space at a line per inch (LPI) ranging from 65–200. 133 lines/in is typical for quality magazines and 73 lines/in is typical for newspapers. In order to produce a quality image and avoid pixelization, the rule of thumb is to use digital images with a resolution that is at least twice the press resolution. This is due to the half tone printing for color production. Also, different presses use screens with different patterns and line orientations and have different precision for color registration.

One way to counteract the transforms introduced through the printing process is to develop a model that characterizes these transforms and optimize watermark embedding and detecting based on this characterization. Such a model may be developed by passing watermarked and unwatermarked images through the printing process and observing the changes that occur to these images. The resulting model characterizes the changes introduced due to the printing process. The model may represent a transfer function that approximates the transforms due to the printing process. The detector then implements a pre-processing stage that reverses or at least mitigates the effect of the printing process on watermarked images. The detector may implement a pre-processing stage that performs the inverse of the transfer function for the printing process.

A related challenge is the variety in paper attributes used in different printing processes. Papers of various qualities, thickness and stiffness, absorb ink in various ways. Some papers absorb ink evenly, while others absorb ink at rates that vary with the changes in the paper's texture and thickness. These variations may degrade the embedded watermark signal when a digitally watermarked image is printed. The watermark process can counteract these effects by classifying and characterizing paper so that the embedder and reader can compensate for this printing-related degradation.

Variations in image capture processes also pose a challenge. In some applications, it is necessary to address problems introduced due to interlaced image data. Some video camera produce interlaced fields representing the odd or even scan lines of a frame. Problems arise when the interlaced image data consists of fields from two consecutive frames. To construct an entire frame, the preprocessor may combine the fields from consecutive frames while dealing with the distortion due to motion that occurs from one frame to the next. For example, it may be necessary to shift one field before interleaving it with another field to counteract inter-frame motion. A de-blurring function may be used to mitigate the blurring effect due to the motion between frames.

Another problem associated with cameras in some applications is blurring due to the lack of focus. The preprocessor can mitigate this effect by estimating parameters of a blurring function and applying a de-blurring function to the input image.

Yet another problem associated with cameras is that they tend to have color sensors that utilize different color pattern implementations. As such, a sensor may produce colors slightly different than those represented in the object being captured. Most CCD and CMOS cameras use an array of sensors to produce colored images. The sensors in the array are arranged in clusters of sensitive to three primary colors red, green, and blue according to a specific pattern. Sensors designated for a particular color are dyed with that color to increase their sensitivity to the designated color. Many camera manufacturers use a Bayer color pattern GR/BG. While this pattern produces good image quality, it causes color mis-registration that degrades the watermark signal. Moreover, the color space converter, which maps the signal from the sensors to another color space such as YUV or RGB, may vary from one manufacturer to another. One way to counteract the mis-registration of the camera's color pattern is to account for the distortion due to the pattern in a color transformation process, implemented either within the camera itself, or as a pre-processing function in the detector.

Another challenge in counteracting the effects of the image capture process is dealing with the different types of distortion introduced from various image capture devices. For example, cameras have different sensitivities to light. In addition, their lenses have different spherical distortion, and noise characteristics. Some scanners have poor color reproduction or introduce distortion in the image aspect ratio. Some scanners introduce aliasing and employ interpolation to increase resolution. The detector can counteract these effects in the pre-processor by using an appropriate inverse transfer function. An off-line process first characterizes the distortion of several different image capture devices (e.g., by passing test images through the scanner and deriving a transfer function modeling the scanner distortion). Some detectors may be equipped with a library of such inverse transfer functions from which they select one that corresponds to the particular image capture device Yet another challenge in applications where the image is printed on paper and later scanned is that the paper deteriorates over time and degrades the watermark. Also, varying lighting conditions make the watermark difficult to detect. Thus, the watermark may be selected so as to be more impervious to expected deterioration, and recoverable over a wider range of lighting conditions.

At the close of the pre-processing stage, the detector has selected a set of blocks for further processing. It then proceeds to gather evidence of the orientation signal in these blocks, and estimate the orientation parameters of promising orientation signal candidates. Since the image may have suffered various forms of corruption, the detector may identify several parts of the image that appear to have attributes similar to the orientation signal. As such, the detector may have to resolve potentially conflicting and ambiguous evidence of the orientation signal. To address this challenge, the detector estimates orientation parameters, and then refines theses estimates to extract the orientation parameters that are more likely to evince a valid signal than other parameter candidates.

4.2 Estimating Initial Orientation Parameters

Figure 14:
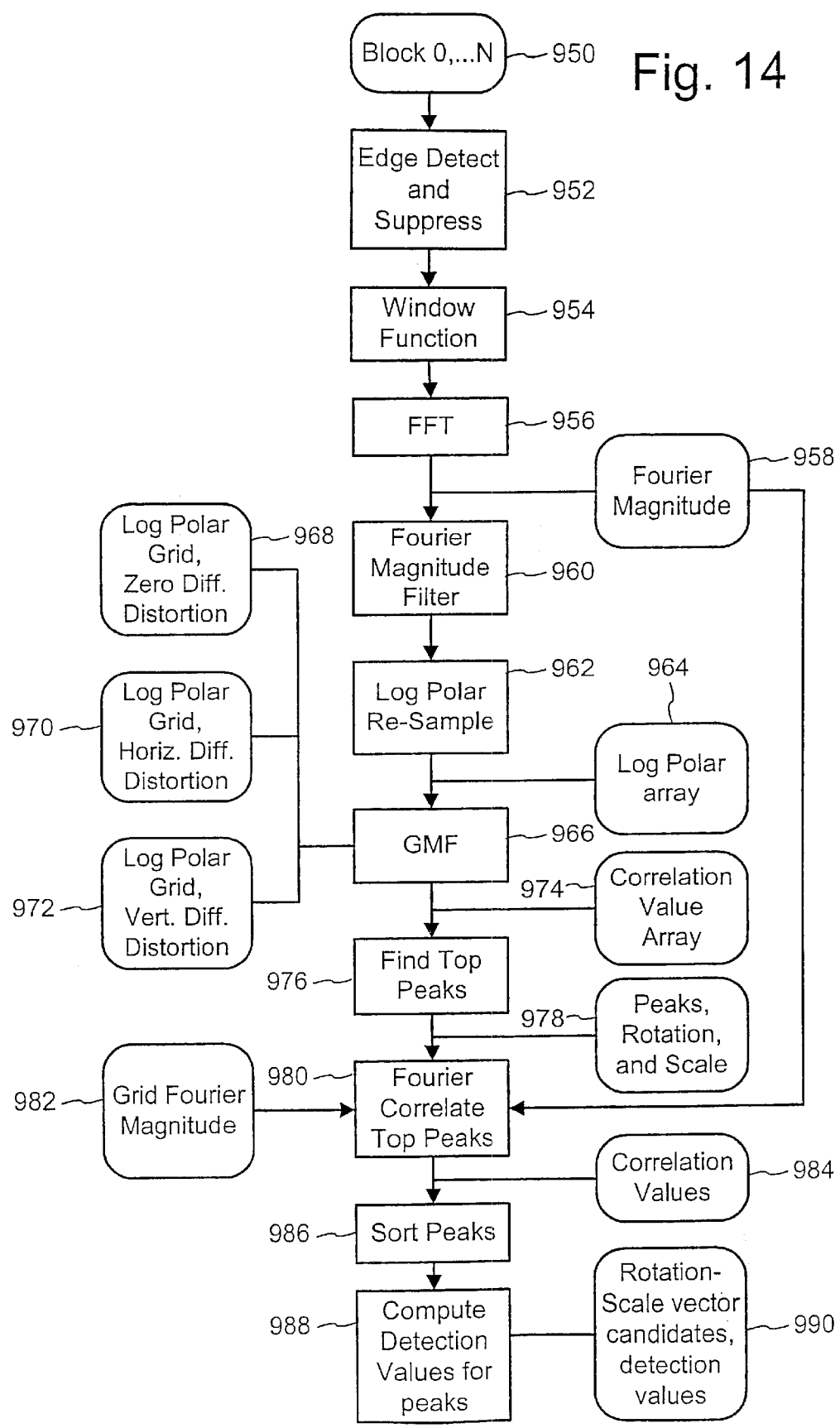
FIG. 14 is a diagram illustrating a process for estimating rotation and scale vectors of a detection watermark signal.

FIG. 14 is a flow diagram illustrating a process for estimating rotation-scale vectors. The detector loops over each image block (950), calculating rotation-scale vectors with the best detection values in each block. First, the detector filters the block in a manner that tends to amplify the orientation signal while suppressing noise, including noise from the host image itself (952). Implemented as a multi-axis LaPlacian filter, the filter highlights edges (e.g., high frequency components of the image) and then suppresses them. The term, "multi-axis," means that the filter includes a series of stages that each operates on particular axis. First, the filter operates on the rows of luminance samples, then operates on the columns, and adds the results. The filter may be applied along other axes as well. Each pass of the filter produces values at discrete levels. The final result is an array of samples, each having one of five values: $\{-2, -1, 0, 1, 2\}$.

Next, the detector performs a windowing operation on the block data to prepare it for an FFT transform (954). This windowing operation provides signal continuity at the block edges. The detector then performs an FFT (956) on the block, and retains only the magnitude component (958).

In an alternative implementation, the detector may use the phase signal produced by the FFT to estimate the translation parameter of the orientation signal. For example, the detector could use the rotation and scale parameters extracted in the process described below, and then compute the phase that provided the highest measure of correlation with the orientation signal using the phase component of the FFT process.

After computing the FFT, the detector applies a Fourier magnitude filter (960) on the magnitude components. The filter in the implementation slides over each sample in the Fourier magnitude array and filters the sample's eight neighbors in a square neighborhood centered at the sample. The filter boosts values representing a sharp peak with a rapid fall-off, and suppresses the fall-off portion. It also performs a threshold operation to clip peaks to an upper threshold.

Next, the detector performs a log-polar re-sample (962) of the filtered Fourier magnitude array to produce a log-polar array 964. This type of operation is sometimes referred to as a Fourier Mellin transform. The detector, or some off-line pre-processor, performs a similar operation on the orientation signal to map it to the log-polar coordinate system. Using matching filters, the detector implementation searches for a orientation signal in a specified window of the log-polar coordinate system. For example, consider that the log-polar coordinate system is a two dimensional space with the scale being the vertical axis and the angle being the horizontal axis. The window ranges from 0 to 90 degrees on the horizontal axis and from approximately 50 to 2400 dpi on the vertical axis. Note that the orientation pattern should be selected so that routine scaling does not push the orientation pattern out of this window. The orientation pattern can be designed to mitigate this problem, as noted above, and as explained in co-pending patent application Ser. No. 60/136,572, filed May 28, 1999, by Ammon Gustafson, entitled Watermarking System With Improved Technique for Detecting Scaling and Rotation, filed May 28, 1999.

The detector proceeds to correlate the orientation and the target signal in the log polar coordinate system. As shown in FIG. 14, the detector uses a generalized matched filter GMF (966). The GMF performs an FFT on the orientation and target signal, multiplies the resulting Fourier domain entities, and performs an inverse FFT. This process yields a rectangular array of values in log-polar coordinates, each representing a measure of correlation and having a corresponding rotation angle and scale vector. As an optimization, the detector may also perform the same correlation operations for distorted versions (968, 970, 972) of the orientation signal to see if any of the distorted orientation patterns results in a higher measure of correlation. For example, the detector may repeat the correlation operation with some pre-determined amount of horizontal and vertical differential distortion (970, 972). The result of this correlation process is an array of correlation values 974 specifying the amount of correlation that each corresponding rotation-scale vector provides.

The detector processes this array to find the top M peaks and their location in the log-polar space 976. To extract the location more accurately, the detector uses interpolation to provide the inter-sample location of each of the top peaks 978. The interpolator computes the 2D median of the samples around a peak and provides the location of the peak center to an accuracy of 0.1 sample.

The detector proceeds to rank the top rotation-scale vectors based on yet another correlation process 980. In particular, the detector performs a correlation between a Fourier magnitude representation for each rotation-scale vector candidate and a Fourier magnitude specification of the orientation signal 982. Each Fourier magnitude representation is scaled and rotated by an amount reflected by the corresponding rotation-scale vector. This correlation operation sums a point-wise multiplication of the orientation pattern impulse functions in the frequency domain with the Fourier magnitude values of the image at corresponding frequencies to compute a measure of correlation for each peak 984. The detector then sorts correlation values for the peaks (986).

Finally, the detector computes a detection value for each peak (988). It computes the detection value by quantizing the correlation values. Specifically, it computes a ratio of the peak's correlation value and the correlation value of the next largest peak. Alternatively, the detector may compute the ratio of the peak's correlation value and a sum or average of the correlation values of the next n highest peaks, where n is some predetermined number. Then, the detector maps this ratio to a detection value based on a statistical analysis of unmarked images.

The statistical analysis plots a distribution of peak ratio values found in unmarked images. The ratio values are mapped to a detection value based on the probability that the value came from an unmarked image. For example, 90% of the ratio values in unmarked images fall below a first threshold T1, and thus, the detection value mapping for a ratio of T1 is set to 1. Similarly, 99% of the ratio values in unmarked images fall below T2, and therefore, the detection value is set to 2. 99.9% of the ratio values in unmarked images fall below T3, and the corresponding detection value is set to 3. The threshold values, T1, T2 and T3, may be determined by performing a statistical analysis of several images. The mapping of ratios to detection values based on the statistical distribution may be implemented in a look up table.

The statistical analysis may also include a maximum likelihood analysis. In such an analysis, an off-line detector generates detection value statistics for both marked and unmarked images. Based on the probability distributions of marked and unmarked images, it determines the likelihood that a given detection value for an input image originates from a marked and unmarked image.

Figure 15:
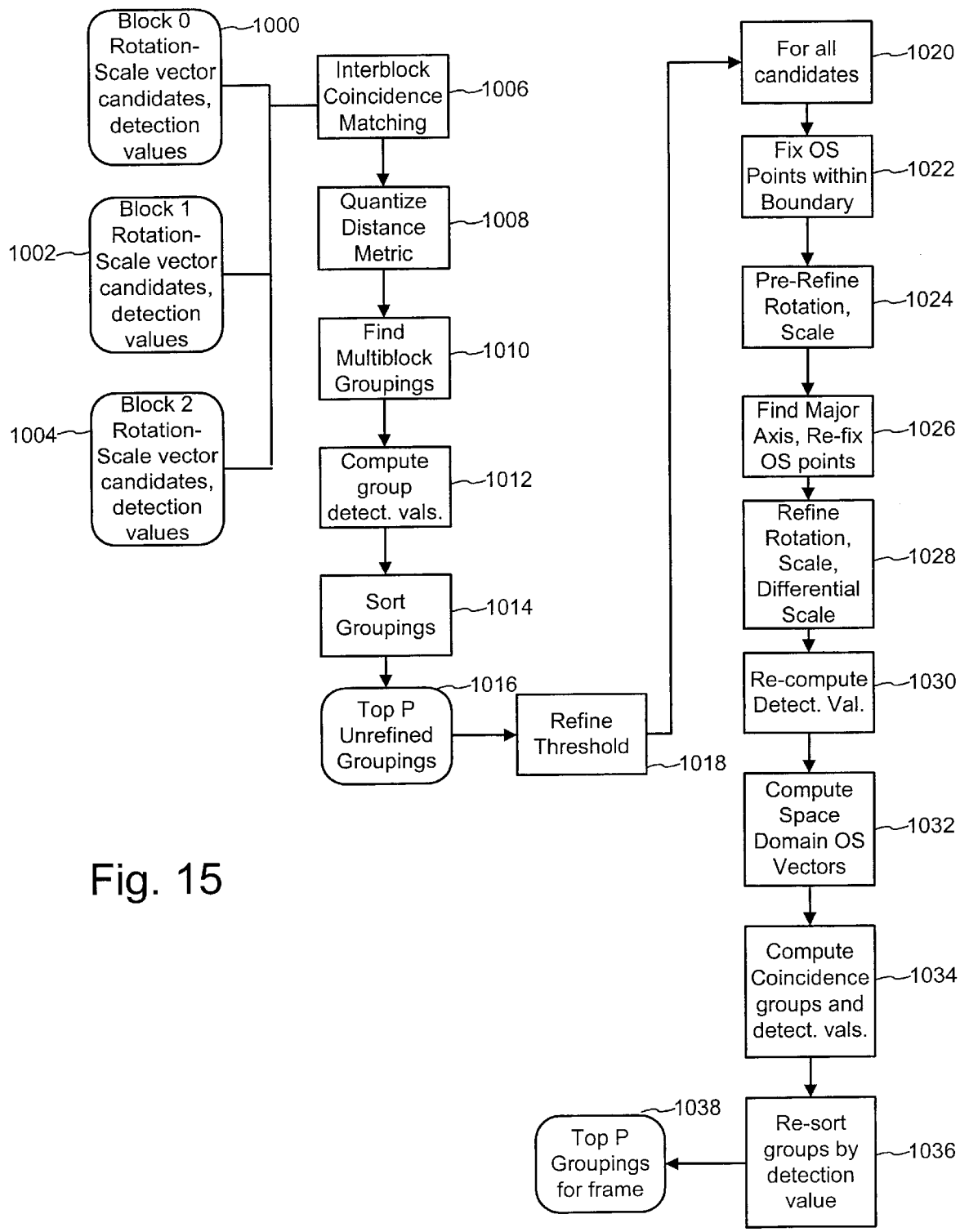
FIG. 15 is a diagram illustrating a process for refining the rotation and scale vectors, and for estimating differential scale parameters of the detection watermark signal.

At the end of these correlation stages, the detector has computed a ranked set of rotation-scale vectors 990, each with a quantized measure of correlation associated with it. At this point, the detector could simply choose the rotation and scale vectors with the highest rank and proceed to compute other orientation parameters, such as differential scale and translation. Instead, the detector gathers more evidence to refine the rotation-scale vector estimates. FIG. 15 is a flow diagram illustrating a process for refining the orientation parameters using evidence of the orientation signal collected from blocks in the current frame.

Continuing in the current frame, the detector proceeds to compare the rotation and scale parameters from different blocks (e.g., block 0, block 1, block 2; 1000, 1002, and 1004 in FIG. 15). In a process referred to as interblock coincidence matching 1006, it looks for similarities between rotation-scale parameters that yielded the highest correlation in different blocks. To quantify this similarity, it computes the geometric distance between each peak in one block with every other peak in the other blocks. It then computes the probability that peaks will fall within this calculated distance. There are a variety of ways to calculate the probability. In one implementation, the detector computes the geometric distance between two peaks, computes the circular area encompassing the two peaks ($\pi$(geometric distance)$^2$), and computes the ratio of this area to the total area of the block. Finally, it quantizes this probability measure for each pair of peaks (1008) by computing the log (base 10) of the ratio of the total area over the area encompassing the two peaks. At this point, the detector has calculated two detection values: quantized peak value, and the quantized distance metric.

The detector now forms multi-block grouping of rotation-scale vectors and computes a combined detection value for each grouping (1010). The detector groups vectors based on their relative geometric proximity within their respective blocks. It then computes the combined detection value by combining the detection values of the vectors in the group (1012). One way to compute a combined detection value is to add the detection values or add a weighted combination of them.

Having calculated the combined detection values, the detector sorts each grouping by its combined detection value (1014). This process produces a set of the top groupings of unrefined rotation-scale candidates, ranked by detection value 1016. Next, the detector weeds out rotation-scale vectors that are not promising by excluding those groupings whose combined detection values are below a threshold (the "refine threshold" 1018). The detector then refines each individual rotation-scale vector candidate within the remaining groupings.

The detector refines a rotation-scale vector by adjusting the vector and checking to see whether the adjustment results in a better correlation. As noted above, the detector may simply pick the best rotation-scale vector based on the evidence collected thus far, and refine only that vector. An alternative approach is to refine each of the top rotation-scale vector candidates, and continue to gather evidence for each candidate. In this approach, the detector loops over each vector candidate (1020), refining each one.

One approach of refining the orientation vector is as follows:

fix the orientation signal impulse functions ("points") within a valid boundary (1022);

pre-refine the rotation-scale vector (1024);

find the major axis and re-fix the orientation points (1026); and refine each vector with the addition of a differential scale component (1028).

In this approach, the detector pre-refines a rotation-scale vector by incrementally adjusting one of the parameters (scale, rotation angle), adjusting the orientation points, and then summing a point-wise multiplication of the orientation pattern and the image block in the Fourier magnitude domain. The refiner compares the resulting measure of correlation with previous measures and continues to adjust one of the parameters so long as the correlation increases. After refining the scale and rotation angle parameters, the refiner finds the major axis, and re-fixes the orientation points. It then repeats the refining process with the introduction of differential scale parameters. At the end of this process, the refiner has converted each scale-rotation candidate to a refined 4D vector, including rotation, scale, and two differential scale parameters.

At this stage, the detector can pick a 4D vector or set of 4D vector and proceed to calculate the final remaining parameter, translation. Alternatively, the detector can collect additional evidence about the merits of each 4D vector.

One way to collect additional evidence about each 4D vector is to re-compute the detection value of each orientation vector candidate (1030). For example, the detector may quantize the correlation value associated with each 4D vector as described above for the rotation-scale vector peaks (see item 988, FIG. 14 and accompanying text). Another way to collect additional evidence is to repeat the coincidence matching process for the 4D vectors. For this coincidence matching process, the detector computes spatial domain vectors for each candidate (1032), determines the distance metric between candidates from different blocks, and then groups candidates from different blocks based on the distance metrics (1034). The detector then re-sorts the groups according to their combined detection values (1036) to produce a set of the top P groupings 1038 for the frame.

Figure 16:
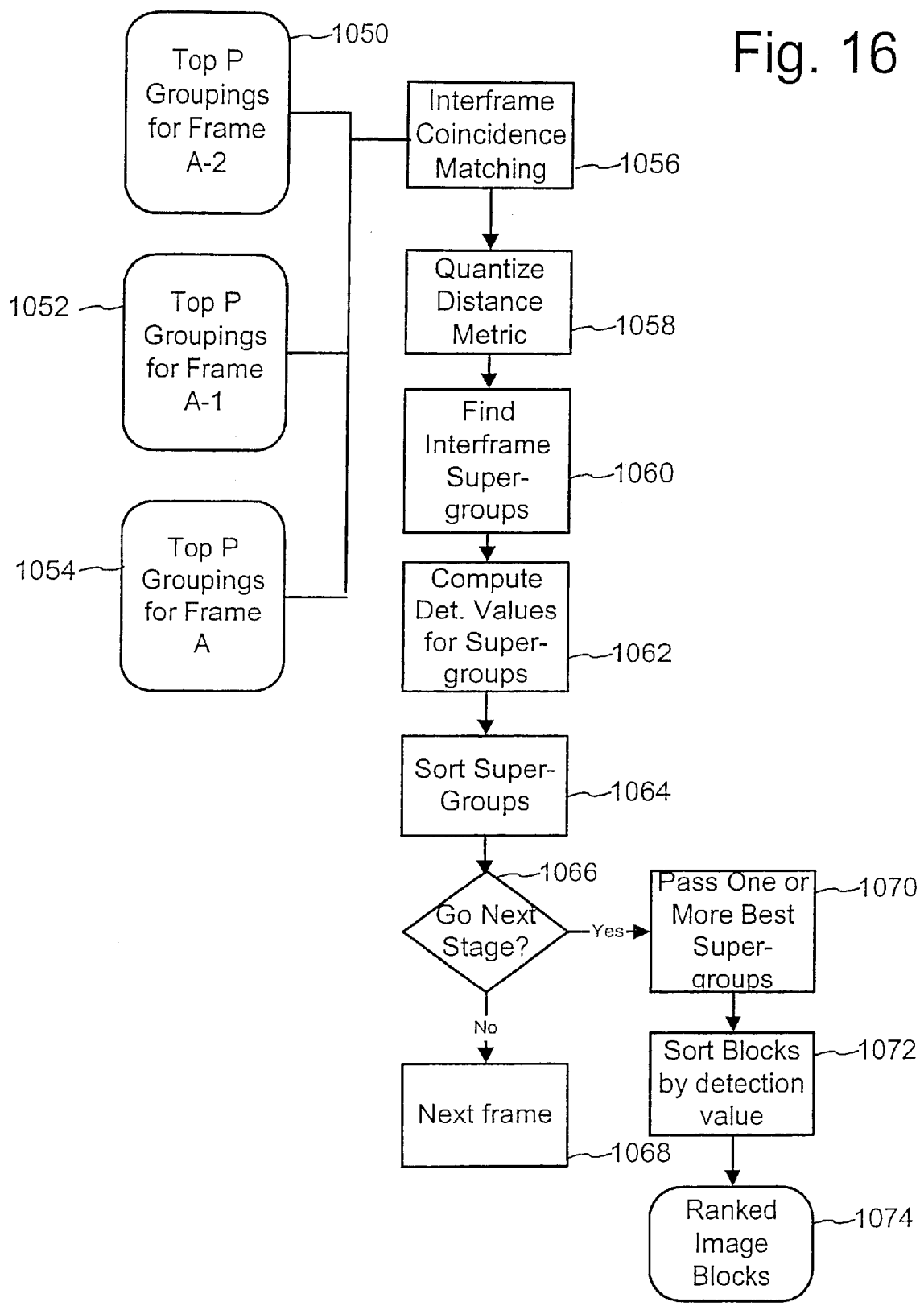
FIG. 16 is a diagram illustrating a process for aggregating evidence of the orientation signal and orientation parameter candidates from two or more frames.

FIG. 16 is a flow diagram illustrating a method for aggregating evidence of the orientation signal from multiple frames. In applications with multiple frames, the detector collects the same information for orientation vectors of the selected blocks in each frame (namely, the top P groupings of orientation vector candidates, e.g., 1050, 1052 and 1054). The detector then repeats coincidence matching between orientation vectors of different frames (1056). In particular, in this inter-frame mode, the detector quantizes the distance metrics computed between orientation vectors from blocks in different frames (1058). It then finds inter-frame groupings of orientation vectors (super-groups) using the same approach described above (1060), except that the orientation vectors are derived from blocks in different frames. After organizing orientation vectors into super-groups, the detector computes a combined detection value for each super-group (1062) and sorts the super-groups by this detection value (1064). The detector then evaluates whether to proceed to the next stage (1066), or repeat the above process of computing orientation vector candidates from another frame (1068).

If the detection values of one or more super-groups exceed a threshold, then the detector proceeds to the next stage. If not, the detector gathers evidence of the orientation signal from another frame and returns to the inter-frame coincidence matching process. Ultimately, when the detector finds sufficient evidence to proceed to the next stage, it selects the super-group with the highest combined detection value (1070), and sorts the blocks based on their corresponding detection values (1072) to produce a ranked set of blocks for the next stage (1074).

4.3 Estimating Translation Parameters

Figure 17:
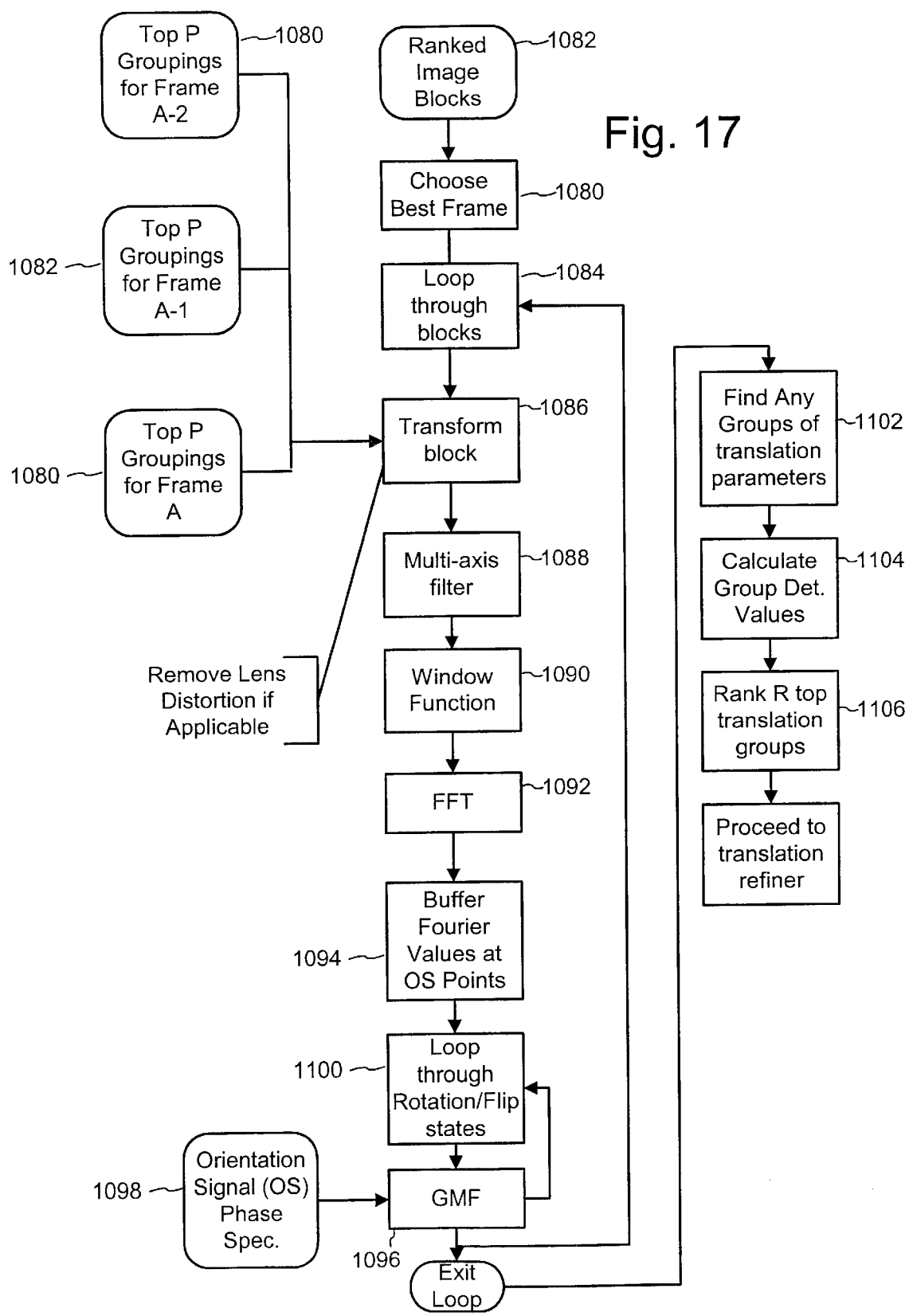
FIG. 17 is a diagram illustrating a process for estimating translation parameters of the detection watermark signal.

FIG. 17 is a flow diagram illustrating a method for estimating translation parameters of the orientation signal, using information gathered from the previous stages.

In this stage, the detector estimates translation parameters. These parameters indicate the starting point of a watermarked block in the spatial domain. The translation parameters, along with rotation, scale and differential scale, form a complete 6D orientation vector. The 6D vector enables the reader to extract luminance sample data in approximately the same orientation as in the original watermarked image.

One approach is to use generalized match filtering to find the translation parameters that provide the best correlation. Another approach is to continue to collect evidence about the orientation vector candidates, and provide a more comprehensive ranking of the orientation vectors based on all of the evidence gathered thus far. The following paragraphs describe an example of this type of an approach.

To extract translation parameters, the detector proceeds as follows. In the multi-frame case, the detector selects the frame that produced 4D orientation vectors with the highest detection values (1080). It then processes the blocks 1082 in that frame in the order of their detection value. For each block (1084), it applies the 4D vector to the luminance data to generate rectified block data (1086). The detector then performs dual axis filtering (1088) and the window function (1090) on the data. Next, it performs an FFT (1092) on the image data to generate an array of Fourier data. To make correlation operations more efficient, the detector buffers the fourier values at the orientation points (1094).

The detector applies a generalized match filter 1096 to correlate a phase specification of the orientation signal (1098) with the transformed block data. The result of this process is a 2D array of correlation values. The peaks in this array represent the translation parameters with the highest correlation. The detector selects the top peaks and then applies a median filter to determine the center of each of these peaks. The center of the peak has a corresponding correlation value and sub-pixel translation value. This process is one example of getting translation parameters by correlating the Fourier phase specification of the orientation signal and the image data. Other methods of phase locking the image data with a synchronization signal like the orientation signal may also be employed.

Depending on the implementation, the detector may have to resolve additional ambiguities, such as rotation angle and flip ambiguity. The degree of ambiguity in the rotation angle depends on the nature of the orientation signal. If the orientation signal is octally symmetric (symmetric about horizontal, vertical and diagonal axes in the spatial frequency domain), then the detector has to check each quadrant (0–90, 90–180, 180–270, and 270–360 degrees) to find out which one the rotation angle resides in. Similarly, if the orientation signal is quad symmetric, then the detector has to check two cases, 0–180 and 180–270.

The flip ambiguity may exist in some applications where the watermarked image can be flipped. To check for rotation and flip ambiguities, the detector loops through each possible case, and performs the correlation operation for each one (1100).

At the conclusion of the correlation process, the detector has produced a set of the top translation parameters with associated correlation values for each block. To gather additional evidence, the detector groups similar translation parameters from different blocks (1102), calculates a group detection value for each set of translation parameters 1104, and then ranks the top translation groups based on their corresponding group detection values 1106.

4.4 Refining Translation Parameters

Figure 18:
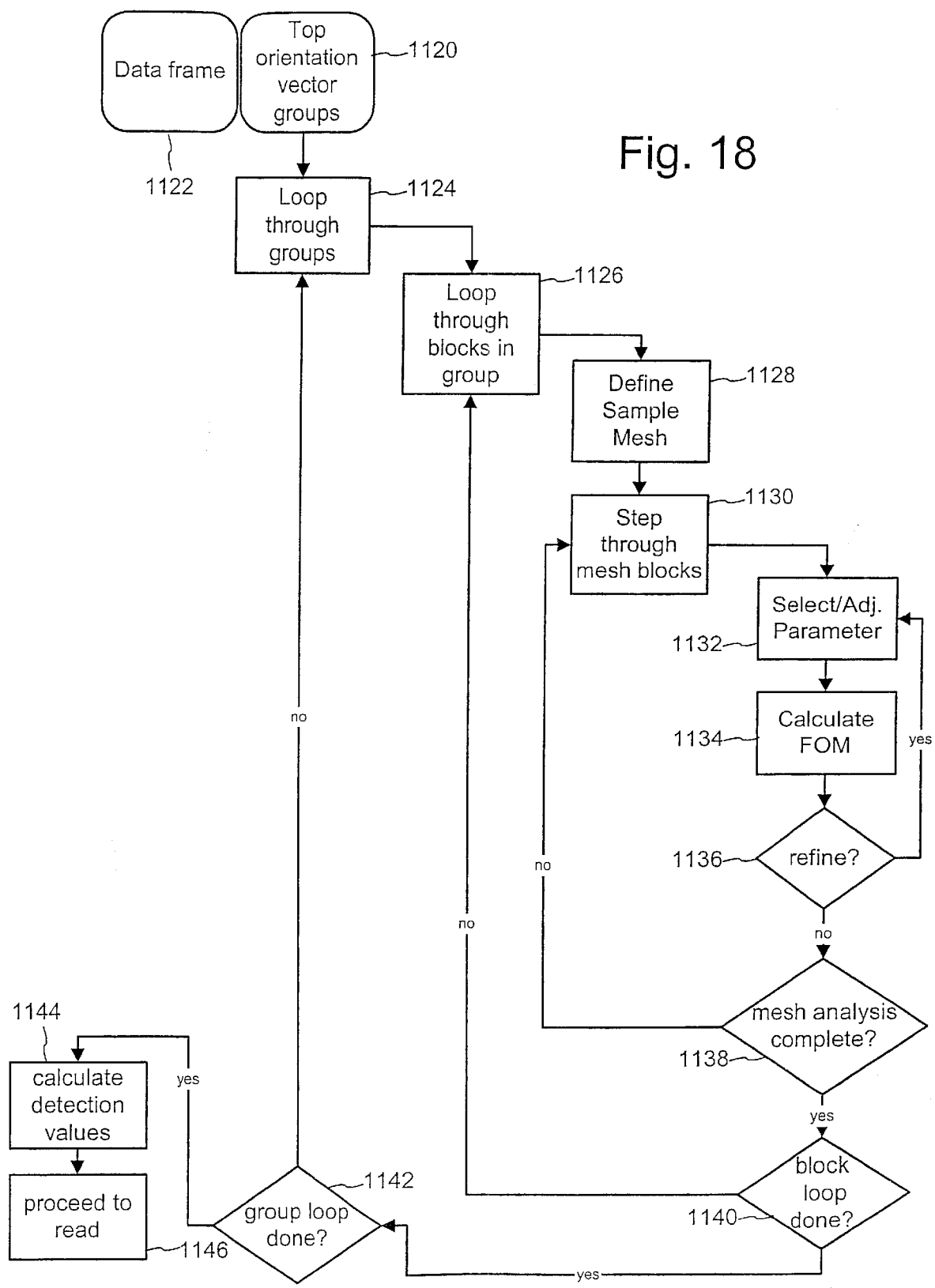
FIG. 18 is a diagram illustrating a process for refining orientation parameters using known message bits in the watermark message.

Having gathered translation parameter estimates, the detector proceeds to refine these estimates. FIG. 18 is a flow diagram illustrating a process for refining orientation parameters. At this stage, the detector process has gathered a set of the top translation parameter candidates 1120 for a given frame 1122. The translation parameters provide an estimate of a reference point that locates the watermark, including both the orientation and message components, in the image frame. In the implementation depicted here, the translation parameters are represented as horizontal and vertical offsets from a reference point in the image block from which they were computed.

Recall that the detector has grouped translation parameters from different blocks based on their geometric proximity to each other. Each pair of translation parameters in a group is associated with a block and a 4D vector (rotation, scale, and 2 differential scale parameters). As shown in FIG. 18, the detector can now proceed to loop through each group (1124), and through the blocks within each group (1126), to refine the orientation parameters associated with each member of the groups. Alternatively, a simpler version of the detector may evaluate only the group with the highest detection value, or only selected blocks within that group.

Regardless of the number of candidates to be evaluated, the process of refining a given orientation vector candidate may be implemented in a similar fashion. In the refining process, the detector uses a candidate orientation vector to define a mesh of sample blocks for further analysis (1128). In one implementation, for example, the detector forms a mesh of 32 by 32 sample blocks centered around a seed block whose upper right corner is located at the vertical and horizontal offset specified by the candidate translation parameters. The detector reads samples from each block using the orientation vector to extract luminance samples that approximate the original orientation of the host image at encoding time.

The detector steps through each block of samples (1130). For each block, it sets the orientation vector (1132), and then uses the orientation vector to check the validity of the watermark signal in the sample block. It assesses the validity of the watermark signal by calculating a figure of merit for the block (1134). To further refine the orientation parameters associated with each sample block, the detector adjusts selected parameters (e.g., vertical and horizontal translation) and re-calculates the figure of merit. As depicted in the inner loop in FIG. 18 (block 1136 to 1132), the detector repeatedly adjusts the orientation vector and calculates the figure of merit in an attempt to find a refined orientation that yields a higher figure of merit.

The loop (1136) may be implemented by stepping through a predetermined sequence of adjustments to parameters of the orientation vectors (e.g., adding or subtracting small increments from the horizontal and vertical translation parameters). In this approach, the detector exits the loop after stepping through the sequence of adjustments. Upon exiting, the detector retains the orientation vector with the highest figure of merit.

There are a number of ways to calculate this figure of merit. One figure of merit is the degree of correlation between a known watermark signal attribute and a corresponding attribute in the signal suspected of having a watermark. Another figure of merit is the strength of the watermark signal (or one of its components) in the suspect signal. For example, a figure of merit may be based on a measure of the watermark message signal strength and/or orientation pattern signal strength in the signal, or in a part of the signal from which the detector extracts the orientation parameters. The detector may computes a figure of merit based on the strength of the watermark signal in a sample block. It may also compute a figure of merit based on the percentage agreement between the known bits of the message and the message bits extracted from the sample block.

When the figure of merit is computed based on a portion of the suspect signal, the detector and reader can use the figure of merit to assess the accuracy of the watermark signal detected and read from that portion of the signal. This approach enables the detector to assess the merits of orientation parameters and to rank them based on their figure of merit. In addition, the reader can weight estimates of watermark message values based on the figure of merit to recover a message more reliably.

The process of calculating a figure of merit depends on attributes the watermark signal and how the embedder inserted it into the host signal. Consider an example where the watermark signal is added to the host signal. To calculate a figure of merit based on the strength of the orientation signal, the detector checks the value of each sample relative to its neighbors, and compares the result with the corresponding sample in a spatial domain version of the orientation signal. When a sample's value is greater than its neighbors, then one would expect that the corresponding orientation signal sample to be positive. Conversely, when the sample's value is less than its neighbors, then one would expect that the corresponding orientation sample to be negative. By comparing a sample's polarity relative to its neighbors with the corresponding orientation sample's polarity, the detector can assess the strength of the orientation signal in the sample block. In one implementation, the detector makes this polarity comparison twice for each sample in an N by N block (e.g., N=32, 64, etc): once comparing each sample with its horizontally adjacent neighbors and then again comparing each sample with its vertically adjacent neighbors. The detector performs this analysis on samples in the mesh block after re-orienting the data to approximate the original orientation of the host image at encoding time. The result of this process is a number reflecting the portion of the total polarity comparisons that yield a match.

To calculate a figure of merit based on known signature bits in a message, the detector invokes the reader on the sample block, and provides the orientation vector to enable the reader to extract coded message bits from the sample block. The detector compares the extracted message bits with the known bits to determine the extent to which they match. The result of this process is a percentage agreement number reflecting the portion of the extracted message bits that match the known bits. Together the test for the orientation signal and the message signal provide a figure of merit for the block.

As depicted in the loop from blocks 1138 to 1130, the detector may repeat the process of refining the orientation vector for each sample block around the seed block. In this case, the detector exits the loop (1138) after analyzing each of the sample blocks in the mesh defined previously (1128). In addition, the detector may repeat the analysis in the loop through all blocks in a given group (1140), and in the loop through each group (1142).

After completing the analysis of the orientation vector candidates, the detector proceeds to compute a combined detection value for the various candidates by compiling the results of the figure of merit calculations. It then proceeds to invoke the reader on the orientation vector candidates in the order of their detection values.

4.5 Reading the watermark

Figure 19:
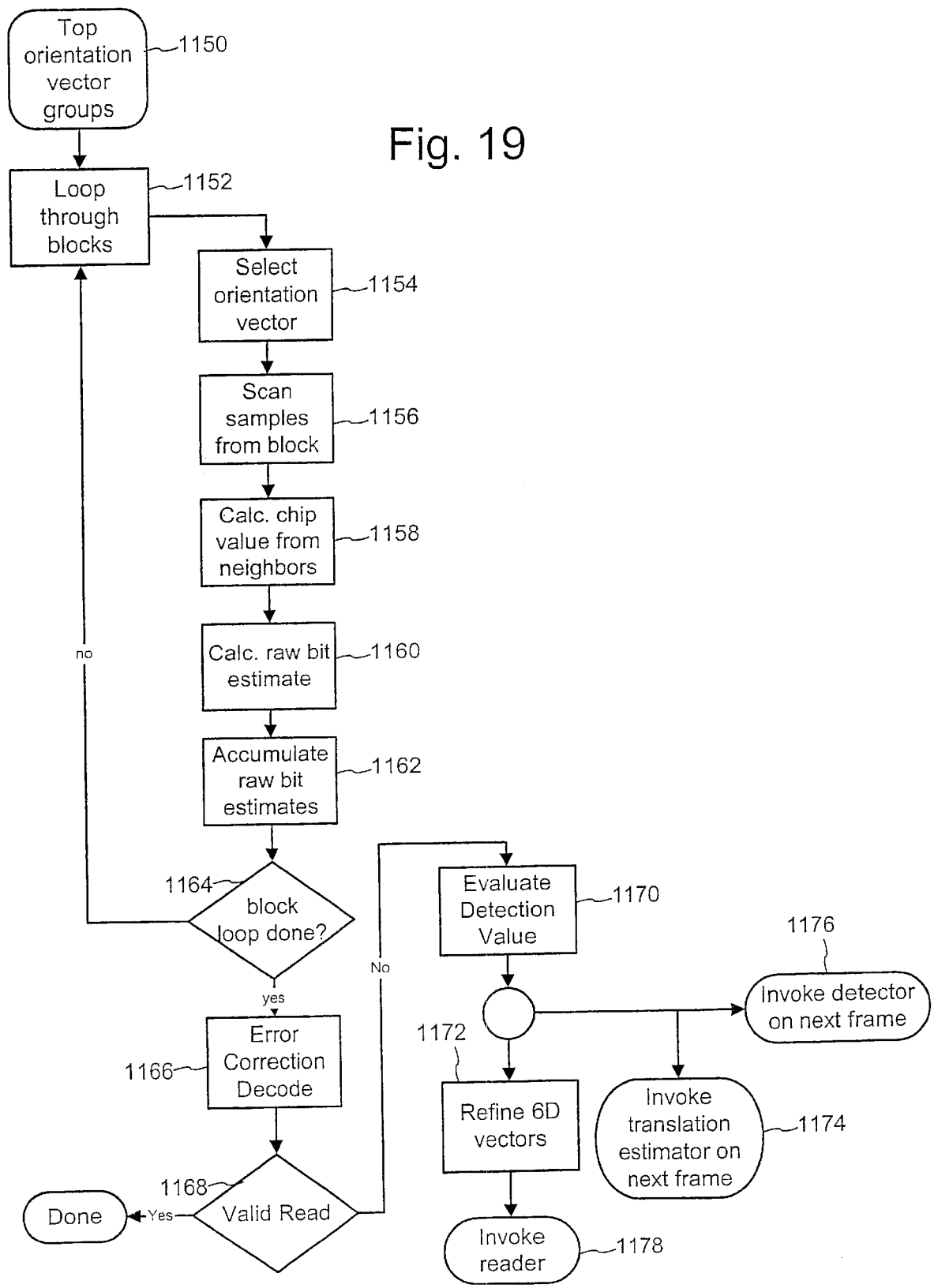
FIG. 19 is a diagram illustrating a process for reading a watermark message from an image, after re-orienting the image data using an orientation vector.

FIG. 19 is a flow diagram illustrating a process for reading the watermark message. Given an orientation vector and the corresponding image data, the reader extracts the raw bits of a message from the image. The reader may accumulate evidence of the raw bit values from several different blocks. For example, in the process depicted in FIG. 19, the reader uses refined orientation vectors for each block, and accumulates evidence of the raw bit values extracted from the blocks associated with the refined orientation vectors.

The reading process begins with a set of promising orientation vector candidates 1150 gathered from the detector. In each group of orientation vector candidates, there is a set of orientation vectors, each corresponding to a block in a given frame. The detector invokes the reader for one or more orientation vector groups whose detection values exceed a predetermined threshold. For each such group, the detector loops over the blocks in the group (1152), and invokes the reader to extract evidence of the raw message bit values.

Recall that previous stages in the detector have refined orientation vectors to be used for the blocks of a group. When it invokes the reader, the detector provides the orientation vector as well as the image block data (1154). The reader scans samples starting from a location in a block specified by the translation parameters and using the other orientation parameters to approximate the original orientation of the image data (1156).

As described above, the embedder maps chips of the raw message bits to each of the luminance samples in the original host image. Each sample, therefore, may provide an estimate of a chip's value. The reader reconstructs the value of the chip by first predicting the watermark signal in the sample from the value of the sample relative to its neighbors as described above (1158). If the deduced value appears valid, then the reader extracts the chip's value using the known value of the pseudo-random carrier signal for that sample and performing the inverse of the modulation function originally used to compute the watermark information signal (1160). In particular, the reader performs an exclusive OR operation on the deduced value and the known carrier signal bit to get an estimate of the raw bit value. This estimate serves as an estimate for the raw bit value. The reader accumulates these estimates for each raw bit value (1162).

As noted above, the reader computes an estimate of the watermark signal by predicting the original, un-watermarked signal and deriving an estimate of the watermark signal based on the predicted signal and the watermarked signal. It then computes an estimate of a raw bit value based on the value of the carrier signal, the assignment map that maps a raw bit to the host image, and the relationship among the carrier signal value, the raw bit value, and the watermark signal value. In short, the reader reverses the embedding functions that modulate the message with the carrier and apply the modulated carrier to the host signal. Using the predicted value of the original signal and an estimate of the watermark signal, the reader reverses the embedding functions to estimate a value of the raw bit.

The reader loops over the candidate orientation vectors and associated blocks, accumulating estimates for each raw bit value (1164). When the loop is complete, the reader calculates a final estimate value for each raw bit from the estimates compiled for it. It then performs the inverse of the error correction coding operation on the final raw bit values (1166). Next, it performs a CRC to determine whether the read is valid. If no errors are detected, the read operation is complete and the reader returns the message (1168).

However, if the read is invalid, then the detector may either attempt to refine the orientation vector data further, or start the detection process with a new frame. Preferably, the detector should proceed to refine the orientation vector data when the combined detection value of the top candidates indicates that the current data is likely to contain a strong watermark signal. In the process depicted in FIG. 19, for example, the detector selects a processing path based on the combined detection value (1170). The combined detection value may be calculated in a variety of ways. One approach is to compute a combined detection value based on the geometric coincidence of the top orientation vector candidates and a compilation of their figures of merit. The figure of merit may be computed as detailed earlier.

For cases where the read is invalid, the processing paths for the process depicted in FIG. 19 include: 1) refine the top orientation vectors in the spatial domain (1172); 2) invoke the translation estimator on the frame with the next best orientation vector candidates (1174); and 3) re-start the detection process on a new frame (assuming an implementation where more than one frame is available) (1176). These paths are ranked in order from the highest detection value to the lowest. In the first case, the orientation vectors are the most promising. Thus, the detector re-invokes the reader on the same candidates after refining them in the spatial domain (1178). In the second case, the orientation vectors are less promising, yet the detection value indicates that it is still worthwhile to return to the translation estimation stage and continue from that point. Finally, in the final case, the detection value indicates that the watermark signal is not strong enough to warrant further refinement. In this case, the detector starts over with the next new frame of image data.

In each of the above cases, the detector continues to process the image data until it either makes a valid read, or has failed to make a valid read after repeated passes through the available image data.

5.0 Operating Environment for Computer Implementations

Figure 20:
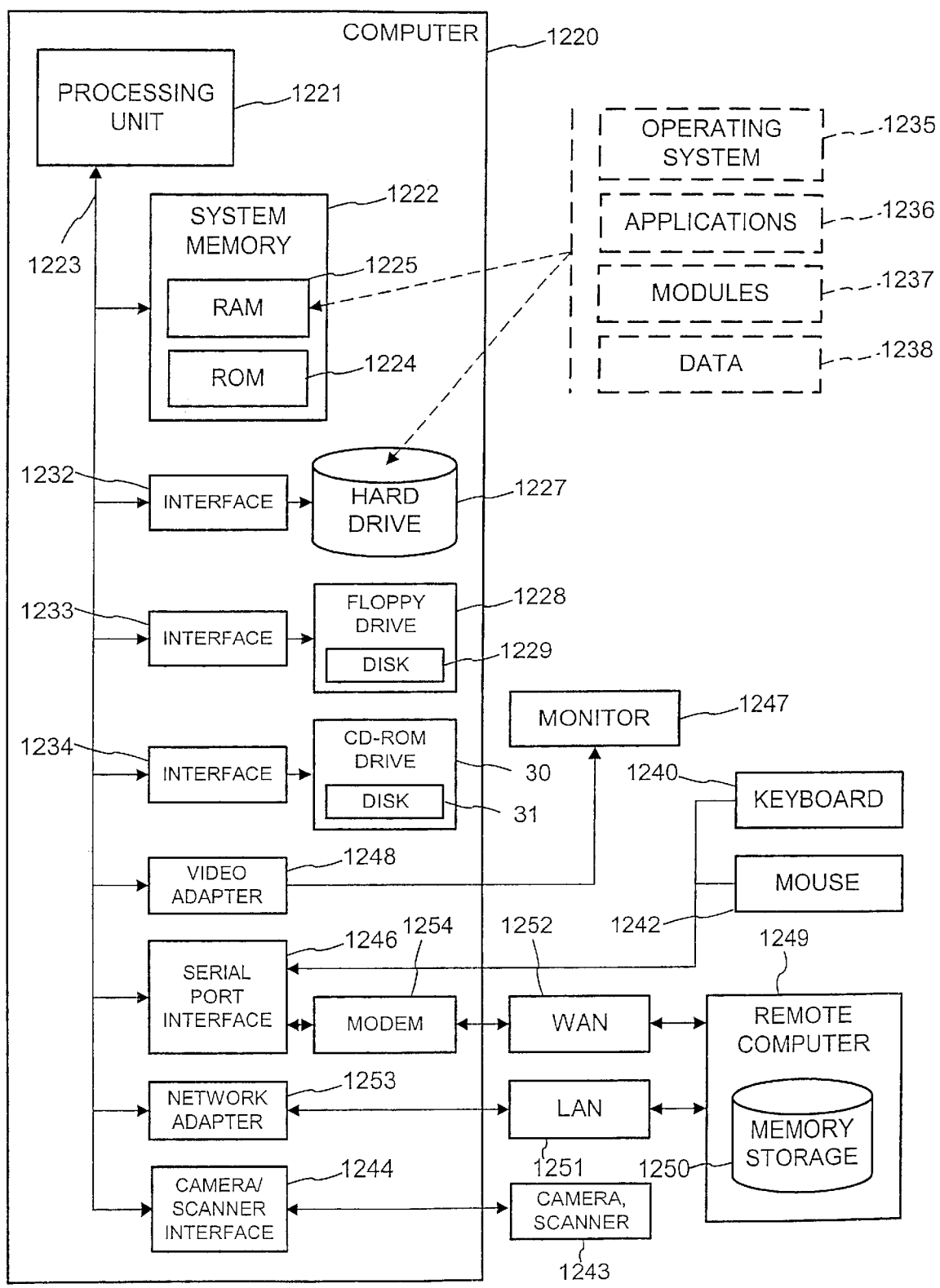
FIG. 20 is a diagram of a computer system that serves as an operating environment for software implementations of a watermark embedder, detector and reader.
Figure 21:
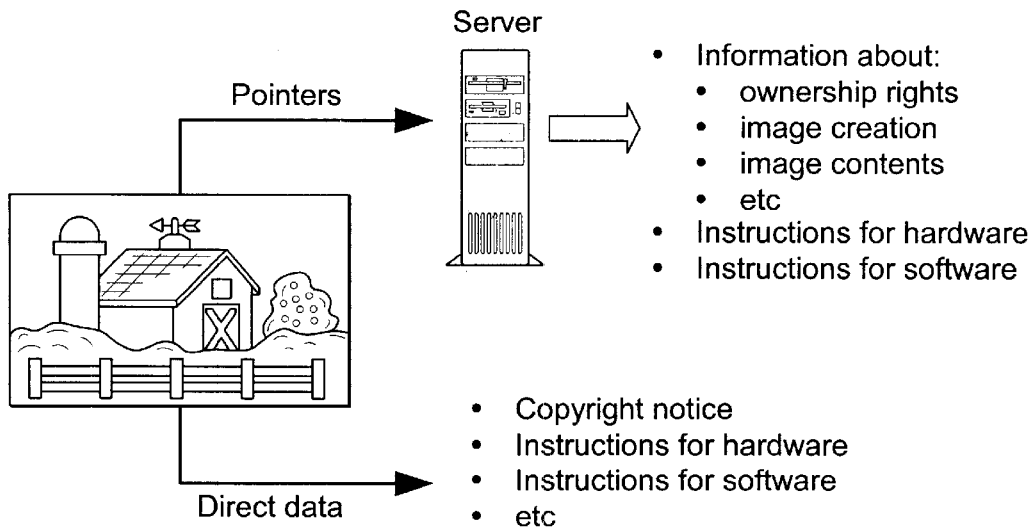
FIG. 21 is a diagram illustrating that a watermark embedded in a signal may be used to carry auxiliary data in the signal and a pointer to auxiliary data in a database.
Figure 22:
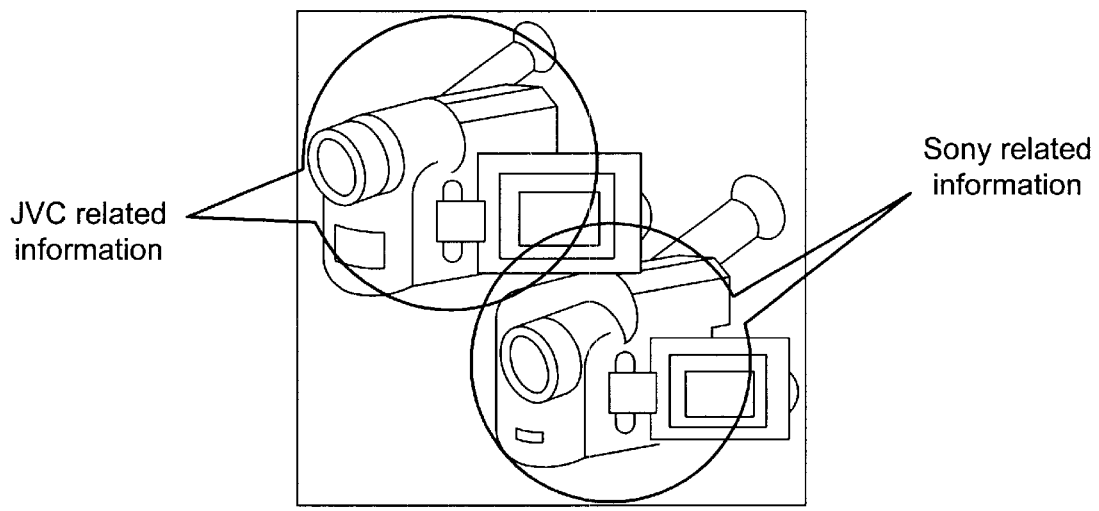
FIG. 22 is a diagram illustrating that different regions of an image may carry different watermark information.
Figure 23:
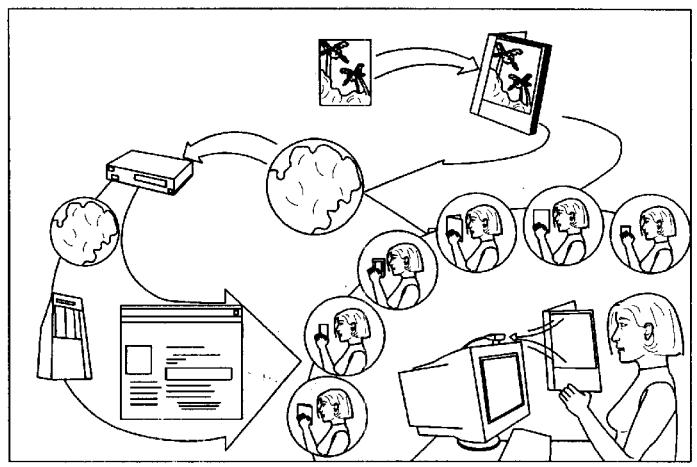
FIG. 23 is a diagram illustrating how digital watermarks embedded in print media may be used to link the print media to electronic commerce.
Figure 24A:
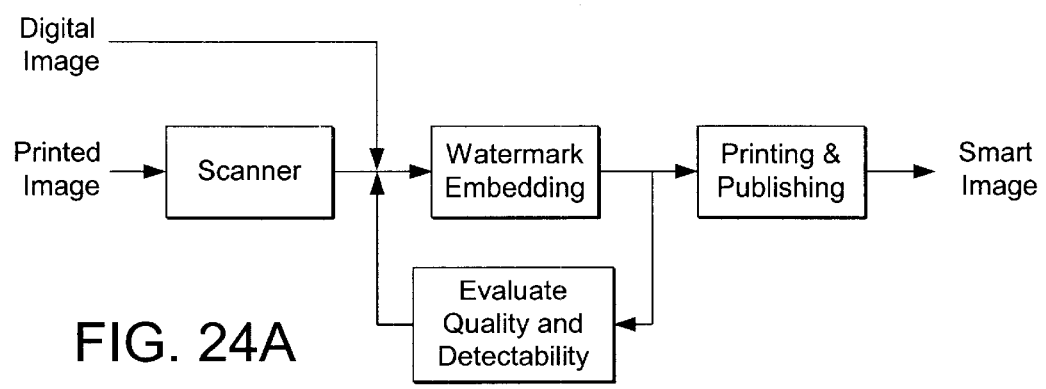
FIG. 24A is a diagram illustrating a method for embedding digital watermarks in print media.
Figure 24B:
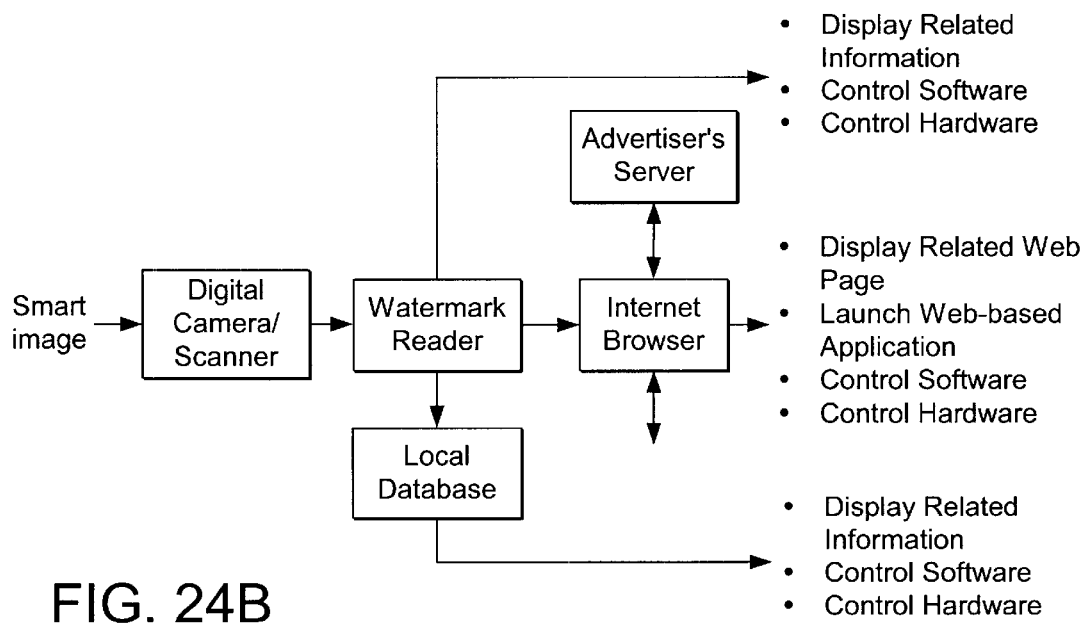
FIG. 24B is a diagram illustrating a method for reading an embedded digital watermark in print media.

FIG. 20 illustrates an example of a computer system that serves as an operating environment for software implementations of the watermarking systems described above. The embedder and detector implementations are implemented in C/C++ and are portable to many different computer systems. FIG. 20 generally depicts one such system.

The computer system shown in FIG. 20 includes a computer 1220, including a processing unit 1221, a system memory 1222, and a system bus 1223 that interconnects various system components including the system memory to the processing unit 1221.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 1224 and random access memory (RAM) 1225. A basic input/output system 1226 (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading a CD-ROM or DVD disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions (program code such as dynamic link libraries, and executable files), etc. for the computer 1220.

Although the description of computer-readable media above refers to a hard disk, a removable magnetic disk and an optical disk, it can also include other types of media that are readable by a computer, such as magnetic cassettes, flash memory cards, digital video disks, and the like.

A number of program modules may be stored in the drives and RAM 1225, including an operating system 1235, one or more application programs 1236, other program modules 1237, and program data 1238.

A user may enter commands and information into the computer 1220 through a keyboard 1240 and pointing device, such as a mouse 1242. Other input devices may include a microphone, joystick, game pad, satellite dish, digital camera, scanner, or the like. A digital camera or scanner 43 may be used to capture the target image for the detection process described above. The camera and scanner are each connected to the computer via a standard interface 44. Currently, there are digital cameras designed to interface with a Universal Serial Bus (USB), Peripheral Component Interconnect (PCI), and parallel port interface. Two emerging standard peripheral interfaces for cameras include USB2 and 1394 (also known as firewire and iLink).

Other input devices may be connected to the processing unit 1221 through a serial port interface 1246 or other port interfaces (e.g., a parallel port, game port or a universal serial bus (USB)) that are coupled to the system bus.

A monitor 1247 or other type of display device is also connected to the system bus 1223 via an interface, such as a video adapter 1248. In addition to the monitor, computers typically include other peripheral output devices (not shown), such as speakers and printers.

The computer 1220 operates in a networked environment using logical connections to one or more remote computers, such as a remote computer 1249. The remote computer 1249 may be a server, a router, a peer device or other common network node, and typically includes many or all of the elements described relative to the computer 1220, although only a memory storage device 1250 has been illustrated in FIG. 20. The logical connections depicted in FIG. 20 include a local area network (LAN) 1251 and a wide area network (WAN) 1252. Such networking environments are commonplace in offices, enterprise-wide computer networks, intranets and the Internet.

When used in a LAN networking environment, the computer 1220 is connected to the local network 1251 through a network interface or adapter 1253. When used in a WAN networking environment, the computer 1220 typically includes a modem 1254 or other means for establishing communications over the wide area network 1252, such as the Internet. The modem 1254, which may be internal or external, is connected to the system bus 1223 via the serial port interface 1246.

In a networked environment, program modules depicted relative to the computer 1220, or portions of them, may be stored in the remote memory storage device. The processes detailed above can be implemented in a distributed fashion, and as parallel processes. It will be appreciated that the network connections shown are exemplary and that other means of establishing a communications link between the computers may be used.

While the computer architecture depicted in FIG. 20 is similar to typical personal computer architectures, aspects of the invention may be implemented in other computer architectures, such as hand-held computing devices like Personal Digital Assistants, audio and/video players, network appliances, telephones, etc.

"Smart Images" Using Digimarc's Watermarking Technology

This section introduces the concept of Smart Images and explains the use of watermarking technology in their implementation. A Smart Image is a digital or physical image that contains a digital watermark, which leads to further information about the image content via the Internet, communicates ownership rights and the procedure for obtaining usage rights, facilitates commerce, or instructs and controls other computer software or hardware. Thus, Smart Images, empowered by digital watermarking technology, act as active agents or catalysts which gracefully bridge both traditional and modem electronic commerce. This section presents the use of Digimarc Corporation's watermarking technology to implement Smart Images. The section presents an application that demonstrates how Smart Images facilitate both traditional and electronic commerce. This section also analyzes the technological challenges to be faced for ubiquitous use of Smart Images.

1. INTRODUCTION

Since the dawn of history, images have been used to communicate information in many applications and for many different purposes. In the recent times, capturing, storing, editing, retouching, printing, copying, and transmitting high quality colored images have become a multi-billion dollar industry, as well as a primary focus of national and international research institutions and organizations. This tremendous growth has resulted in many advances benefiting the imaging field and its applications. For example, affordable high-resolution scanners and digital CMOS cameras (cameras on chips) are widely used. Color printers and color laser copiers have become very affordable. Professional image editing and manipulation software packages have been developed for the PC and Mac platforms, and are available at very affordable prices. The speed and the storage capacity of hard disks, CD-ROM, DVD, and optical storage devices have increased tremendously to allow for the display and storage of a very large number of high-resolution images and video sequences. Affordable, ultra-fast computing platforms have become available for office and home use. The high-speed Internet backbone has become ubiquitous, and high-speed modems have become the standard entry-level Internet connection. Powerful image compression algorithms such as JPEG, and Internet browsers that are able to upload, download, and view high-resolution images are currently in general use on the Internet. So enabled, more and more images appear in the physical and digital world around us.

Media producers have become justifiably concerned about copyright protection of digital images, since unauthorized copies of digital images are very easy to make. Hence, early research efforts have focused on digital watermarking technology as a technique to communicate and enforce copyrights, detect counterfeit copies, and deter improper use of digital media in general, and digital images in particular. Digital watermarking technology allows the user to embed digital messages within media content. These digital messages are imperceptible to humans but can be read by computers and specialized devices. In an early watermarking technique, ones and zeros in a watermark payload are encoded by increasing or decreasing the pixel values around selected "signature" points. This technique is detailed in a patent filed by Corbis and now owned by Digimarc Corporation. In another technique, the ones and zeros are encoded by summing or subtracting an ensemble of uncorrelated noise frames from an image. Again, this technique is detailed in a patent owned by Digimarc. Both techniques are sensitive to visibility (and audibility) concerns and tailor the encoding to exploit data hiding features of the underlying content. Hence, with Digimarc's PictureMarc, a visually imperceptible signal can be embedded in a digital still image. This signal can be detected and read with Digimarc's Plug-in detector, which is integrated into leading image editing software. Whenever the image editing software opens an image file, the detector automatically detects such watermarks. The user of the image editing software can then read the watermark and determine the owner of the image. Similarly, Digimarc's MarcSpider scans the Internet looking for images with a watermark and reports the locations of watermarked images to the registered owner for further actions.

In this section, the use of digital watermarking technology is expanded beyond copyright protection. Digital watermarking technology is used to facilitate both traditional and electronic commerce. In both types of commerce, still images are extensively used, but their full potential is not currently exploited. Images processed by these applications are used for advertising and promoting products in magazines, newspapers, and in the greatest show on earth: the Internet. The adage "a picture is worth a thousand words" is the basic driving force behind this use. Simply put, a picture inherently conveys much more information to the consumer than text or audio alone. With the advent of digital watermarking technology, the image can now be embedded with a digital watermark that is imperceptible to the user. This watermark can be embedded in digital images as well as in printed pictures, and it contains additional information that remains dormant until the proper software or hardware detects it. When this additional information is retrieved, it can be displayed to the user, used to obtain more information from the Internet, or used to control the software or hardware that is processing the image. This dormant information gives the image some intelligence, hence we have coined the term Smart Image. Since a Smart Image contains a watermark that leads to more information about the image, it could be said that "a Smart Image is worth more than a thousand words."

Part (2) of this section further explains the concept of Smart Images. Part (3) presents a brief overview of Digimarc Corporation's digital watermarking technology. Part (4) demonstrates how a Smart Image system creates a bridge between traditional and electronic commerce. Part (5) analyzes the technological challenges to be faced for ubiquitous utilization of Smart Images. The last part of this section presents some conclusions.

2. SMART IMAGES 2.1. Definition

In this section, a Smart Image is defined as a digital or physical still image that contains visually imperceptible data that remains dormant until it is detected and retrieved by specialized software or hardware to induce the best utilization of the image. This data may be self-contained or it may include pointers to a complete knowledge structure on a local database or on the Internet (FIG. (21)). This knowledge structure may include information about ownership rights, image creation, image content, and instructions for the software and hardware that may process the image. The dormant data is interwoven with the media content and cannot be easily removed from the image without degrading the image quality. This data travels with the image and survives image processing and manipulation operations, such as scaling, rotation, cropping, filtering, compression, and digital-to-analog (e.g. printing) and analog-to-digital (e.g. scanning) conversion. Parts (3) and (4) explain how this data can be added to the image.

Different regions of a Smart Image may carry independent dormant information. Hence, different parts of the image lead to different knowledge structures or instruct the software and hardware differently. This is useful in applications where images contain more than one object. For example, FIG. (22) shows a Smart Image that represents a typical promotion ad in a newspaper. The image contains two regions, each with different dormant information. The first region surrounds the JVC video camera and contains dormant information related to that camera. The second region surrounds the Sony video camera and contains dormant information related to that camera.

2.2. How Smart Images are Different

Adding imperceptible dormant information to the image facilitates image interpretation. In general, image interpretation requires the use of intelligent pattern-recognition algorithms that are extremely hard to design. These algorithms exploit the image data itself and do not require additional information. Although this field is very attractive, it has had very limited success in some industrial applications and its general use is still a challenging research area. However, by adding dormant information to the image, the image becomes smarter, and the image interpretation problem is reduced to detecting and reading the embedded information using sophisticated signal processing algorithms.

The dormant data in a Smart Image is different from the header, encapsulated information, or metadata (additional information about the data) often added to a digital image file to facilitate file manipulation and display. Metadata structures are used to provide unique identifying information about digital images. These data structures contain text data and are appended to the image files rather than embedded within the image itself. Therefore, once the digital image is printed on paper, all the metadata structure is left behind. Moreover, metadata has the disadvantage of increasing the size of the image file and generally may not survive a change in the image format (e.g., from TIFF to JPEG or vice versa). On the contrary, the data in a Smart Image is interwoven with the image and survives printing and image reformatting. This data can be selected to provide unique identification information about the image, and used instead of metadata to facilitate the archiving, indexing, cataloging, previewing, and retrieving of digital images.

Smart Images are also different from "DataGlyphs," which was recently introduced by Xerox Corporation. "DataGlyphs" encodes machine-readable data onto paper documents to facilitate document processing. The idea is similar to the ubiquitous bar codes on consumer products. Instead of vertical line segments of differing widths, the data is encoded as small 45-degree diagonal lines called glyphs. Each of these lines represents a single binary 0 or 1, depending on whether it slopes to the left or right. Sequences of these glyphs can be used to encode numeric, textual, or other information. These glyphs are then printed on the document as visible gray patterns, which can appear as backgrounds, shading patterns or conventional graphic design elements. Although the presence of these patterns may go unnoticed in text documents, it introduces a major degradation in quality when added to a natural picture.

Smart Images are different from images with hot spots, usually encountered in interactive multimedia applications or Internet browsing. Images with hot spots are usually dummy bitmaps that are used as a graphical interface to guide the user to select the proper choice during an interactive session. They contain no additional information beyond the face value of the image; hence they contain no intelligence. All apparent intelligence is due to the associated multimedia program. Replacing an image of this kind with another image of the same size would have no impact on the program as long as the user remembers where on the image to click in order to activate a desired choice. Similarly, copying the image to another application and clicking on any of its hot spots would not cause anything to happen. On the other hand, Smart Images are independent of the software or hardware that may process them. The information they contain is what gives the software or hardware the desired intelligence. Replacing a Smart Image with an ordinary image will deprive the software or hardware of its apparent intelligence. Moreover, using a Smart Image with any software or hardware that is enabled to exploit the dormant information will produce the same desired effect.

3. DIGIMARC'S WATERMARKING TECHNOLOGY

Digital watermarking technology can be used for embedding dormant information into Smart Images. For this purpose, a useful and effective watermarking technology must provide a method to embed data invisibly, promote a high information rate or capacity, allow the embedded data to be readily extracted by hardware or software, require minimum processing time, and incorporate a fair amount of robustness against standard image manipulation operations and basic attacks. Although Smart Images are expected to be used for facilitating commerce, immunity to basic attacks is still required for some applications such as those needed to communicate ownership rights. Digimarc Corporation has developed a commercially available technology that meets all these requirements. Digimarc's digital watermarking technology can be classified as a mixed domain technique, since it embeds signals in the frequency as well as in the spatial domain representation of the image. The frequency domain signal is used for synchronization purposes, while the spatial domain signal contains the payload.

3.1 The Embedder

The process of embedding a digital watermark into an image using Digimarc's watermarking technology can be summarized as follows. First, the image is divided into blocks of N×M pixels. Then the watermark is independently embedded in each of these blocks. This allows the watermark to be detected from an image region as small as N×M pixels. Spread spectrum techniques are used to make the signal imperceptible and to combat the effect of image manipulation and filtering. Let $w_0(n)=\{w_{0_1}, w_{0_2}, K, w_{0_{i-1}}, w_{0_1}\}$ be the watermark signal to be embedded in the image, where $w_{0_1}=\{-1,1\}$. The amount of information to be embedded determines the length of the vector $w_0(n)$. This amount of information should not exceed the channel capacity represented by the original image. Error correction techniques such as Bose-Chaudhuri-Hocquenghem (BCH) or Convolutional Codes are first applied to $W_0(n)$ in order to produce a robust signal, $w_{ep}(n)=\{w_{ep_1}, w_{ep_2}, K, w_{ep_{L-1}}, w_{ep_L}\}$, where L>I. Also, let $K_i(n)=\{k_{i_1}, k_{i_2}, K, k_{i_{j-1}}, k_{i_j}\}$ be a set of L pseudo-random binary keys, where $k_{i_j}=\{-1,1\}$ and J×L=N×M. Each of these keys is associated with one of the bits in the error-protected watermark, $W_{ep}(n)$. These random keys are first used to spread each of the bits of the watermark signal, $w_{ep}(n)$, to produce $C_i(n)$, which is a vector of length J.

$$C_i(n) = w_{ep_1} \times K_i(n) \tag{1}$$

Also, let $I_i(m,n)$ be an N×M matrix that maps each of the bits of $C_i(n)$ to a particular location in the N×M space. The locations of all the bits that belong to $C_i(n)$ are marked as 1's in the N×M binary mask $M_i(m,n)$ and everything else is marked as 0. Also, each mask is orthogonal to all the masks associated with the other bits; i.e, $$\sum_{i=0}^{N} M_i(m, n) = N \times M$$

matrix of 1's. Hence, each bit of $w_{ep}(i)$ can be scattered in the N×M block as follows $$S_i(m,n) = M_i(m,n) C_i(l_i(m,n)) \tag{2}$$

The above process is similar to data interleaving in spread spectrum communications, which is used to combat burst error. Finally, the sum of the scattered bits is added to the image, P(m,n), to produce the watermarked image, $P_w(m,n)$.

$$P_w(m, n) = P(m, n) + \sum_{i=0}^{N} \alpha_{m,n} S_i(m, n) \tag{3}$$

where $\alpha_{m,n}$ is a gain coefficient that is calculated based on the image properties around location (m,n) in the block. A synchronization signal is also added in the process to aid detection.

3.2. The Detector

The detector reverses the operation of the embedder. It starts by extracting the synchronization signal from the frequency domain of the image. It then uses this signal to resolve the scale, orientation, and origin of the watermark signal. Finally, it reads and decodes the watermark signal. Since the detector does not use the original image, P(m,n), the read process starts by estimating the watermark signal from $P_w(m,n)$. In this case, the original image P(m,n) is considered to be noise, or a noisy two-dimensional channel. Since the pixels of the original image are assumed to be highly correlated locally, the digital value of the spread watermark signal can be estimated by first predicting the original pixel value, P(m,n), using the local properties of the image, then subtracting it from $P_w(m,n)$. This produces an image representing the scattered watermark $$\hat{S}(m, n) = \sum_{i=0}^{N} \hat{S}_i(m, n). \tag{4}$$

The normalized scatter of each bit, $\hat{S}_i(m,n)$, can be extracted from $\hat{S}(m,n)$ using $M_i(m,n)$. An inverse mapping procedure is used to reconstruct an estimate of $C_i(n)$ according to the following equation:

$$\hat{C}_i(I(m,n)) = \hat{S}_i(m,n) \quad (5)$$

$$\hat{C}_i(n) = W_{ep_1} \times K_i(n) + \eta(n) \quad (6)$$

where $\eta(n)$ is additive interference. Now, an estimate of the error-protected watermark can be obtained by correlating the received signal for each bit with its associated key. Hence, $$\hat{w}_{ep_i} = \sum_{n=1}^{J} \hat{C}_i(n) \times K_i(n) \quad (7)$$

$$= \sum_{n=1}^{J} (w_{ep_i} \times K_i(n)^2 + \eta(n) \times K_i(n))$$

$$= \sum_{n=1}^{J} w_{ep_i} + \sum_{n=1}^{J} \eta(n) \times K_i(n)$$

$$= J \times w_{ep_i} + \phi$$

In the above equation, multiplying $K_i(n)$ by the interference $\eta(n)$ spreads the power of $\eta(n)$ over a much wider frequency band. This is similar to spreading the power of the original watermark signal as in equation (1) above. Moreover, summing the $\eta(n) \times K_i(n)$ from n=1 to J, is in essence a low pass filtering of the resulting wide band interference. The result of this filtering is $\phi$, which is a zero mean random variable with a small variance. This filtering has only amplification effect on $w_{ep_1}$ since it is assumed a narrow band signal. Hence, if $w_{ep_1}$ is 1, the above operation produces a positive peak; otherwise, it produces a negative peak. Thresholding the resulting value at zero produces an estimate of the binary error protected watermark signal. Finally, the estimated watermark vector $\hat{W}_{ep}(n) = \{\hat{w}_{ep_1}, \hat{w}_{ep_{L-1}}, K \hat{w}_{ep_L}\}$, is error corrected to produce the embedded watermark signal $W_0(n) = \{w_{0_1}, w_{0_2}, K, w_{0_{i-1}}, w_{0_i}\}$.

Though detection as a concept is best illustrated using classic linear correlation, it is well known in the field of digital communication that a wide variety of non-linear techniques tend to optimize the detection performance itself.

4. SAMPLE APPLICATION
4.1. MediaBridge

In this section, we describe Digimarc's MediaBridge, which is a Smart Image system that creates a bridge between traditional commerce and electronic commerce (FIG. (23)). It presents a fundamentally new way to access and use the Internet. In this application, Digimarc's watermarking technology is used to embed digital watermarks in printed images such as magazine advertisements, event tickets, CD covers, book covers, direct mailers, debit and credit cards, greeting cards, coupons, catalogs, business cards, and goods packaging. As shown in FIG. (24A), creating a Smart Image is very simple. The process starts with a digital image, on which the watermark is embedded as described in part (3) above. This produces a Smart Image in digital form. Finally, the digital Smart Image is printed and published using a normal screen printing process.

When the user produces a digital image of one of these printed Smart Images via a flatbed scanner or a digital camera, the Smart Image application or the input device (or its software driver) detects and reads the embedded watermark (FIG. (24B)). The embedded watermark represents an n-bit index to a database of URLs stored on a known location on the Internet, e.g., the Digimarc server. This index is used to fetch a corresponding URL from the database. Then the URL is used by the Internet browser to display the related Web page or start a Web-based application specified by the creator of the image. Hence, MediaBridge creates a bridge between the printed material and the Internet, permitting users to link directly to relevant Web destinations without any typing, mouse clicks, or time consuming searching. This provides physical media with digital capabilities, allowing new forms of interaction with the digital world, thereby enhancing publishing, advertising, and electronic commerce.

4.2. Advantages of the MediaBridge System

Embedding imperceptible digital watermarks offers several advantages over printing the URL on an advertisement. First, using digital watermarks does not require any real estate of the image and thus preserves the image quality. Presenting the URL on the image consumes some of the image's valuable real estate and degrades image quality. Second, MediaBridge does not require the user to type the URL in order to access the Internet. Typing URLs, especially long ones, can be confusing and error prone, and may hinder some users from accessing the Internet. Third, the imperceptible watermarks can be language-dependent and allow better tracking of advertisements. Depending on the language of the advertisement, a corresponding code can be embedded to allow the user to go directly to a Web page with the same language as that of the advertisement. Similarly, different watermarks can be used for different publications to allow advertisers to track their advertisements and optimize their advertising campaign. With printed URLs, this can be achieved only by using very long URLs, which is clearly undesirable.

MediaBridge offers great flexibility to advertisers. Once an image is embedded with the desired digital watermark, the knowledge structure at the advertiser's server can be relocated or updated as desired without re-embedding, re-printing and re-publishing the advertisement. If the knowledge structure has been relocated, the advertisers need only update the related URL at Digimarc's server, so that the new Web page will be displayed to the user once the input device detects one of their advertisements.

MediaBridge also has several advantages over traditional Internet browsers. When using an Internet browser to retrieve desired information from the Internet, the user is confronted with multiple Web sites and information overload. Most of these Web sites are very confusing, deep, and often loaded with graphics, images, or animation. Searching these Web sites to retrieve the desired information over a slow Internet link can be time consuming and frustrating, especially to Internet novices. MediaBridge, on the other hand, retrieves the desired information directly and quickly by showing a Smart Image to the PC camera or scanning it with a scanner. No browsing of several Web pages is necessary.

4.3. System Requirements

A typical PC configuration for use with MediaBridge is a 233 MHz Pentium CPU, 32 Mbytes of DRAM, a 1 G byte hard disk, and attached PC video camera or scanner. However, better PC configuration would enhance the performance of the application. The PC must also run the MediaBridge software. The PC may be connected to the Internet through a dial up modem or a direct LAN connection. However, for fast retrieval of the information a direct LAN connection or very high-speed modem is highly recommended. The digital camera may be either a still or a video camera. A good quality CCD (Charge Coupled Device) digital camera provides the best MediaBridge performance. Also, an analog camera connected to a classic video capture board could be used instead of the digital camera.

A digital camera or scanner is needed only when dealing with Smart Images in printed form. They are not needed if the image is already in digital form, as is the case when the image is posted on the Internet. In this case, Internet browsers such as Netscape Navigator and Microsoft Internet Explorer could be enhanced to include the watermark reader. Also, Internet browser capabilities can be enhanced further to display an icon on a corner of the image to indicate a hotspot when a Smart Image is encountered. When the user clicks on this hot spot, the browser displays a special menu that is unique to that image, guiding the user and suggesting further action. The user may then select any of the displayed menu items to retrieve more information from the Internet and maximize his information gain. The content of the menu and its associated pointers is retrieved from a central server such as Digimarc's server.

4.4. Usage Examples

Smart Images can be used in a variety of ways to facilitate commerce. For example, if a reader wants to get more information about an advertised product in a magazine, he simply shows the ad to the camera and goes directly to a precise location on the advertiser's Web site. He can get all the product details and specifications, locate a local dealer, or order online. If the reader wants to get more information on the subject of one of the articles in a magazine, he can hold the article up to the camera, and start reading. This allows him to go directly to other Web sites, where he can find and even order online related books, articles, etc. If the reader wants to subscribe to a magazine, he simply shows the front cover or the subscription card of the magazine to the camera. Subscription information appears and he subscribes on line. Similarly, if the reader wants to take advantage of an appealing offer found in a magazine, instead of calling an 800 number, he can go an easier route and apply online, immediately receiving all the associated promotions.

Smart Images can also be used to promote the sale of audio CDs, DVD movies, and books. For example, assume a consumer has just bought a CD of his favorite artist and is interested in other music by the same artist. Simply showing the back cover of the CD to the camera takes him to a Web site to purchase other CDs from the artist's collection. Or, if he is interested in the artist's latest song, he just holds the front of the CD in front of the camera and listens. In this case, the Internet browser first launches an MP3 audio player. Then it starts playing from the appropriate Web site a WAV file representing the latest song. The same idea can be used with DVD movies. If the consumer holds the DVD movie cover in front of the camera, the Internet browser first launches MediaPlayer. Then it starts playing a trailer of the main star's latest movie from the appropriate Web site. Similarly, showing the cover of a book to the camera takes the consumer to a site where he can order the book or see a list of books about the same subject or a list of books by the same author. Moreover, showing the book cover to the camera may play a trailer of a movie about the book, if there is one. It also allows the consumer to buy the movie online.

Smart Images have interesting uses with tickets for sporting events and concerts. For example, before a game a sports fan holds the front of an admittance ticket up to a PC camera. A Web page is displayed that shows the location of his stadium seat, a map of how to find the seat, and a view of the field from that seat. By showing the back of the ticket, the sports fan might see promotional material and merchandise for the event. After the event has taken place, showing the same ticket to the PC camera might take the sport fan to a Web page with detailed scoring information, game highlights, related links and merchandise specially discounted for ticket holders. Other types of events could have their own special information. For example, after a concert, a special offer on a music CD might be available only to ticket holders. For an airline ticket, the current state of the travelers frequent flyer account could be displayed. In addition, watermarking technology could be used to detect counterfeit tickets, which are becoming a large problem today.

Smart Images can also be used in Edutainment. It can whisk a child into the exiting world of children books. Simply insert the CD, which comes packaged with a "Smart Book," let the child show any page of the book to the digital camera, and page by page, the story unfolds. A pre-reader can hear a story read out loud. An older reader can follow along at his own level, or listen to a story that is too advanced to read alone. As the story unfolds, animation, songs, and exciting graphics carry the child along on a reading adventure. For activity books, the computer can also give verbal directions when the child shows a page to the camera.

The list of possible applications of Smart Images is growing every day and is limited only by the imagination.

5. TECHNOLOGICAL CHALLENGES AND REQUIRED INFRASTRUCTURE

Full utilization and deployment of Smart Images involves facing several challenges, which include the following:

1. Smart Images either include pointers to knowledge structures on a local database or on the Internet, or they are self-contained. When a Smart Image contains pointers, the embedded information is a few bytes representing the pointers. When a Smart Image is self-contained, the image itself contains all the desired information. In most applications it is necessary to embed as much information as possible into the Smart Image without degrading the image quality. Although the amount of information that can be embedded highly depends on the nature of the host image, it is also limited by information theory. The amount of information is further reduced by the need to improve detectability of the watermark signal by repeating the watermark over several regions of the image. Hence, there is a three-way trade-off between image quality, information rate, and detectability of the watermark. Increasing the information rate might be at the expense of watermark detectability. In most applications of Smart Images, the visual quality of the image is extremely important. While decreasing the visibility of the watermark preserves image quality, it automatically decreases watermark detectability. Automatic optimization of these three conflicting requirements is a challenge that warrants further research and development.

2. Although embedding speed is not critical, detection speed is crucial to using Smart Images. Watermark embedding can be achieved off-line, but in order to avoid user frustration, watermark detection must be accomplished as quickly as possible. Most printed advertisements and pictures are large in size and produce huge digital files when exposed to the PC camera. Processing this amount of data in real time is a challenging task. The frame rate of most video cameras is at least 10 frames/second. If detection is not accomplished as soon as the image is captured, the user may think that the ad is not placed properly in front of the camera. So, the user may move the picture to change the distance or the orientation angle in an attempt to improve detection. This would, in fact, cause further delay and may even make detection impossible. Buffering one frame and ignoring subsequent frames until watermark detection is complete may help speed up the detection process, as long as the detector succeeds in reading the watermark. Another way is to quickly examine the entire frame to locate the region with the strongest watermark signal and then process only that region. If the frame does not contain a strong watermark signal, the detector would quickly discard the entire frame and start searching a new frame. The fundamental solution, however, is to face the basic challenge of speeding up the watermark detector, which is heavily loaded with many sophisticated signal processing techniques.

3. The size of an image captured by a digital camera highly depends on the distance of the object from that camera. Also, the size of an image captured by a scanner depends on the used scanning resolution. To correctly read the watermark the reader must precisely know the scale of the image. Although a watermark detector such as Digimarc's detector is capable of determining this scale from the captured image, more robustness to variations in scale, especially robustness to a wider range, is still necessary. Moreover, holding a Smart Image in front of the camera at an arbitrary distance risks that the camera will not be focussed. Although expensive cameras may have an auto-focusing capability, the lenses on most economical cameras must be focused manually. Hence, these cameras may capture out-of-focus (blurred) images. This is similar to convoluting the image and the embedded watermark signal with a blur function. Detecting blurred images and estimating the parameters of the blur function help to de-blur these images to recover the watermark signal.

4. To correctly read the watermark in a Smart Image the reader must know the precise orientation angle of the image. With scanners, this rotation angle is simple since it is limited to rotation in the scanner's plane. However, with digital cameras, this rotation angle can be arbitrary with three degrees of freedom. Although a watermark detector, such as Digimarc's detector, is capable of determining orientation in the scanner plane or on a plane perpendicular to the focal axis of the camera, arbitrary orientation is still a major challenge. This arbitrary orientation may cause the embedded signal to suffer from geometrical distortion. Geometrical distortion also occurs from bending, crumbling, or folding the picture. This distortion is similar to the jitter in spread spectrum communication. In this case, the distance between the chips of the spread signal becomes irregular, and de-spreading would not produce the correct signal. Estimating this geometrical distortion and correcting it during the process of reading the watermark remains a challenging problem to watermark detectors.

5. Some video cameras produce an interlaced output. When one of these cameras is used with Smart Images, the detector must operate on fields rather than frames. By definition, a field contains either the odd or even lines of a frame, and two consecutive fields originate from two consecutive frames. Hence, the detector must combine two fields to compose a frame and avoid a major degradation of the watermark signal. The process of combining the fields also must compensate for the motion between the fields. This process is practical if the frame rate of the camera is high enough and if the user does not frequently move the image in front of the camera.

6. The printing process may degrade the embedded watermark signal. Digital watermarking is normally performed using digital images represented in the RGB or CYMK color space at 300 DPI (dots per inch). The watermarked images are then printed on paper with a screen-printing process that uses the CYMK subtractive color space at a line per inch (LPI) ranging from 65 to 200. 133 lines/in is typical for quality magazines and 73 lines/in is typical for newspapers. In order to produce a good image quality and avoid pixelization, the rule of thumb is to use digital images with a resolution (DPI) that is at least twice the press resolution (LPI). This is due to the use of halftone printing for color production. Also, different presses use screens with different patterns and line orientations and have different precision for color registration. Hence, one challenge is to perform in-depth characterization of the printing process and optimize the watermark embedding and reading processes based on this characterization.

7. A related challenge addresses the variety of papers. Papers of various qualities, thickness, and stiffness, absorb ink in various ways. Some papers absorb ink evenly, while others absorb ink at rates that vary with the changes in the paper's texture and finish. This may degrade the embedded watermark signal when a digitally watermarked image is printed. A suitable classification and characterization of paper will lead to ways of embedding digital watermarks that compensate for this printing-related degradation.

8. Most CCD and CMOS cameras use an array of sensors to produce colored images. This requires dividing the sensors in the array among the three primary colors red (R), green (G), and blue (B) according to a specific pattern. All the sensors that are designated for a particular color are dyed with that color to increase their sensitivity to the designated color hence producing the desired color. Most camera manufacturers use Bayer color pattern GR/BG. Although this pattern proved to produce good image quality, it causes color miss-registration that degrades the watermark signal. Moreover, the color space converter, which maps the signal from the sensors to YUV or RGB color space, may vary from one manufacturer to another. Accounting for the Bayer color pattern during the color mapping process would improve the detection of the watermark signal.

9. Different input devices introduce different types of distortion. For example, cameras made by different manufacturers may have different sensitivities to light. Their lenses may cause different spherical distortions and their sensors may have different noise characteristics. Moreover, due to the underlying technology, CCD cameras typically produce better image quality than CMOS cameras. Similarly, flatbed scanners are of various qualities. Some of them have poor color reproduction or introduce a slight distortion in image aspect ratio. Also, some scanners introduce aliasing and employ interpolation to increase the scanning resolution. Accounting for these differences and addressing these problems in the design of the watermark embedder and detectors remain a challenge awaiting a solution.

10. Unlike digital images, printed images do not maintain their qualities. They are subject to aging, soiling, crumbling, tearing, and deterioration. Moreover, they may be used in varied lighting conditions. Hence, designing a watermark detector that is immune to these un-intentional attacks and works for any lighting condition is another challenge to be addressed.

6. CONCLUSIONS

In this section, we introduced the concept of Smart Images and explained the use of Digimarc Corporation's digital watermarking technology in their implementation. A Smart Image is a digital or a physical image that is embedded with a specialized digital watermark. The digital watermark acts as an active agent or catalyst that empowers the Smart Image with efficient access to further, specific information about the image content. This may be "direct" information such as ownership and usage rights, or more importantly, it may be information located on local databases or on specific Web pages on the Internet, information that facilitate e-commerce, or information that instructs and controls further computer software or hardware actions. Thus, the systems that implement Smart Images create a graceful bridge between physical space and the virtual space of the Internet. Full utilization of Smart Image requires improving the watermarking embedding and detection processes to operate very efficiently on a variety of environments and conditions. Smart Images is the first step in seamlessly linking content to people, places and things and can also be extended to other multimedia elements such as audio and video.

6.0 Concluding Remarks

Having described and illustrated the principles of the technology with reference to specific implementations, it will be recognized that the technology can be implemented in many other, different, forms. The techniques for embedding and detecting a watermark may be applied to various types of watermarks, including those encoded using linear or non-linear functions to apply a watermark message to a host signal. As one example, embedding methods, such as methods for error correction coding, methods for mapping watermark messages to the host signal, and methods for redundantly encoding watermark messages apply whether the watermarking functions are linear or non-linear. In addition, the techniques for determining and refining a watermark's orientation apply to linear and non-linear watermark methods. For example, the methods described above for detecting orientation of a watermark signal in a potentially transformed version of the watermarked signal apply to watermark systems that use different methods for embedding and reading messages, including, but not limited to, techniques that modulate spatial or temporal domain intensity values, that modulate transform coefficients, that employ dither modulation or quantization index modulation.

Some of the detector methods described above invoke a watermark message reader to assess the merits of a given orientation of a watermark signal in a potentially transformed version of the watermarked signal. In particular, some of these techniques assess the merits of an orientation by invoking a reader to determine the extent to which known message bits agree with those read from the watermarked signal using the orientation. These techniques are not specific to the type of message encoding or reading as noted in the previous paragraph. The merits of a given estimate of a watermark signal's orientation may be assessed by selecting an orientation parameter that increases correlation between the watermark signal (or known watermark signal attributes) and the watermarked signal, or that improves recovery of known watermark message bits from the watermark signal.

Some watermark readers extract a message from a watermarked signal by correlating known attributes of a message symbol with the watermarked signal. For example, one symbol might be associated with a first pseudorandom noise pattern, while another symbol is associated with another pseudorandom noise pattern. If the reader determines that a strong correlation between the known attribute and the watermark signal exists, then it is likely that the watermarked signal contains the message symbol.

Other watermark readers analyze the watermarked signal to identify attributes that are associated with a message symbol. Generally speaking, these watermark readers are using a form of correlation, but in a different form. If the reader identifies evidence of watermark signal attributes associated with a message symbol, it notes that the associated message symbol has likely been encoded. For example, readers that employ quantization index modulation analyze the watermarked signal by applying quantizers to the signal to determine which quantizer was most likely used in the embedder to encode a message. Since message symbols are associated with quantizers, the reader extracts a message by estimating the quantizer used to encode the message. In these schemes, the signal attribute associated with a message symbol is the type of quantization applied to the signal. Regardless of the signal attributes used to encode and read a watermark message, the methods described above for determining watermark orientation and refining orientation parameters still apply.

To provide a comprehensive disclosure without unduly lengthening the specification, applicants incorporate by reference the patents and patent applications referenced above. Additional information is attached in the section, entitled "Smart Images" Using Digimarc's Watermarking Technology. This section describes additional embodiments and applications of watermark embedding and detecting technology. For additional information about a detector optimization that looks for a watermark in portions of a signal that are more likely to contain a recoverable watermark signal, see U.S. patent application Ser. No. 09/302,663, filed Apr. 30, 1999, entitled Watermark Detection Utilizing Regions with Higher Probability of Success, by Ammon Gustafson, Geoffrey Rhoads, Adnan Alattar, Ravi Sharma and Clay Davidson (Now U.S. Pat. No. 6,442,284).

The particular combinations of elements and features in the above-detailed embodiments are exemplary only; the interchanging and substitution of these teachings with other teachings in this and the incorporated-by-reference patents/applications are also contemplated.

What is claimed is:

1. A method of detecting a watermark in a multidimensional signal, the method comprising:

estimating an initial orientation of a watermark signal in the multidimensional signal without reference to an original, un-watermarked version of the multidimensional signal; and refining the initial orientation to compute a refined orientation, including computing at least one orientation parameter that:
increases correlation between the watermark signal or watermark signal attribute and the multidimensional signal, or
improves recovery of known watermark message bits from the watermark signal, when the watermark or multidimensional signal are adjusted with the refined orientation.

2. The method of claim 1 including:

estimating initial watermark candidates of the watermark signal in the multidimensional signal;

refining the initial orientation candidates to compute refined orientation candidates, including for each candidate:

computing at least one orientation parameter that increases correlation between the watermark signal or watermark signal attributes and the multidimensional signal when the watermark or multidimensional signal are adjusted with the refined orientation candidate.

3. The method of claim 2 wherein:

the initial and refined candidates are computed for portions of the multidimensional signal;

and the refined candidates are further refined by comparing similarity of orientation candidates from different portions, and evaluating merits of the candidates based on similarity.

4. The method of claim 3 wherein the portions are from a single image frame.

5. The method of claim 3 wherein the portions are from different image frames.

6. The method of claim 1 including:

evaluating a candidate by extracting watermark values from the multidimensional signal and determining the extent to which the watermark values match expected values.

7. A method of detecting a watermark in a target signal, the method comprising:

computing orientation parameter candidates of a watermark signal in different portions of the target signal;

comparing similarity of orientation parameter candidates from the different portions of the target signal;

based at least in part on comparing the similarity of the orientation parameter candidates, determining an orientation of the watermark in the target signal.

8. The method of claim 7 wherein the portions of the target signal are from a single image frame.

9. The method of claim 7 wherein portions of the target signal are from different frames.

10. A method of detecting a watermark in a target signal:

estimating orientation of the watermark in the target signal;

using the orientation to extract a measure of the watermark in the target; and using the measure to assess merits of the estimated orientation.

11. The method of claim 10 wherein the measure includes an extent to which values of image samples in the target signal are consistent with the watermark.

12. The method of claim 10 wherein the measure includes an extent to which values of watermark message bits read from the target signal are consistent with expected bits.

13. A watermark detector comprising:

means for computing orientation of a watermark signal in a target signal without reference to an original, un-watermarked version of the target signal;

means for adjusting at least portions of the target signal based on the orientation; and means for reading a message encoded in the watermark signal from the adjusted target signal portions.

14. The detector of claim 13 wherein means for computing the orientation includes:

means for estimating orientation parameters; and means for refining the orientation parameters.

15. The detector of claim 14 including:

means for estimating orientation parameters from different portions of the target signal;

means for grouping orientation parameters from different portions of the target signal.

16. The detector of claim 15 wherein the different portions are different spatial portions of the signal.

17. The detector of claim 15 wherein the different portions are different temporal portions of the signal.

18. The detector of claim 14 including:

means for estimating rotation and scale parameters;

means for refining the rotation and scale estimates;

means for estimating translation parameters; and means for refining the translation parameters.

* * * * *

UNITED STATES PATENT AND TRADEMARK OFFICE
CERTIFICATE OF CORRECTION

PATENT NO. : 6,614,914 B1
APPLICATION NO. : 09/503881
DATED : September 2, 2003
INVENTOR(S) : Rhoads et al.

It is certified that error appears in the above-identified patent and that said Letters Patent is hereby corrected as shown below:

Title Page 1, Column 1, under Related U.S. Application Data, Section (63), after "now Pat. No. 5,852,250," insert --Application Ser. No. 08/649,419 is a continuation in part of PCT/US96/06618, filed May 7, 1996, U.S. application Ser. No. 08/637,531, filed Apr. 25, 1996 (Now U.S. Pat. No. 5,822,436), U.S. application Ser. No. 08/534,005, filed Sep. 25, 1995, (Now U.S. Pat. No. 5,832,119), and U.S. application Ser. No. 08/436,102, filed May 8, 1995, (Now U.S. Pat. No. 5,748,783). This application is also a continuation in part of application Ser. No. 09/482,749, filed Jan. 13, 2000.--.

Title Page 1, Column 2, under Other Publications, line 2, change "it's Applications," to --its Applications,--.

Title Page 1, Column 2, under Other Publications, line 4, change "Ruanaidh et al.," to --O'Ruanaidh et al.,--.

Title Page 4, Column 1, under Other Publications, line 5, change "prote.ction," to --protection,--.

Title Page 4, Column 2, Boland, Watermarking Digital Images reference, line 3, change "and it's" to --and its--.

Title Page 5, Column 1, Cheong, Internet Agent reference, line 2, change "Riders Publishing" to --Riders Publishing,--.

Title Page 5, Column 1, Brown, S-Tools reference, line 1, change "for Window," to --for Windows,--.

Title Page 6, Column 1, line 3, change "Jun. 7, 1992" to --Jun. 7, 1993--.

Title Page 6, Column 1, Möller, Rechnergestutzte reference, line 3, after "unsinning ist," insert --(with English abstract),--.

Title Page 6, Column 2, ORuanaidh Watermarking reference, line 2, change "tcd.ic" to --tcd.ie--.

Title Page 7, Column 1, Szepanski, Additive Binary reference, line 3, change "NGT Technical" to --NTG Technical--.

Title Page 7, Column 2, Voyatzis, Applications of Total Automorphisms reference, line 6, change ", pages." to --, 4 pages.--.

UNITED STATES PATENT AND TRADEMARK OFFICE
CERTIFICATE OF CORRECTION

PATENT NO. : 6,614,914 B1
APPLICATION NO. : 09/503881
DATED : September 2, 2003
INVENTOR(S) : Rhoads et al.

It is certified that error appears in the above-identified patent and that said Letters Patent is hereby corrected as shown below:

Title Page 7, Column 2, Wise, The History of Copyright reference, line 1, change "Photographer' Rights" to --Photographers' Rights--.

Column 7, line 34, change "and S*=Se$_{gX}$;" to --and S*=Se$^{gX}$;--.

Column 11, line 30, change "there many" to --there are many--.

Column 13, line 2, change ""is flow" to --is a flow--.

Column 18, line 44, change "if they within" to --if they are within--.

Column 20, line 37, change "likely produce" to --likely to produce--.

Column 23, line 4, change "video camera" to --video cameras--.

Column 24, line 9, change "refines theses estimates" to --refines these estimates--.

Column 27, line 26, change "4D vector and" to --4D vectors and--.

Column 30, line 9, change "may computes a" to --my compute a--.

Column 30, line 23, change "attributes the watermark" to --attributes of the watermark--.

Column 34, line 25, change "and modem electronic" to --and modern electronic--.

Signed and Sealed this

Twenty-first Day of April, 2009

JOHN DOLL
*Acting Director of the United States Patent and Trademark Office*